US008826739B2

United States Patent
Matsumoto et al.

(10) Patent No.: US 8,826,739 B2
(45) Date of Patent: Sep. 9, 2014

(54) ULTRASONIC MEASURING METHOD AND ULTRASONIC MEASURING SYSTEM

(75) Inventors: Seiichi Matsumoto, Toyota (JP); Hiroyuki Kawaki, Toyota (JP); Shinya Kuroki, Toyota (JP); Kazuhiro Uchida, Ama (JP); Kiyokazu Ito, Ama (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 245 days.

(21) Appl. No.: 13/356,908

(22) Filed: Jan. 24, 2012

(65) Prior Publication Data

US 2012/0186348 A1 Jul. 26, 2012

(30) Foreign Application Priority Data

Jan. 25, 2011 (JP) .................................. 2011-013302

(51) Int. Cl.
*G01N 29/024* (2006.01)
*G01B 17/02* (2006.01)

(52) U.S. Cl.
CPC .......... *G01B 17/025* (2013.01); *G01B 2210/44* (2013.01)
USPC ......................................................... 73/599

(58) Field of Classification Search
USPC ......................................................... 73/599
See application file for complete search history.

(56) References Cited

U.S. PATENT DOCUMENTS

| 4,117,732 A * | 10/1978 | Brazhnikov | 73/599 |
| 5,922,960 A * | 7/1999 | Toda | 73/599 |
| 7,107,852 B2 * | 9/2006 | Hutchins et al. | 73/598 |
| 2005/0155430 A1 | 7/2005 | Hutchins et al. | |

FOREIGN PATENT DOCUMENTS

| JP | 61-114160 | 5/1986 |
| JP | 8-215196 | 8/1996 |
| JP | 10-167228 | 6/1998 |
| JP | 11-96997 | 4/1999 |
| JP | 2000-353515 | 12/2000 |
| JP | 2003-254942 | 9/2003 |
| JP | 2005-249486 | 9/2005 |
| JP | 2008-102160 | 5/2008 |
| JP | 2008-116406 | 5/2008 |
| JP | 2010-101656 | 5/2010 |

* cited by examiner

*Primary Examiner* — John Chapman, Jr.
(74) *Attorney, Agent, or Firm* — Finnegan, Henderson, Farabow, Garrett & Dunner, LLP

(57) ABSTRACT

In an ultrasonic measuring method for measuring the thickness of a coating material applied by coating to one surface or both surfaces of a substrate made of a metal so as to provide a coated product, a pair of first ultrasonic sensor and second ultrasonic sensor are provided such that the first ultrasonic sensor is placed on one side of the coated product, as viewed in its thickness direction, via an air layer, while the second ultrasonic sensor is placed on the other side of the coated product, via an air layer, and the thickness of the coating material is measured by transmitting ultrasonic waves between the first and the second ultrasonic sensors. A flat-type transmitting sensor that permits propagation of unfocused ultrasonic waves is used as the first ultrasonic sensor, and a flat-type receiving sensor that permits propagation of unfocused ultrasonic waves is used as the second ultrasonic sensor.

21 Claims, 21 Drawing Sheets

ULTRASONIC MEASURING METHOD AND ULTRASONIC MEASURING SYSTEM

INCORPORATION BY REFERENCE

The disclosure of Japanese Patent Application No. 2011-013302 filed on Jan. 25, 2011 including the specification, drawings and abstract is incorporated herein by reference in its entirety.

BACKGROUND OF THE INVENTION

1. Field of the Invention

The invention relates to an ultrasonic measuring method for measuring the thickness of a coating material, such as the basis weight of electrode paste applied by coating to a metal foil on an electrode production line in a battery production process, for example, during operation of the line, and an ultrasonic measuring system that implements the ultrasonic measuring method.

2. Description of Related Art

The battery production process includes a step of producing electrodes from an electrode sheet formed by applying electrode paste by coating to a metal foil on an electrode production line. Since the quality of the electrodes has a large influence on the performance of batteries as final products, it is important, for quality control, to conduct quality check regarding the basis weight (or coating weight) and coating profile of the electrode paste, after it is applied by coating to the metal foil. In the related art, samples of a given shape are arbitrarily taken out of the electrodes produced on the electrode production line, and quality check is performed on the samples, outside the production line, by measuring differences in weight between samples taken out before coating with the electrode paste, and samples taken out after the coating. As another example, quality check is performed using a measuring system (which will be called "radiation measuring system") that uses X rays or β rays.

In some cases, the quality check regarding the basis weight and coating profile of the coating material is desired to be conducted evenly or uniformly over a wide range on the electrode production line, with respect to the electrode paste of the electrode produced in the electrode production line, for quality control. Thus, the inventors of the present invention attempted to make a 100% inspection of the basis weight and coating profile of the electrode paste, on the production line, with respect to all of the electrodes produced on the electrode production line, using an ultrasonic measuring system as disclosed in Japanese Patent Application Publication No. 2008-102160 (JP-A-2008-102160), for example. FIG. 22 is an explanatory view showing the ultrasonic measuring system as disclosed in JP-A-2008-102160. As shown in FIG. 22, the ultrasonic measuring system has a pair of ultrasound sending means 81 and ultrasound receiving means 82, which are placed above a measurement object 90, and incident waves sent from the ultrasound sending means 81 are transmitted through the measurement object 90, so that the ultrasound receiving means 82 receives the reflected waves from the measurement object 90. The ultrasound sending means 81 and the ultrasound receiving means 82 are spot-type sensors that permit propagation of focused ultrasonic waves.

In the ultrasonic measuring system of JP-A-2008-102160, a propagation time measuring means 83 measures the propagation velocity of ultrasonic waves propagated through the measurement object 90, based on an incident signal of the ultrasound sending means 81 and a reflection signal received by the ultrasound receiving means 82, and a velocity correcting means 85 corrects the propagation velocity calculated by the propagation time measuring means 83, based on respective temperatures of a liquid phase 91 and a solid phase 92, which are measured by temperature measuring means 84a, 84b. A propagation path length measuring means 86 measures the thickness of the measurement object 90, and a phase-change position of the measurement object 90 as a laminate of the liquid phase 91 and the solid phase 92, based on the propagation velocity of ultrasonic waves obtained by the propagation time measuring means 83, and the correction value of the propagation velocity obtained by the velocity correcting means 85.

However, the above-described technologies of the related art have the following problems. Since the method of measuring differences in weight between samples (metal foil) that have not been coated with the electrode paste and samples (metal foil) coated with the electrode paste cannot be applied to the electrode production line that is in operation, the method is carried out outside the production line, on electrodes as samples taken out of the electrode production line. However, in this method using differences in weight of the electrode paste, the operator cannot correctly determine the basis weight and coating profile of the electrode paste.

If the radiation measuring system is used for conducting the quality check regarding the basis weight and coating profile of the electrode paste, in the electrode production line, the equipment is available at excessively high cost because radiation measuring systems, in general, are very expensive. Also, the radiation measuring system is arranged to focus radiation from a radiation source, and irradiate a measurement portion of an object to be measured, so as to measure the thickness of the measurement portion in the object to be measured; therefore, the thickness can be measured only within an extremely small region of, for example, Φ0.3 (mm), as a measurable range. While samples of electrodes are taken out of the electrode production line, for measurement of the thickness, the radiation measurement system is not able to measure the basis weight of the electrode paste and the coating profile of the electrode paste with high reliability and high measuring accuracy, even with respect to the electrodes sampled from the electrode production line, since the electrode includes a high-density metal foil.

In the ultrasonic measuring system using spot-type ultrasonic sensors, like the one as disclosed in JP-A-2008-102160, the measurable range that can be measured with the ultrasonic sensors is considerably narrow since the range is reduced toward the measurement portion, as in the above-described radiation measuring system. Therefore, the thickness of the electrode paste, or the basis weight of the electrode paste, can be only locally measured. The examination of the coating profile of the electrode paste is to measure the thickness of the electrode paste over a given range in an edge portion of the electrode paste, so as to grasp the shape or profile of the edge portion as a whole. Therefore, the spot-type ultrasonic sensors cannot measure the coating profile of the electrode paste with high reliability and high measuring accuracy. Thus, the ultrasonic measuring systems of the related art are not able to perform wide-range quality check regarding the basis weight and coating profile of the electrode paste, on the electrodes produced on the electrode production line, evenly or uniformly over a wide range on the production line.

SUMMARY OF THE INVENTION

The present invention provides an ultrasonic measuring method and an ultrasonic measuring system, which make it possible to measure the thickness of a coating material in a coated product on a production line, at low cost, with high accuracy, while the product is being produced in the production line.

An ultrasonic measuring method for measuring a thickness of a coating material applied by coating to one surface or both surfaces of a substrate made of a metal so as to provide a coated product, according to a first aspect of the invention, includes: providing a pair of first ultrasonic sensor and second ultrasonic sensor, placing the first ultrasonic sensor on one side of the coated product, as viewed in a thickness direction of the coated product, via an air layer, and placing the second ultrasonic sensor on the other side of the coated product, via an air layer, and measuring the thickness of the coating material by transmitting ultrasonic waves between the first ultrasonic sensor and the second ultrasonic sensor. In the ultrasonic measuring method, a flat-type transmitting sensor that permits propagation of unfocused ultrasonic waves is used as the first ultrasonic sensor, and a flat-type receiving sensor that permits propagation of unfocused ultrasonic waves is used as the second ultrasonic sensor.

In the ultrasonic measuring method according to the first aspect of the invention, "the flat-type transmitting sensor that permits propagation of unfocused ultrasonic waves" means an ultrasonic sensor having a first vibration surface from which ultrasonic waves are transmitted, wherein the first vibration surface consists of a single vibration surface or two or more vibration surfaces (sections), and the overall shape of the first vibration surface is, for example, a rectangular shape, circular shape, or the like. Also, the ultrasonic waves sent from the ultrasonic sensor as the flat-type transmitting sensor can be transmitted, via the air layer, to at least within an area of the coated product which is opposed to the first vibration surface. On the other hand, "the flat-type receiving sensor that permits propagation of unfocused ultrasonic waves" means an ultrasonic sensor having a second vibration surface that receives ultrasonic waves, wherein the second vibration surface consists of a single vibration surface or two or more vibration surfaces (sections), and the overall shape of the second vibration surface is, for example, a rectangular shape, circular shape, or the like. Also, the ultrasonic sensor is able to receive the ultrasonic waves (transmitted waves) on the second vibration surface sent from the first ultrasonic sensor for irradiation and transmitted through at least the coated product, via the air layer.

The ultrasonic measuring method according to the first aspect of the invention yields the following effects. In the battery production process, for example, when the thickness of the coating material, or the basis weight and coating profile of the coating material, is measured in the production line in which the electrode (coated product) is produced by coating the metal foil (substrate) with the electrode paste (coating material), ultrasonic waves are transmitted from the first ultrasonic sensor to the coated product so that a wide area of the coated product is irradiated with the ultrasonic waves, and are transmitted through the substrate and the coating material in the coated product. Then, the second ultrasonic sensor receives the ultrasonic waves (transmitted waves) transmitted through the substrate and the coating material over wide regions thereof, so that a received signal for determining the thickness of the coating material can be obtained over a wide range of the coated product, as compared with the spot-type ultrasonic sensor of the related art as disclosed in JP-A-2008-102160.

Namely, the flat-type transmitting sensor that permits propagation of unfocused ultrasonic waves is used as the first ultrasonic sensor, and the flat-type receiving sensor that permits propagation of unfocused ultrasonic waves is used as the second ultrasonic sensor. With this arrangement, the first ultrasonic sensor transmits ultrasonic waves to at least within the area of the coated product which is opposed to the first vibration surface, via the air layer, and the second ultrasonic sensor receives, at the second vibration surface, the ultrasonic waves (transmitted waves) sent from the first ultrasonic sensor for irradiation and transmitted through at least the coated product, via the air layer. Accordingly, in the ultrasonic measuring method of the first aspect, the second ultrasonic sensor provides a received signal for determining the thickness of the coating material, for a wider region or range of the coated product, as compared with the spot-type ultrasonic sensor. Thus, quality check regarding the thickness of the coating material, or the basis weight and coating profile of the electrode paste, can be carried out on the production line of the coated product.

Since the received signal representing the transmitted waves received by the second ultrasonic sensor can be obtained from a wide region of the coated product, the thickness of the coating material can be detected over a wider range of the coated product. Therefore, variations in the thickness of the coating material within the measurement range can be correctly grasped, and the overall thickness of the coating material, or the basis weight of the coating material, within a given range of the coated product can be measured with high reliability. On the other hand, the examination of the coating profile of the coating material is conducted by measuring the thickness of the coating material over a given range, at each edge portion of the coating material, so that the overall shape of the edge portion is grasped. Thus, since the thickness of the coating material can be detected over a wider range in the coated product, the coating profile of the coating material can be measured with improved accuracy, as compared with measurement methods of the related art using the radiation measuring system, or the spot-type ultrasonic sensor as disclosed in JP-A-2008-102160.

In the quality check of the related art in which a difference in weight between a sample that has not been coated with the electrode paste and a sample coated with the electrode paste is measured, the basis weight and coating profile of the electrode paste cannot be accurately determined. Furthermore, the quality check is conducted outside the production line, using samples of electrodes taken out of the production line; therefore, an extra or additional step for performing the quality check is required, resulting in increased cost. Also, the quality check using the radiation measuring system suffers from excessively large equipment cost since the radiation measuring system is considerably expensive.

In the ultrasonic measuring method of the first aspect, on the other hand, the production line for producing the coated product need not be stopped, and the quality check can be performed during operation of the line; therefore, an extra or additional step for performing the quality check is not required, and the cost will not be increased. Also, the equipment cost of the system (ultrasonic measuring system) constituted by the first ultrasonic sensor, the second ultrasonic sensor, etc. and used in the ultrasonic measuring method of the first aspect is lower than that of the radiation measuring system, and the cost reflected by the coated product can be largely reduced. Accordingly, the ultrasonic measuring method of the first aspect produces an excellent effect that the thickness of the coating material in the coated product can be measured on the production line in which the coated product is produced, at low cost, with high reliability and high measuring accuracy.

In the ultrasonic measuring method according to the first aspect of the invention, sensors capable of sending and receiving ultrasonic waves may be used as the first ultrasonic sensor and the second ultrasonic sensor, and an ultrasonic oscillation controller may be provided for controlling sending and receiving of ultrasonic waves, between the first ultrasonic sensor and the second ultrasonic sensor. Where the first ultrasonic sensor and the second ultrasonic sensor are in a first condition when the first ultrasonic sensor sends ultrasonic waves, and the second ultrasonic sensor receives the ultrasonic waves, and are in a second condition when the second ultrasonic sensor sends ultrasonic waves, and the first ultrasonic sensor receives the ultrasonic waves, the ultrasonic oscillation controller may switch the first ultrasonic sensor and the second ultrasonic sensor between the first condition and the second condition, so that the first ultrasonic sensor operates differently from the second ultrasonic sensor. With this arrangement, the thickness of the coating material can be determined with improved measuring reliability, based on two types of received wave signals, namely, a second received wave signal representing waves received by the second ultrasonic sensor in the first condition, and a first received wave signal representing waves received by the first ultrasonic sensor in the second direction.

Namely, in the ultrasonic measuring method as described above, ultrasonic sensors having nominal frequencies in the same frequency band are used as the first ultrasonic sensor and the second ultrasonic sensor. Generally, ultrasonic sensors have slightly different frequencies, in a strict sense, even though they are of the same frequency band, and individual ultrasonic sensors have specific or inherent frequencies. The ultrasonic measuring method as described above utilizes the inevitable occurrence of such a difference in frequency between the first ultrasonic sensor and the second ultrasonic sensor, due to the nature of ultrasonic sensors. Namely, where the first ultrasonic sensor has a frequency $f1(f)$ as a specific characteristic value, and the second ultrasonic sensor has a frequency $f2(f)$ as a specific characteristic value, the frequency $f1$ and the frequency $f2$ are substantially equal to each other, i.e., $f1 \approx f2$.

In this connection, the sound velocity, density, and acoustic impedance in the air are determined according to the following equations. (1) Sound velocity $C = f \times \lambda$ ... Eq. 1 where C is sound velocity (m/sec), f is frequency (kHz), and $\lambda$ is wavelength (m), or $C = 331.5 + (0.61 \times t)$ ... Eq. 2 where t is temperature (° C.). (2) Density $\rho = 1.293 \times (273.15/(273.15+t)) \times (P/1013.25)$ ... Eq. 3 where $\rho$ is density (kg/m$^3$) (ntp), t is temperature (° C.), and P is atmospheric pressure (atm). (3) Acoustic impedance $Z = \rho \times C$ ... Eq. 4 where Z is acoustic impedance (Pa·s/m).

From Eq. 1 and Eq.4 above, $\lambda = Z/f/\rho$ ... Eq.5 is obtained. Since the sound velocity, density, and acoustic impedance in the air, under atmospheric pressure, are proportional to the temperature of the air, as indicated in Eq. 1 through Eq. 3, the wavelength $\lambda$, is inversely proportional to the frequency f, if the acoustic impedance and the density are regarded as constants that vary with changes in temperature.

Namely, when the system is in the first condition, ultrasonic waves sent from the first ultrasonic sensor of the frequency $f1(f)$ are transmitted through the coated product, and are received by the second ultrasonic sensor of the frequency $f2(f)$. In this case, the wavelength $\lambda2$ (the second received wave signal) of the ultrasonic waves (transmitted waves) received by the second ultrasonic sensor, which is obtained from Eq. 5, is expressed as $\lambda2 = Z2/f2/\rho2$, where $\lambda2$ is the wavelength (m) of the ultrasonic waves received by the second ultrasonic sensor, and Z2 and $\rho2$ are constants. When the system is in the second condition, ultrasonic waves sent from the second ultrasonic sensor of the frequency $f2(f)$ are transmitted through the coated product, and are received by the first ultrasonic sensor of the frequency $f1(f)$. In this case, the wavelength $\lambda1$ (the first received wave signal) of the transmitted waves received by the first ultrasonic sensor, which is obtained from Eq. 5, is expressed as $\lambda1 = Z1/f1/\rho1$, where $\lambda1$ is the wavelength (m) of the ultrasonic waves received by the first ultrasonic sensor, and Z1 and $\rho1$ are constants. Since the constants have relationships that $Z1 \approx Z2$ and $\rho1 \approx \rho2$, and the frequencies have a relationship that $f1 \approx f2$, the wavelength $\lambda1$ as the first received wave signal and the wavelength $\lambda2$ as the second received wave signal have a relationship that $\lambda1 \approx \lambda2$.

If the thickness of the coating material is obtained based on a received wave signal representing waves received by only one ultrasonic sensor, it is difficult for the operator to determine whether the received wave signal was obtained in normal conditions at the time of measurement, and the measurement lacks reliability. On the other hand, in the ultrasonic measuring method as described above, the ultrasonic oscillation controller switches the first ultrasonic sensor and the second ultrasonic sensor between the first condition and the second condition so that the first ultrasonic sensor operates differently from the second ultrasonic sensor. With this arrangement, when the thickness of the coating material is determined in view of changes in the temperature of the air during measurement, the thickness can be measured based on two types of received signals, i.e., the second received wave signal ($\lambda2$) of ultrasonic waves received by the second ultrasonic sensor when the system is in the first condition, and the first received wave signal ($\lambda1$) of ultrasonic waves received by the first ultrasonic sensor when the system is in the second condition.

By using the first received wave signal and the second received wave signal, the operator can determine that the received wave signals were obtained in normal conditions at the time of measurement, if the first received wave signal and the second received wave signal have a relationship that $\lambda1 \approx \lambda2$. In ultrasonic sensors, in particular, there is generally a certain correlation between the magnitude of received power of ultrasonic waves (ultrasonic wave strength) and the wavelength of received ultrasonic waves, as a characteristic of sonic propagation. The ultrasonic wave strength changes along a normal distribution curve having a peak value at a given wavelength. If the wavelength shifts to be a little shorter or longer than the given wavelength corresponding to the peak value, the ultrasonic wave strength is reduced largely from the peak value. Therefore, if the first received wave signal and the second received wave signal have a relationship that $\lambda1 \approx \lambda2$, the peak value of the ultrasonic wave strength corresponding to the first received wave signal $\lambda1$ and the peak value of the ultrasonic wave strength corresponding to the second received wave signal $\lambda2$ are close to substantially the same peak value, and the ultrasonic waves received by the first ultrasonic sensor and the ultrasonic waves received by the second ultrasonic sensor have substantially the same strength.

In the ultrasonic wave measuring method as described above, if a substrate transmission signal, such as the attenuation factor of ultrasonic waves when transmitted through the substrate made of metal, or the thickness of the substrate, is grasped in advance, prior to measurement of the thickness of the coating material, and the thickness of the coating material is then calculated, based on the first received wave signal and second received wave signal of which the ultrasonic wave strength has substantially the same peak value, highly reliable, and highly accurate measurement can be achieved. Thus, the thickness of the coating material can be obtained with high accuracy, based on the first received wave signal and the second received wave signal.

In the ultrasonic measuring method according to the first aspect of the invention, a flat-type sensor that permits propagation of unfocused ultrasonic waves may be used as a third ultrasonic sensor, and the first ultrasonic sensor and the third ultrasonic sensor may be placed on the above-indicated one side of the coated product via the air layer, at positions where ultrasonic waves are regularly reflected between the first ultrasonic sensor and the third ultrasonic sensor, while the second ultrasonic sensor may be placed on the other side of the coated product, so as to face the first ultrasonic sensor in an axial direction thereof, through the coated product.

The above-mentioned "flat-type sensor that permits propagation of unfocused ultrasonic waves" is an ultrasonic sensor having a third vibration surface at which the third ultrasonic sensor receives ultrasonic waves, wherein the third vibration surface consists of a single vibration surface or two or more vibration surfaces (sections), and the overall shape of the third vibration surface is, for example, a rectangular shape, a circular shape, or the like. Also, the ultrasonic sensor is able to receive ultrasonic waves (reflected waves) on the third vibration surface sent from the first ultrasonic sensor and reflected by at least the coated product, via the air layer.

The ultrasonic measuring method as described above yields the following effects. For the coated product in which the opposite surfaces of the substrate are coated with the coating material, the thickness of the coating material on one surface of the substrate is measured based on a received signal produced by transverse waves of ultrasonic waves received by the third ultrasonic sensor, and the thickness of the coating material on the other surface of the substrate is measured at the same time, based on a received signal produced by longitudinal waves of ultrasonic waves received by the second ultrasonic sensor. Thus, the equipment for measuring the thickness of the coating material can be simplified.

Namely, before the measurement of the thickness of the coating material, the thickness of the substrate, or the basis weight of the substrate, is grasped in advance, based on a substrate transmission signal, such as the attenuation factor of ultrasonic waves when transmitted through the substrate made of metal, in a condition where the substrate is not coated with the coating material. In the ultrasonic measuring method as described above, ultrasonic waves sent from the first ultrasonic sensor are transmitted as transverse waves to the substrate via the coating material on one surface of the substrate, and are regularly reflected by the substrate, and the third ultrasonic sensor receives the reflected waves via the coating material on one surface of the substrate. Thus, the third ultrasonic sensor obtains a substrate reflection signal when receiving the reflected waves regularly reflected by one surface of the substrate, and determines the thickness of the coating material on one surface of the substrate, or the basis weight of the coating material on one surface of the substrate, based on the substrate reflection signal.

On the other hand, at the same time that ultrasonic waves are transmitted from the first ultrasonic sensor to the third ultrasonic sensor, ultrasonic waves sent from the first ultrasonic sensor are transmitted as longitudinal waves through the coating material on one surface of the substrate, the substrate, and the coating material on the other surface of the substrate, and the second ultrasonic sensor receives the transmitted waves that passed through the coated product including the coating material on the other surface of the substrate. Thus, the second ultrasonic sensor obtains a coated-product transmission signal when receiving the above-described transmitted waves. Then, the thickness of the coated product is calculated based on the coated-product transmission signal, and the thickness of the coating material on the other surface of the substrate is obtained by subtracting the thickness of the substrate, and the thickness of the coating material on one surface of the substrate, from the calculated thickness of the coated product.

In other words, the basis weight of the coated product is calculated based on the coated-product transmission signal, and the basis weight of the coating material on the other surface of the substrate is obtained by subtracting the basis weight of the substrate and the basis weight of the coating material on one surface of the substrate, from the calculated basis weight of the coated product. Accordingly, the thickness of the coating material on one surface of the substrate can be measured based on the received signal produced by transverse waves of ultrasonic waves received by the third ultrasonic sensor, and the thickness of the coating material on the other surface of the substrate can be measured at the same time, based on the received signal produced by longitudinal waves of ultrasonic waves received by the second ultrasonic sensor. Thus, the system or equipment for measuring the thickness of the coating material can be simplified.

In order to perform calibration on the first ultrasonic sensor through the third ultrasonic sensor, a sensor capable of sending and receiving ultrasonic waves is used as the third ultrasonic sensor, and the ultrasonic oscillation controller needs to be configured to control sending and receiving of ultrasonic waves between the first ultrasonic sensor and the third ultrasonic sensor, as well as sending and receiving of ultrasonic waves between the first ultrasonic sensor and the second ultrasonic sensor. The ultrasonic oscillation controller switches the sending side and the receiving side between the first ultrasonic sensor and the second ultrasonic sensor for calibration of the first and second ultrasonic sensors. Also, the ultrasonic oscillation controller switches the sending side and the receiving side between the first ultrasonic sensor and the third ultrasonic sensor for calibration of the first and third ultrasonic sensors.

In the ultrasonic measuring method according to the first aspect of the invention, the thickness of the coating material may be calculated based on an attenuation factor of ultrasonic waves received by a receiving-side ultrasonic sensor as one of the first ultrasonic sensor, the second ultrasonic sensor and the third ultrasonic sensor.

In the ultrasonic measuring method according to the first aspect of the invention, an ultrasonic wave blocking device may be provided for partially inhibiting propagation of ultrasonic waves between the first ultrasonic sensor and the second ultrasonic sensor. After the ultrasonic wave blocking device is moved to and placed at a position corresponding to an edge portion of the coating material and its periphery, between the coated product and the second ultrasonic sensor, the first ultrasonic sensor sends ultrasonic waves toward the edge portion of the coating material, and the second ultrasonic sensor receives the ultrasonic waves. As a result, vibrations transmitted to the periphery of the edge portion, as part of the ultrasonic waves transmitted from the first ultrasonic sensor toward the second ultrasonic sensor, are blocked by the ultrasonic wave blocking device, and are attenuated by a greater degree than vibrations transmitted through the edge portion, whereby the vibrations transmitted to the periphery of the edge portion are less likely or unlikely to reach the second ultrasonic sensor, or inhibited from reaching the second ultrasonic sensor.

In this connection, the thickness of the edge portion may vary from portion to portion, depending on the shape of the edge portion. If the thickness of the edge portion differs from portion to portion, the distance over which ultrasonic waves propagate through the edge portion differs from portion to portion; therefore, a received signal indicative of the attenuation factor of transmitted waves received by the second ultrasonic sensor varies in accordance with the shape of the edge portion. Thus, with the periphery of the edge portion covered with the ultrasonic wave blocking device, the shape of the edge portion of the coating material, such as the coating profile of the electrode paste, can be clearly detected in accordance with the thickness of the coating material, based on the received signal received by the second ultrasonic sensor.

In the ultrasonic measuring method according to the first aspect of the invention, a receiving-side ultrasonic sensor as one of the first ultrasonic sensor and the second ultrasonic sensor, which receives ultrasonic waves propagated through the air layer, may generate a plurality of sonic waveforms as time passes after receiving the ultrasonic waves. When the plurality of sonic waveforms includes a first sonic waveform that is detected first, and a second sonic waveform that is detected subsequent to the first sonic waveform, respective frequencies of the first ultrasonic sensor and the second ultrasonic sensor may be set to the lowest possible levels, according to the thickness of the coating material, under a condition that the second sonic waveform and the first sonic waveform do not overlap each other. With this arrangement, the attenuation of ultrasonic waves during transmission of the waves through the coating material can be reduced to a minimum, and the resolution of the received signal received by the receiving-side ultrasonic sensor can be improved. Consequently, the thickness of the coating material can be obtained with high accuracy.

Of the plurality of sonic waveforms detected by the receiving-side ultrasonic sensor, the first sonic waveform provides a received signal that consists solely of transmitted waves, namely, ultrasonic waves transmitted through the substrate and the coating material, and does not include echo that becomes noise. The second sonic waveform has echoes including a received signal produced by first reflected waves, and a received signal produced by second reflected waves, and may become noise to the received signal required for obtaining the thickness of the coating material. The first reflected waves are ultrasonic waves that are once reflected by the coated product without passing through the coated product, and then transmitted through the coated product and received. The second reflected waves are ultrasonic waves that are transmitted through the coated product, once reflected by the receiving-side ultrasonic sensor, and return to the coated product where the waves are reflected by the coated product and received. Accordingly, the thickness of the coating material is measured, under the condition that the first sonic waveform and the second sonic waveform do not overlap each other.

In the meantime, the substrate in the coated product is made of a metal having a large density, and ultrasonic waves are likely to propagate through the substrate even with a long wavelength and a low frequency. During propagation through the substrate, the ultrasonic waves are attenuated by a small degree, and the resolution obtained from the wavelength of the ultrasonic waves is good. On the other hand, even if the propagation distance of the ultrasonic waves is equal, the propagation time becomes longer as the frequency is lower, which may result in a phenomenon that the first sonic waveform overlaps the second sonic waveform.

For example, the coating material, such as an electrode paste, is made of a non-metal material having a lower density than the substrate. In this case, ultrasonic waves having a long wavelength and a low frequency are less likely to propagate through the coating material, as compared with the substrate, but ultrasonic waves having a short wavelength and a high frequency are likely to propagate through the coating material. On the other hand, if the frequency of ultrasonic waves transmitted through the coating material is raised to an excessively high level, the propagation time becomes shorter in the case where the propagation distance of the ultrasonic waves is equal, but the ultrasonic waves are attenuated by a larger degree when propagating through the coating material, and the resolution obtained from the wavelength of the ultrasonic waves deteriorates.

In the ultrasonic measuring method as described above, the respective frequencies of the first ultrasonic sensor and the second ultrasonic sensor are set to the lowest possible levels, according to the thickness of the coating material, under the condition that the second sonic waveform does not overlap the first sonic waveform. Thus, the attenuation of the ultrasonic waves during transmission through the coating material can be reduced to a minimum, and the resolution of the received signal received by the receiving-side ultrasonic sensor can be improved. Consequently, the thickness of the coating material can be obtained with high accuracy.

In the ultrasonic measuring method according to the first aspect of the invention, the thickness of the coating material may be calculated based on an attenuation factor of ultrasonic waves received by a receiving-side ultrasonic sensor as one of the first ultrasonic sensor and the second ultrasonic sensor. Therefore, the basis weight of the coating material can be obtained by subtracting the basis weight of the substrate corresponding to the attenuation factor of ultrasonic waves transmitted therethough, from the thickness of the coated product corresponding to the attenuation factor of ultrasonic waves transmitted therethrough. The attenuation factor of ultrasonic waves changes with the density of the medium and the thickness of the medium as parameters. Thus, the basis weight of the coating material can be obtained by subtracting the basis weight of the substrate from the basis weight of the coated product, based on a calibration curve indicating the relationship between the attenuation factor of ultrasonic waves when transmitted through the substrate and the basis weight of the substrate, and a calibration curve indicating the relationship between the attenuation factor of ultrasonic waves when transmitted through the coated product and the basis weight of the coated product.

Namely, in the case of the coated product in which the coating material is applied by coating to one surface of the substrate, the basis weight of the coated product (the substrate and the coating material) is obtained from an actual-measurement calibration curve for the coated product having one coated surface. Also, the basis weight of the substrate is obtained from an actual-measurement calibration curve for the substrate. Thus, the basis weight of the coating material can be easily obtained from a difference between the basis weight of the coated product and the basis weight of the substrate.

Also, in the case of the coated product in which the coating material is applied by coating to both surfaces of the substrate, the basis weight of the substrate is obtained from an actual-measurement calibration curve for the substrate. Meanwhile, the basis weight of the coated product in which the coating material is applied by coating to one surface of the substrate is obtained from a one-side-coating actual-measurement calibration curve for the coated product having one coated surface. Then, the basis weight of the coating material on one surface of the substrate is obtained by subtracting the thickness of the substrate from the thickness of the coated product.

The basis weight of the coated product in which the coating material is applied by coating to both surfaces of the substrate is obtained from a both-side-coating actual-measurement calibration curve for the coated product having both coated surfaces, and the basis weight of the coating material on the other surface of the substrate is obtained by subtracting the basis weight of the substrate and the basis weight of the coating material on one surface of the substrate, from the basis weight of the coated product. Thus, the basis weight of the coating material can be easily obtained from a difference between the basis weight of the coated product and the basis weight of the substrate.

In the ultrasonic measuring method as described above, where the first ultrasonic sensor has a first vibration surface at which ultrasonic vibrations occur, and the second ultrasonic sensor has a second vibration surface at which ultrasonic vibrations occur, the first ultrasonic sensor and the second ultrasonic sensor may be positioned, with the coated product interposed therebetween, such that the distance between the first vibration surface and the second vibration surface as measured in a vertical direction is equal to or smaller than 100 mm, and the thickness of the coating material may be measured when the second sonic waveform has the maximum amplitude. Since the thickness of the coating material is measured when the second waveform has the maximum amplitude, the coated product that is being produced on the production line is located exactly at the middle position between the first ultrasonic sensor and the second ultrasonic sensor, during the measurement, and no undulation is found in the substrate that was wound in the form of a roll. Thus, the operator can make sure that the substrate is coated with the coating material in a good condition.

Namely, while the plurality of sonic waveforms are detected at certain intervals of time with the passage of time after the receiving-side ultrasonic sensor receives the ultrasonic waves, the first sonic waveform, as one of the plurality of sonic waveforms detected by the receiving-side ultrasonic sensor, provides a received signal that consists solely of the transmitted waves transmitted through the substrate and the coating material, and does not include echo that becomes noise. In particular, when the distance between the first vibration surface of the first ultrasonic sensor and the second vibration surface of the second ultrasonic sensor is 100 mm or smaller, odd-numbered sonic waveforms subsequent to the first sonic waveform have the same or similar tendency as the first sonic waveform; however, after transmission, the ultrasonic wave strength is reduced as the propagation distance becomes longer, and the attenuation of the ultrasonic waves increases. Therefore, it is appropriate to use the received signal having the first sonic waveform, for determining the thickness of the coating material. Also, the second sonic waveform has echoes including both the received signal produced by the first reflected waves and the received signal produced by the second reflected waves, as described above, and becomes noise to the received signal required to obtain the thickness of the coating material.

Here, the relationship between the position at which the coated product is placed between the first ultrasonic sensor and the second ultrasonic sensor, and the second sonic waveform, will be described. (a) When the coated product is located exactly at the middle position between the first ultrasonic sensor and the second ultrasonic sensor, the first reflected waves and the second reflected waves are synthesized with the same period, to produce the second sonic waveform in which the amplitude of the synthesized waves is at a maximum. (b) When the coated product is located a little closer to one side relative to the middle position between the first ultrasonic sensor and the second ultrasonic sensor, the first reflected waves and the second reflected waves, which are out of phase, interfere with each other, to produce the second sonic waveform of which the amplitude is at a minimum when the phase of the first reflected waves is shifted by a half of the period from that of the second reflected waves. (c) When the coated product is located largely closer to one side relative to the middle position between the first ultrasonic sensor and the second ultrasonic sensor, the phase of the first reflected waves is completely shifted from the phase of the second reflected waves, to produce the second sonic waveform in which the first reflected waves and the second reflected waves provide two separate sections in the waveform. In any of the cases (a) through (c) as described above, the received signal having the first sonic waveform consists solely of the transmitted waves, namely, the ultrasonic waves transmitted through the substrate and the coating material, and is not influenced by multiple reflected waves, or the first reflected waves and the second reflected waves.

In the ultrasonic measuring method as described above, the thickness of the coating material is measured when the distance between the first vibration surface of the first ultrasonic sensor and the second vibration surface of the second ultrasonic sensor is equal to or smaller than 100 mm, and the second sonic waveform has the maximum amplitude. Accordingly, the coated product that is being produced on the production line is disposed exactly at the middle position between the first ultrasonic sensor and the second ultrasonic sensor, during the measurement, and no undulation is found in the substrate that was wound in the form of a roll. Thus, the operator can make sure that the substrate that is in a good condition is coated with the coating material.

In the ultrasonic measuring method as described above, the thickness of the coating material may be measured based on a received signal having the first sonic waveform. Thus, the thickness of the coating material can be measured, by removing a factor of measurement errors, such as undulation remaining in the substrate that was wound in the form of a roll.

An ultrasonic measuring system for measuring a thickness of a coating material applied by coating to one surface or both surfaces of a substrate made of a metal so as to provide a coated product, according to a second aspect of the invention, has a pair of first ultrasonic sensor and second ultrasonic sensor. In the ultrasonic measuring system, the first ultrasonic sensor is placed on one side of the coated product, as viewed in a thickness direction of the coated product, via an air layer, while the second ultrasonic sensor is placed on the other side of the coated product, via an air layer, and the thickness of the coating material is measured by transmitting ultrasonic waves between the first ultrasonic sensor and the second ultrasonic sensor. The first ultrasonic sensor is a flat-type transmitting sensor that permits propagation of unfocused ultrasonic waves, and the second ultrasonic sensor is a flat-type receiving sensor that permits propagation of unfocused ultrasonic waves. Thus, in the battery production process, for example, when the thickness of the coating material, or the basis weight and coating profile of the coating material, is measured in the production line in which the electrode (coated product) is produced by coating the metal foil (substrate) with the electrode paste (coating material), ultrasonic waves are transmitted from the first ultrasonic sensor to the coated product so that a wide area of the coated product is irradiated with the ultrasonic waves, and are transmitted through the substrate and the coating material in the coated product. Then, the second ultrasonic sensor receives the ultrasonic waves (transmitted waves) transmitted through the substrate and the coating material over wide regions thereof, so that a received signal for determining the thickness of the coating material can be obtained over a wide range of the coated product.

Namely, in the ultrasonic measuring system according to the second aspect of the invention, the second ultrasonic sensor provides the received signal for determining the thickness of the coating material, over a wider range of the coated product, as compared with the spot-type ultrasonic sensor, and the quality check regarding the thickness of the coating material, or the basis weight and coating profile of the electrode paste, can be performed on the production line of the coated product. In particular, when the quality check, such as measurements of the basis weight and coating profile of the coating material, is desired to be performed evenly over a wide range on the production line, with respect to the coated product produced on the production line, the thickness of the coating material can be measured online for all coated products that are successively produced on the production line.

Since the received signal representing the transmitted waves received by the second ultrasonic sensor can be obtained from a wide region of the coated product, the thickness of the coating material can be detected over a wider range of the coated product. Therefore, variations in the thickness of the coating material within the measurement range can be correctly or accurately grasped, and the overall thickness of the coating material, or the basis weight of the coating material, within a given range of the coated product can be measured with high reliability. Thus, since the thickness of the coating material can be detected over a wider range in the coated product, the coating profile of the coating material can be measured with improved accuracy, as compared with measurement methods of the related art using the radiation measuring system, or the spot-type ultrasonic sensor as disclosed in JP-A-2008-102160.

In the quality check of the related art in which a difference in weight between a sample that has not been coated with the electrode paste and a sample coated with the electrode paste is measured, the basis weight and coating profile of the electrode paste cannot be accurately determined. Furthermore, the quality check is conducted outside the production line, using samples of electrodes taken out of the production line; therefore, an extra or additional step for performing the quality check is required, resulting in increased cost. Also, the quality check using the radiation measuring system suffers from excessively high equipment cost since the radiation measuring system is considerably expensive.

In the ultrasonic measuring system of the second aspect, on the other hand, the production line for producing the coated product need not be stopped, and the quality check can be performed during operation of the line; therefore, an extra or additional step for performing the quality check is not required, and the cost will not be increased. Also, the equipment cost of the ultrasonic measuring system is lower than that of the radiation measuring system, and the cost reflected by the coated product can be largely reduced.

In particular, the ultrasonic measuring system of the second aspect can be easily incorporated into the production line for producing the coated product, no matter whether the system is newly installed or has already been installed; therefore, the ultrasonic measuring system can be installed at low cost in the production line. Accordingly, the ultrasonic measuring system of the second aspect produces an excellent effect that the thickness of the coating material in the coated product can be measured on the production line, at low cost, with high reliability and high measuring accuracy.

The ultrasonic measuring system according to the second aspect of the invention may further include an ultrasonic oscillation controller that controls sending and receiving of ultrasonic waves, between the first ultrasonic sensor and the second ultrasonic sensor, and the first ultrasonic sensor and the second ultrasonic sensor may be capable of sending and receiving ultrasonic waves. Where the first ultrasonic sensor and the second ultrasonic sensor are in a first condition when the first ultrasonic sensor sends ultrasonic waves, and the second ultrasonic sensor receives the ultrasonic waves, and are in a second condition when the second ultrasonic sensor sends ultrasonic waves, and the first ultrasonic sensor receives the ultrasonic waves, the ultrasonic oscillation controller may switch the first ultrasonic sensor and the second ultrasonic sensor between the first condition and the second condition, so that the first ultrasonic sensor operates differently from the second ultrasonic sensor. With this arrangement, the thickness of the coating material can be determined with high accuracy, assuring improved measuring reliability, based on two types of received wave signals, namely, a second received wave signal representing waves received by the second ultrasonic sensor when the system is in the first condition, and a first received wave signal representing waves received by the first ultrasonic sensor when the system is in the second direction.

If the thickness of the coating material is obtained based on a received wave signal representing waves received by only one ultrasonic sensor, it is difficult for the operator to determine whether the received wave signal was obtained in normal conditions at the time of measurement, and the measurement lacks reliability. On the other hand, in the ultrasonic measuring system as described above, the ultrasonic oscillation controller switches the first ultrasonic sensor and the second ultrasonic sensor between the first condition and the second condition so that the first ultrasonic sensor operates differently from the second ultrasonic sensor. With this arrangement, when the thickness of the coating material is obtained in view of changes in the temperature of the air during measurement, the thickness can be measured based on two types of received signals, i.e., the second received wave signal ($\lambda 2$) of ultrasonic waves received by the second ultrasonic sensor when the system is in the first condition, and the first received wave signal ($\lambda 1$) of ultrasonic waves received by the first ultrasonic sensor when the system is in the second condition.

By using the first received wave signal and the second received wave signal, the operator can determine that the received wave signals were obtained in normal conditions at the time of measurement, if the first received wave signal and the second received wave signal have a relationship that $\lambda 1 \approx \lambda 2$. Consequently, the thickness of the coating material can be measured with high accuracy and high reliability.

The ultrasonic measuring system according to the second aspect of the invention may further include a third ultrasonic sensor that is a flat-type sensor that permits propagation of unfocused ultrasonic waves, and the first ultrasonic sensor and the third ultrasonic sensor may be placed on the above-indicated one side of the coated product via the air layer, at positions where ultrasonic waves are regularly reflected between the first ultrasonic sensor and the third ultrasonic sensor, while the second ultrasonic sensor may be placed on the other side of the coated product so as to face the first ultrasonic sensor in an axial direction thereof, through the coated product. With this arrangement, for the coated product in which the opposite surfaces of the substrate are coated with the coating material, the thickness of the coating material on one surface of the substrate is measured based on a received signal produced by transverse waves of the ultrasonic waves received by the third ultrasonic sensor, and the thickness of the coating material on the other surface of the substrate is measured at the same time, based on a received signal produced by longitudinal waves of the ultrasonic waves received by the second ultrasonic sensor. Thus, the equipment for measuring the thickness of the coating material can be simplified.

Namely, before the measurement of the thickness of the coating material, the thickness, or the basis weight, of the substrate that has not been coated with the coating material is grasped in advance, based on a substrate transmission signal, such as the attenuation factor of ultrasonic waves when transmitted through the substrate made of a metal. In the ultrasonic measuring system as described above, ultrasonic waves sent from the first ultrasonic sensor are transmitted as transverse waves to the substrate via the coating material on one surface of the substrate, and are regularly reflected by the substrate, and the third ultrasonic sensor receives the reflected waves via the coating material on one surface of the substrate. Thus, the third ultrasonic sensor obtains a substrate reflection signal when receiving the reflected waves regularly reflected by one surface of the substrate, and determines the thickness, or basis weight, of the coating material on one surface of the substrate, based on the substrate reflection signal.

On the other hand, at the same time that ultrasonic waves are transmitted from the first ultrasonic sensor to the third ultrasonic sensor, ultrasonic waves sent from the first ultrasonic sensor are transmitted as longitudinal waves through the coating material on one surface of the substrate, the substrate, and the coating material on the other surface of the substrate, and the second ultrasonic sensor receives the transmitted waves that passed through the coated product including the coating material on the other surface of the substrate. Thus, the second ultrasonic sensor obtains a coated-product transmission signal when receiving the above-described transmitted waves, and the thickness of the coated product is calculated based on the coated-product transmission signal. Then, the thickness of the coating material on the other surface of the substrate is obtained by subtracting the thickness of the substrate and the thickness of the coating material on one surface of the substrate, from the calculated thickness of the coated product.

In other words, the basis weight of the coated product is calculated based on the coated-product transmission signal, and the basis weight of the coating material on the other surface of the substrate is obtained by subtracting the basis weight of the substrate and the basis weight of the coating material on one surface of the substrate, from the calculated basis weight of the coated product. Accordingly, the thickness of the coating material on one surface of the substrate can be measured based on the received signal produced by transverse waves of ultrasonic waves received by the third ultrasonic sensor, and the thickness of the coating material on the other surface of the substrate can be measured at the same time, based on the received signal produced by longitudinal waves of ultrasonic waves received by the second ultrasonic sensor. Thus, the system or equipment for measuring the thickness of the coating material can be simplified.

In order to perform calibration on the first ultrasonic sensor through the third ultrasonic sensor, a sensor capable of sending and receiving ultrasonic waves is used as the third ultrasonic sensor, and the ultrasonic oscillation controller needs to be configured to control sending and receiving of ultrasonic waves between the first ultrasonic sensor and the third ultrasonic sensor, as well as sending and receiving of ultrasonic waves between the first ultrasonic sensor and the second ultrasonic sensor. The ultrasonic oscillation controller switches the sending side and the receiving side between the first ultrasonic sensor and the second ultrasonic sensor for calibration of the first and second ultrasonic sensors. Also, the ultrasonic oscillation controller switches the sending side and the receiving side between the first ultrasonic sensor and the third ultrasonic sensor for calibration of the first and third ultrasonic sensors.

The ultrasonic measuring system according to the second aspect of the invention may further include a thickness computing unit that calculates the thickness of the coating material, based on an attenuation factor of ultrasonic waves received by a receiving-side ultrasonic sensor as one of the first ultrasonic sensor, the second ultrasonic sensor and the third ultrasonic sensor.

The ultrasonic measuring system according to the second aspect of the invention may further include an ultrasonic wave blocking device that partially inhibits propagation of ultrasonic waves between the first ultrasonic sensor and the second ultrasonic sensor. In the ultrasonic measuring system, the first ultrasonic sensor sends ultrasonic waves, while the second ultrasonic sensor receives the ultrasonic waves sent from the first ultrasonic sensor, and the ultrasonic wave blocking device is movable to a position corresponding to an edge portion of the coating material and its periphery, between the coated product and the second ultrasonic sensor. With the ultrasonic wave blocking device thus placed at the above-indicated position, vibrations transmitted to the periphery of the edge portion, as part of the ultrasonic waves transmitted from the first ultrasonic sensor toward the second ultrasonic sensor, are blocked by the ultrasonic wave blocking device, and are attenuated by a larger degree than vibrations transmitted through the edge portion, whereby the vibrations are less likely or unlikely to reach the second ultrasonic sensor.

In this connection, the thickness of the edge portion may vary from portion to portion, depending on the shape of the edge portion. If the thickness of the edge portion differs from portion to portion, the distance over which ultrasonic waves propagate through the edge portion differs from portion to portion; therefore, a received signal indicative of the attenuation factor of transmitted waves received by the second ultrasonic sensor varies in accordance with the shape of the edge portion. Thus, with the periphery of the edge portion covered with the ultrasonic wave blocking device, the shape of the edge portion of the coating material, such as the coating profile of the electrode paste, can be clearly detected in accordance with the thickness of the coating material, based on the received signal received by the second ultrasonic sensor.

The ultrasonic wave blocking device may be formed of a material, such as rubber, sponge, or felt, which is likely to absorb ultrasonic vibrations.

In the ultrasonic measuring system according to the second aspect of the invention, a receiving-side ultrasonic sensor as one of the first ultrasonic sensor and the second ultrasonic sensor, which receives ultrasonic waves propagated through the air layer, may generate a plurality of sonic waveforms as time passes after receiving the ultrasonic waves, the plurality of sonic waveforms including a first sonic waveform that is detected first, and a second sonic waveform that is detected subsequent to the first sonic waveform, and respective frequencies of the first ultrasonic sensor and the second ultrasonic sensor may be set to the lowest possible levels, according to the thickness of the coating material, under a condition that the second sonic waveform does not overlap the first sonic waveform. Therefore, the attenuation of ultrasonic waves during transmission of the waves through the coating material can be reduced to a minimum, and the resolution of the received signal received by the receiving-side ultrasonic sensor can be improved. Consequently, the thickness of the coating material can be obtained with high accuracy.

The ultrasonic measuring system according to the second aspect of the invention may further include a thickness computing unit that calculates the thickness of the coating material, based on an attenuation factor of ultrasonic waves received by a receiving-side ultrasonic sensor as one of the first ultrasonic sensor and the second ultrasonic sensor. Therefore, the thickness computing unit is able to obtain the basis weight of the coating material, by subtracting the basis weight of the substrate corresponding to the attenuation factor of ultrasonic waves transmitted therethrough, from the basis weight of the coated product corresponding to the attenuation factor of ultrasonic waves transmitted therethrough. The attenuation factor of ultrasonic waves varies with parameters, such as the density of a medium through which the ultrasonic waves propagate, and the thickness of the medium. Thus, the basis weight of the coating material can be obtained by subtracting the basis weight of the substrate from the basis weight of the coated product, based on a calibration curve regarding the attenuation factor of ultrasonic waves when transmitted through the substrate and the basis weight of the substrate, and a calibration curve regarding the attenuation factor of ultrasonic waves when transmitted through the coated product and the basis weight of the coated product.

In the ultrasonic measuring system as described above, in which the first ultrasonic sensor has a first vibration surface at which ultrasonic vibrations occur, and the second ultrasonic sensor has a second vibration surface at which ultrasonic vibrations occur, the first ultrasonic sensor and the second ultrasonic sensor may be positioned, with the coated product interposed therebetween, such that a distance between the first vibration surface and the second vibration surface as measured in a vertical direction is equal to or smaller than 100 mm, and the thickness computing unit may measure the thickness of the coating material when the second sonic waveform has the maximum amplitude. Since the thickness computing unit measures the thickness of the coating material in a condition where the second sonic waveform has the maximum amplitude, the coated product produced on the production line is located exactly at the middle position between the first ultrasonic sensor and the second ultrasonic sensor, during the measurement. Therefore, the operator can make sure that no undulation remains in the substrate that was wound in the form of a roll, and that the substrate is coated with the coating material in a good condition, in the coated product of which the thickness of the coating material is obtained by the thickness computing unit.

In the ultrasonic measuring system as described above, the thickness computing unit may measure the thickness of the coating material, based on a received signal having the first sonic waveform. It is thus possible to measure the thickness of the coating material, by removing a factor of measurement errors, such as undulation of the substrate that was wound in the form of a roll.

In the ultrasonic measuring system disclosed in JP-A-2008-102160, as shown in FIG. 22, the temperature measuring means 84a, 84b measure the respective temperatures of the solid phase 92 and the liquid phase 91, and the velocity correcting means 85 detects the acoustic impedance of the liquid phase 91 and solid phase 92 as one medium through which ultrasonic waves propagate, based on the respective temperatures thus measured, and corrects the propagation velocity of ultrasonic waves obtained by the propagation time measuring means 83. The propagation path length measuring means 86 is adapted to measure the thickness of the measurement object 90, and the position of a phase change in the measurement object 90 in which the liquid phase 91 and the solid phase 92 are laminated on each other, based on the propagation velocity of ultrasonic waves obtained by the propagation time measuring means 83, and a correction value of the propagation velocity by which the propagation velocity is corrected by the velocity correcting means 85.

The ultrasonic waves transmitted from the ultrasonic transmitting means 81 toward the measurement object 90, and the ultrasonic waves reflected by the measurement object 90 and received by the ultrasonic receiving means 82, propagate through an air layer as one medium other than the measurement object 90. If the temperature of the air layer is not constant, the acoustic impedance in the air layer varies with changes in the temperature, and the wavelength of the ultrasonic waves propagated through the air layer changes. As a result, the thickness of the measurement object 90, etc. cannot be accurately measured even if the propagation velocity of ultrasonic waves obtained by the propagation time measuring means 83 is corrected by the velocity correcting means 85.

In particular, when a coated product is placed in an air layer between a sending-side ultrasonic sensor and a receiving-side ultrasonic sensor, and the thickness of a coating material within the coated product is measured, the temperature (density) of the air layer may differ between the sending side and the receiving side, due to air convection in the air layer. Also, when coated products are successively produced or manufactured on a production line in operation, the density of the air layer may locally change, due to slight air convection in the air layer which occurs when the coated products locally and slightly moves on the production line, or air convection in the air layer which occurs when the operator moves in the vicinity of the production line, for example. In such cases, if the density of the air layer as one medium through which ultrasonic waves propagate differs between a portion where the thickness is measured by the ultrasonic sensors, and the other portions, the thickness of the coating material cannot be accurately measured.

In the case where a coated product is placed in an air layer between a sending-side ultrasonic sensor and a receiving-side ultrasonic sensor, and the thickness of a coating material within the coated product is measured, if some external vibrations are transmitted from the outside to the receiving-side ultrasonic sensor while transmitted waves passed through the coated product or reflected waves reflected by the coated product are received by the receiving-side ultrasonic sensor, the transmitted waves or the reflected waves may be combined with the external vibrations. If the receiving-side ultrasonic sensor receives the resultant composite waves, there arises a difference between the wavelength of the ultrasonic waves transmitted from the sending-side ultrasonic sensor without being influenced by external vibrations, and the wavelength of the composite waves received by the receiving-side ultrasonic sensor, which may result in deterioration of receiving sensitivity.

In view of the above problems, the ultrasonic measuring system according to the second aspect of the invention may further include an air convection suppressing device that suppresses changes in the density of the air layer. With this arrangement, when the thickness of the coating material, or the basis weight and coating profile of the coating material applied by coating, is/are measured on the production line of the coated product, the wavelength of ultrasonic waves that propagate through the air layer is less likely or unlikely to vary, due to the presence of the air convection suppressing device, and the thickness of the coating material can be measured with improved accuracy.

As described above, in the battery production process, for example, the electrode (coated product) is produced by applying the electrode paste (coating material) by coating to the metal foil (substrate) and drying the electrode paste, under an atmosphere whose temperature is controlled, on the production line for producing the electrode, and the ultrasonic measuring system of the aspect is installed as an in-line system in the production line, under the temperature-controlled atmosphere. Since the production line is installed at a location where the temperature is suitably controlled, the temperatures of the substrate and the coating material may be regarded as not changing but being constant during operation of the line, with respect to the coated products successively produced on the production line. Therefore, when ultrasonic waves are transmitted through the substrate and the coating material, during operation of the line, the acoustic impedance in the substrate and the coating material does not change, and no influence arises from the respective temperatures of the substrate and the coating material, during measurement of the thickness of the coating material.

On the other hand, the ultrasonic measuring system according to the second aspect of the invention has the first ultrasonic sensor placed on one side of the coated product via the air layer, and the second ultrasonic sensor placed on the other side of the coated product via the air layer, and measures the thickness of the coating material, by transmitting ultrasonic waves between the first ultrasonic sensor and the second ultrasonic sensor. Although the ultrasonic measuring system is installed under the temperature-controlled atmosphere, air convection occurs in the installation room or space; therefore, at least one air convection suppressing device is provided for suppressing or preventing changes in the density of air, in the air layer of the ultrasonic measuring system. With this arrangement, substantially no variations in the temperature of air due to convection of gas, such as air, appear in the air layer of the ultrasonic measuring system, and a uniform temperature distribution can be established in the air layer as a whole. Namely, substantially no variations in temperature appear between the first ultrasonic sensor and the coated product, between the coated product and the second ultrasonic sensor, between the third ultrasonic sensor, if any, and the coated product, and between the opposite sides of the coated product. In other words, there are substantially no temperature differences in the air layer as a whole.

Since the uniform temperature distribution is established in the air layer as a whole, the velocity of sound in the air, which changes in proportion to the temperature, becomes constant over the entire volume of the air layer, according to Eq. 2 as indicated above, and the density of the air which varies in proportion to the temperature also becomes constant over the entire volume of the air layer, according to Eq. 3 as indicated above. Also, according to Eq. 2 through Eq. 4 as indicated above, the acoustic impedance does not change because the uniform temperature distribution is established in the air layer as a whole.

In other words, if a uniform temperature distribution is established over the entire volume of the air layer, and the density of the air is also uniformly distributed, the acoustic impedance and the density can be regarded as constants corresponding to temperature changes, in Eq. 5 as indicated above, and the wavelength $\lambda$ is inversely proportional to the frequency f. As described above, the first ultrasonic sensor has a frequency f1(f) as a specific characteristic value, and the second ultrasonic sensor has a frequency f2(f) as a specific characteristic value, while the third ultrasonic sensor has a frequency f3(f) as a specific characteristic value. In the air layer between the first ultrasonic sensor and the coated product, the wavelength $\lambda 1$ of ultrasonic waves transmitted from the first ultrasonic sensor of frequency f1(f) does not change. When the system includes the third ultrasonic sensor, the wavelength $\lambda 3$ of ultrasonic waves transmitted from the third ultrasonic sensor of frequency f3(f) does not change, in the air layer between the third ultrasonic sensor and the coated product. In the air layer between the coated product and the second ultrasonic sensor, the wavelength $\lambda 2$ of ultrasonic waves transmitted from the second ultrasonic sensor does not change.

In particular, while the thickness of the coating material is continuously measured, for the coated products successively produced, on the production line in which the ultrasonic measuring system is installed as an in-line system, the wavelength of transmitted waves (ultrasonic waves) transmitted through the coating material and received by the second ultrasonic sensor, and the wavelength of reflected waves (ultrasonic waves) reflected by the coating material and received by the third ultrasonic sensor, undergo substantially no changes, during operation of the line.

In ultrasonic sensors, there is generally a certain correlation between the magnitude of received power of ultrasonic waves (ultrasonic wave strength) and the wavelength of received ultrasonic waves, as a characteristic of sonic propagation. The ultrasonic wave strength changes along a normal distribution curve having a peak value at a given wavelength. If the wavelength shifts to be a little shorter or longer than the given wavelength corresponding to the peak value, the ultrasonic wave strength is reduced from the peak value.

In the ultrasonic measuring system as described above, the wavelength at which the ultrasonic wave strength becomes the above-indicated peak value is maintained without being changed, so that ultrasonic waves transmitted from the first ultrasonic sensor propagate through the air layer, toward the coated product, in a condition where the ultrasonic wave strength is at a maximum. As a result, the transmitted waves (ultrasonic waves) transmitted through the coated product also propagate through the coated product while the ultrasonic wave strength is at a maximum, and the ultrasonic waves then propagate from the coated product through the air layer, and are received by the second ultrasonic sensor while the ultrasonic wave strength is at a maximum.

With regard to the reflected waves (ultrasonic waves) reflected by the coated product, too, the ultrasonic waves are transmitted to the coated product through the air layer, reflected by the coated product, transmitted through the air layer again, and received by the third ultrasonic sensor, while the ultrasonic wave strength is at a maximum. Accordingly, if the thickness of the coating material of the coated product is measured based on received signals, such as the wavelength of the received ultrasonic waves, the time it takes the ultrasonic waves to reach the third ultrasonic sensor, the attenuation factor, etc., measurement errors in thickness are less likely or unlikely to occur, for each coated product, or for each measurement region of the coated product, and the thickness of the coating material can be measured at high accuracy.

In the ultrasonic measuring system as described above, in which the substrate has long sides that extend in a longitudinal direction and have a long length, and short sides that extend in a width direction, at least one pair of the first ultrasonic sensor and the second ultrasonic sensor may be provided inside the air convection suppressing device, and arranged in the width direction parallel to the short sides of the substrate, and the air convection suppressing device may be movable in the longitudinal direction parallel to the long sides of the substrate and in the width direction, within a measurement area in which the thickness of the coating material is obtained. Therefore, on the production line in which the ultrasonic measuring system is installed as an in-line system, the thickness of the coating material can be measured during operation of the production line, without stopping the line, for the coated products that are continuously and successively produced. Also, quality check, such as measurement of the basis weight and coating profile of the coating material, can be carried out evenly over a wide range on the production line. Thus, highly reliable quality check can be conducted for quality control.

In the ultrasonic measuring system as described above, the air convection suppressing device may be provided with at least one temperature measuring device that measures the temperature of the air layer. Therefore, even when a temperature change occurs in the air layer, due to heat generated from any of the first through third ultrasonic sensors, for example, the sound velocity, density, and acoustic impedance in the air layer are corrected based on the temperature(s) measured by the temperature measuring device(s), and the received signal of the receiving-side ultrasonic sensor that receives ultrasonic waves propagated through the air layer can be brought into an appropriate condition so as to correspond to the actual temperature or temperature distribution of the air layer. Thus, the thickness of the coating material can be obtained with improved measuring accuracy.

In the ultrasonic measuring system as described above, the air convection suppressing device may include a vibration isolating device that inhibits external vibrations from being transmitted from a ground to the first ultrasonic sensor and the second ultrasonic sensor. Therefore, mechanical vibrations that occur in the production line of the coated product, for example, are prevented from being transmitted to the first ultrasonic sensor and the second ultrasonic sensor, and, if any, the third ultrasonic sensor, and otherwise possible deterioration of the accuracy in the directivity of the ultrasonic waves transmitted or received can be prevented.

In the ultrasonic measuring system according to the second aspect of the invention, the substrate may be a metal foil used in an electrode of a battery as the coated product, and the coating material may be an electrode paste applied by coating to the metal foil. In the battery production process, therefore, the quality check regarding the basis weight and coating profile of the electrode paste can be conducted evenly over a wide range of the electrode, on the production line for producing the electrode by coating the metal foil with the electrode paste, during operation of the line. Furthermore, the quality check can be performed on all of the electrodes produced on the line, so that high-quality, high-performance batteries can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Some embodiments of ultrasonic measuring methods and ultrasonic measuring systems of the present invention will be described in detail with reference to the drawings. The ultrasonic measuring system of each embodiment is installed as an in-line system on an electrode production line where electrode paste (coating material) is applied by coating to a metal foil (substrate) to produce electrodes (coated products). The ultrasonic measuring system is installed for the purpose of performing quality check or inspection on the basis weight (or coating weight) and coating profile of the electrode paste that is dried. The ultrasonic measuring method of each embodiment is a method for performing quality check on the basis weight and coating profile of the electrode paste, using the above-mentioned ultrasonic measuring system.

Figure 1:
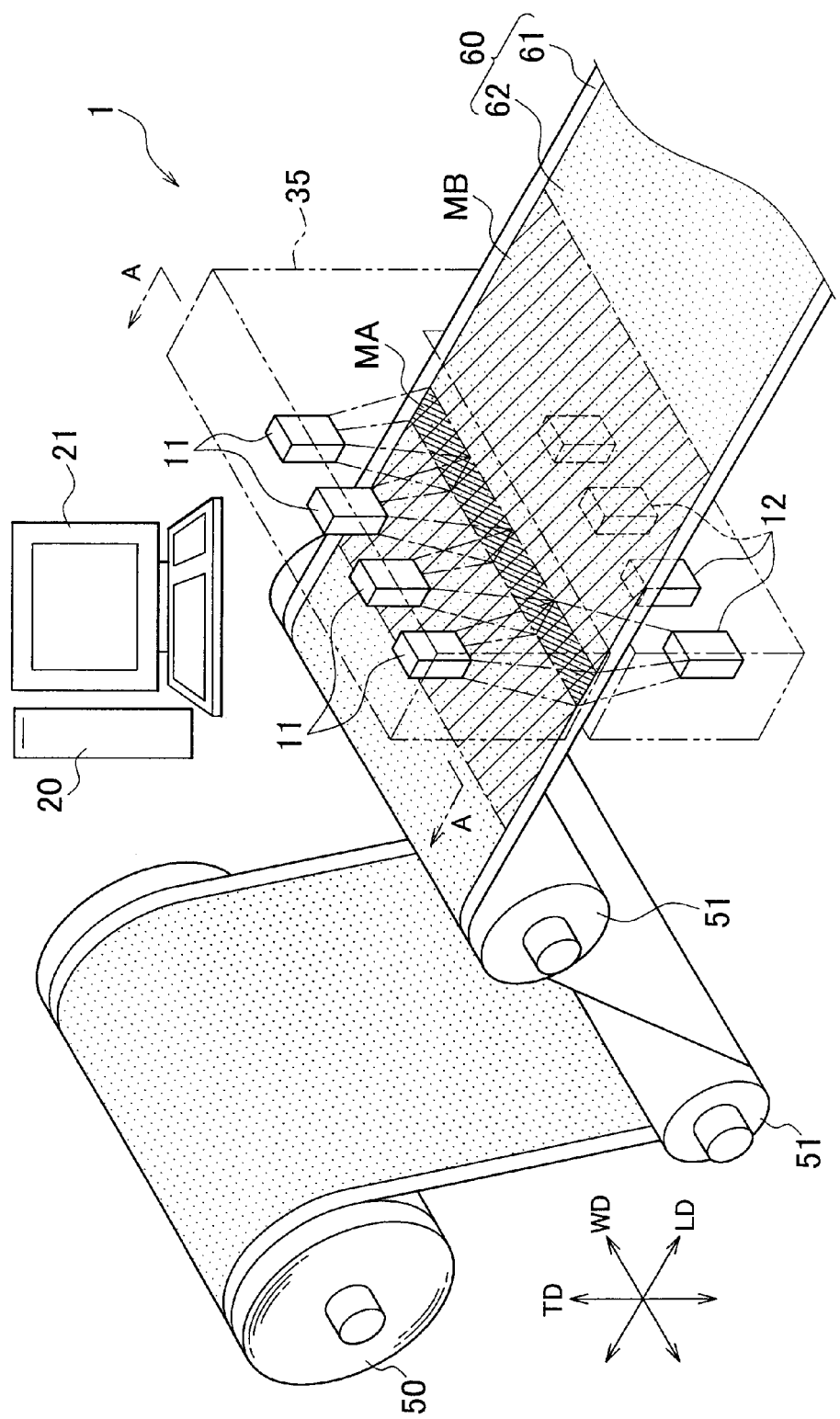
FIG. 1 is a perspective view showing an ultrasonic measuring system according to a first embodiment of the invention.
Figure 2:
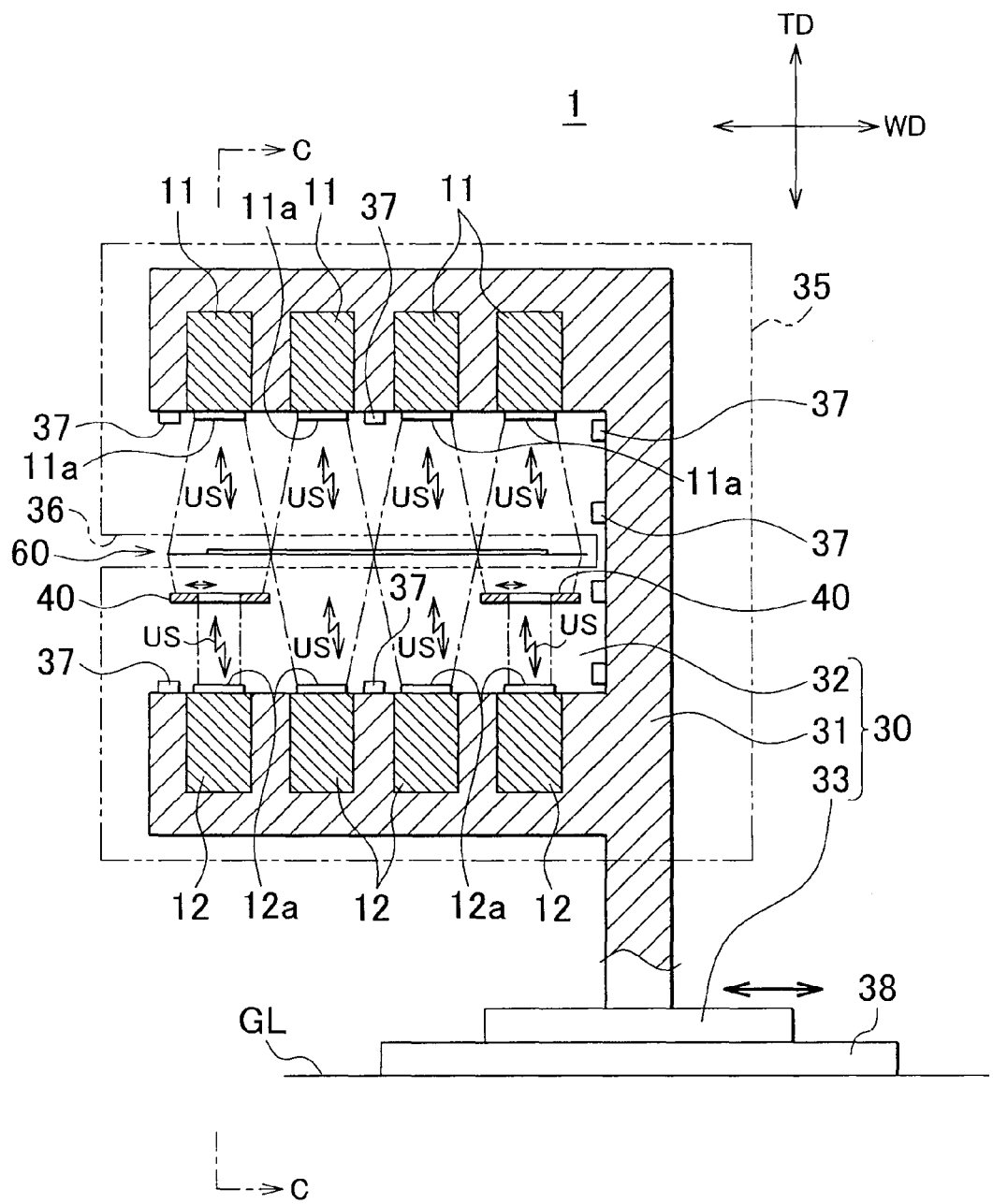
FIG. 2 is a cross-sectional view as seen in a direction of arrows A-A in FIG. 1, showing a principal portion of the ultrasonic measuring system of FIG. 1.
Figure 3:
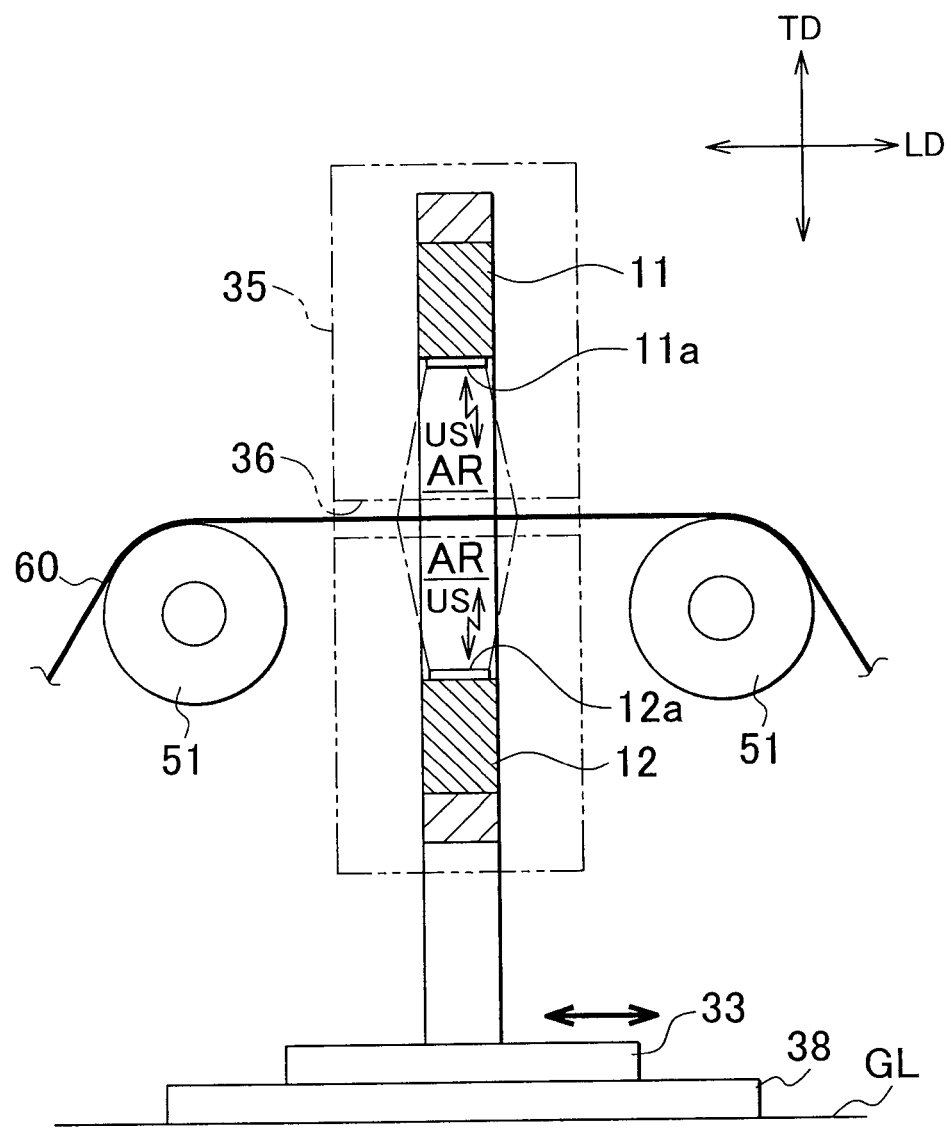
FIG. 3 is a cross-sectional view as seen in a direction of arrows C-C in FIG. 2, showing the principal portion of the ultrasonic measuring system of FIG. 1.
Figure 4:
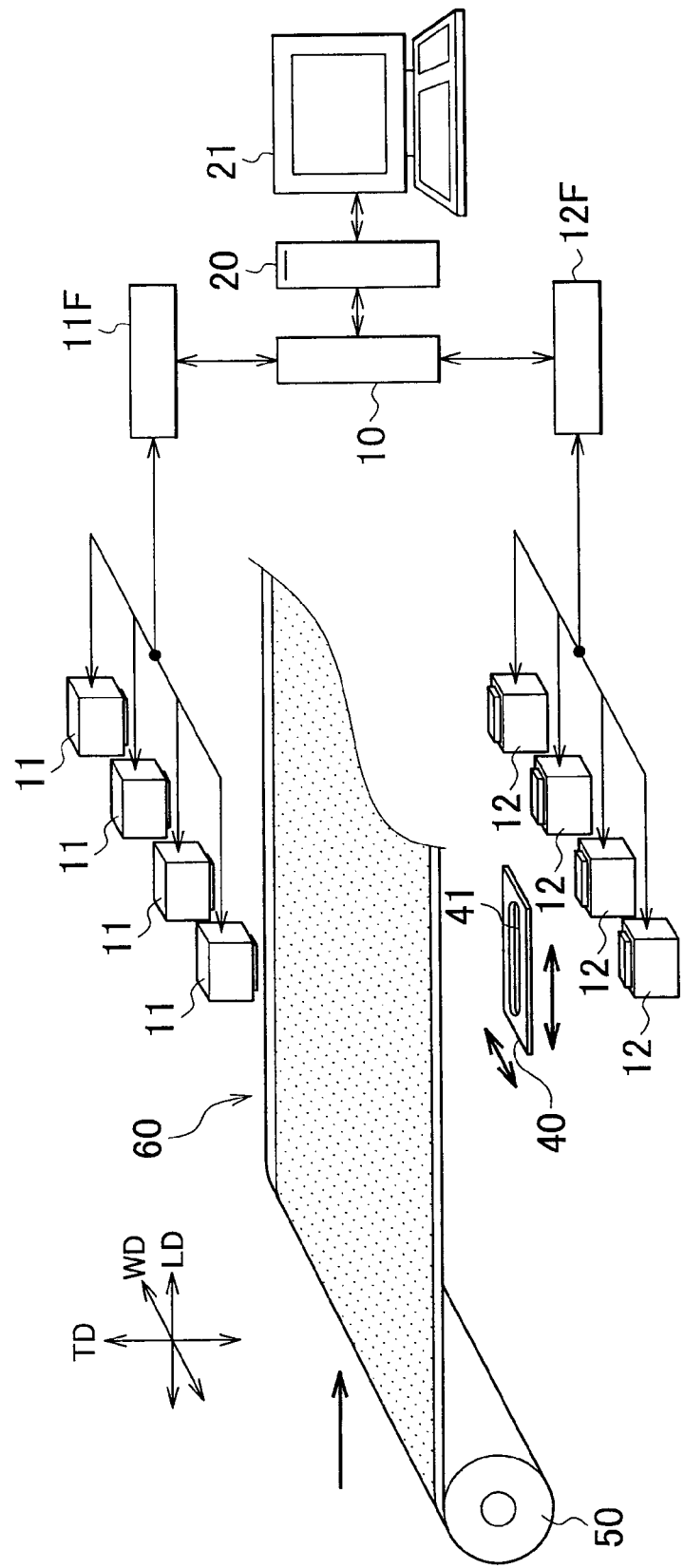
FIG. 4 is a schematic view useful for explaining the configuration of the ultrasonic measuring system according to the first embodiment of the invention.
Figure 5:
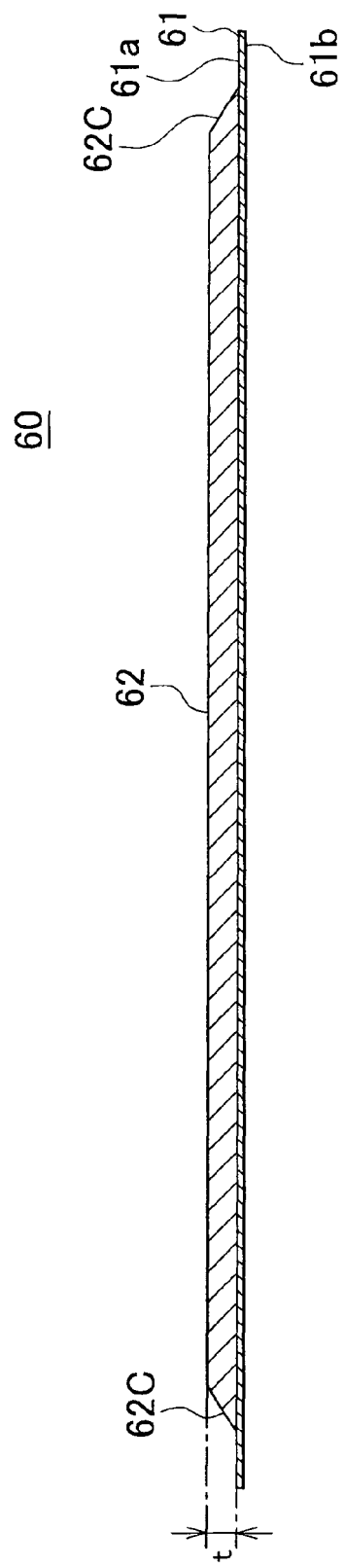
FIG. 5 is a cross-sectional view of an electrode as viewed in the direction of arrows A-A in FIG. 1.
Figure 6:
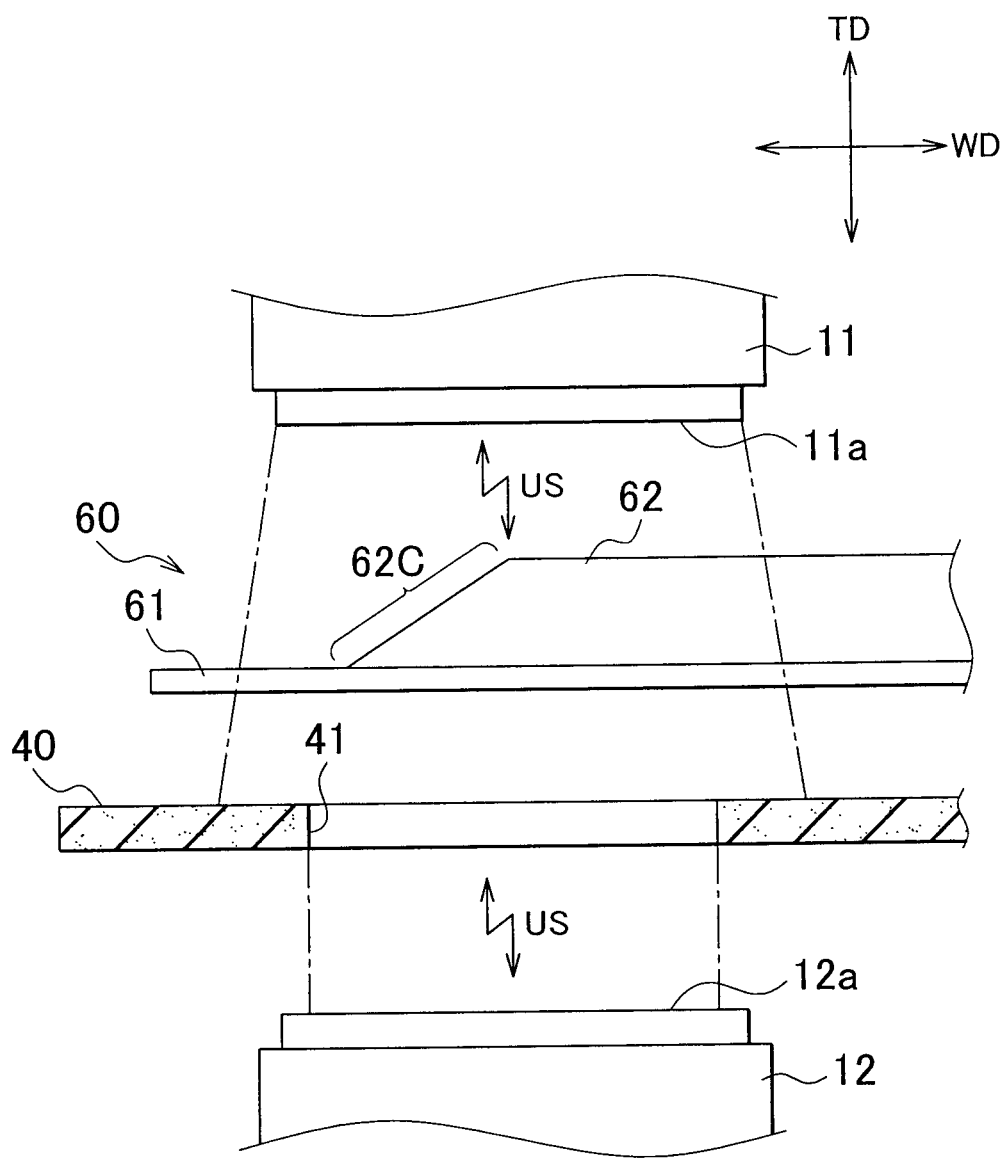
FIG. 6 is a view useful for explaining the manner of examining a coating profile of an electrode paste.

A first embodiment of the invention in which one surface of a metal foil is coated with electrode paste will be described. FIG. 1 is a perspective view showing an ultrasonic measuring system according to the first embodiment of the invention. FIG. 2 is a cross section as viewed in a direction of arrows A-A in FIG. 1, and FIG. 3 is a cross section as viewed in a direction of arrows C-C in FIG. 2. FIG. 2 and FIG. 3 illustrate a principal part of the ultrasonic measuring system. FIG. 4 illustrates the configuration of the ultrasonic measuring system according to the first embodiment. FIG. 5 is a cross section of an electrode as viewed in the direction of arrows A-A in FIG. 1. FIG. 6 is a view useful for explaining the manner of examining the coating profile of the electrode paste.

In FIG. 1 showing the first embodiment, LD (longitudinal direction) denotes a direction in which the long sides of the metal foil 61 extend, or a direction of the ultrasonic measuring system 1 parallel to the long sides of the metal foil 61, and WD (width direction) denotes a direction in which the short sides of the metal foil 61 extend, or a direction of the ultrasonic measuring system 1 parallel to the short sides of the metal foil 61. Also, TD (thickness direction) denotes a direction of the thickness of the electrode 60 (metal foil 61 and electrode paste 62), or a direction of the ultrasonic measuring system 1 parallel to the thickness direction of the electrode 60. These notations used in FIG. 1 also apply to FIG. 2 and subsequent figures.

Initially, the electrode will be briefly described. In this embodiment, the substrate is a metal foil used for production of electrodes of batteries as coated products, and the coating material is electrode paste applied by coating to the metal foil. More specifically, the electrode 60 is used in a secondary battery as a power supply of, for example, an electric vehicle or a hybrid vehicle. As shown in FIG. 5, the electrode 60 is formed by coating one surface 61a of the metal foil 60 made of, for example, Al, Cu, etc., with the electrode paste 62.

The metal foil 61 having a long length has a thickness of about 20 μm, and is wound in the form of a roll on a winding conveyor 50 on an electrode production line (not shown). While the metal foil 61 is unrolled and delivered by feed conveyors 51, to be brought into a horizontal condition, the electrode paste 62 is applied on the electrode production line by coating onto the metal foil 61 held in the horizontal condition. The electrode 60 is formed such that the thickness of the electrode paste 62 is about 40 to 50 μm after the electrode plate 62 is pressed against the metal foil 61 and dried, and is delivered by the conveyors 51 to the next process step, such as cutting of the electrode 60 produced as a continuous sheet, for example.

Next, the ultrasonic measuring system will be described with reference to FIG. 1 through FIG. 4. The ultrasonic measuring system 1 is installed at a position upstream of the position where the electrode 60 is delivered to the next process step by the conveyors 51, as shown in FIG. 1, after the electrode paste 62 is dried on the electrode production line. The ultrasonic measuring system 1 includes first ultrasonic sensors 11 and second ultrasonic sensors 12. The first ultrasonic sensors 11 are placed on one side of the electrode 60 formed by coating one surface 61a of the metal foil 61 that was wound in the form of a coil, with the electrode paste 62, as viewed in the thickness direction TD, such that an air layer AR is interposed between the ultrasonic sensors 11 and the electrode 60, and the second ultrasonic sensors 12 are placed on the other side of the electrode 60 as viewed in the thickness direction TD, such that an air layer AR is interposed between the ultrasonic sensors 12 and the electrode 60. The ultrasonic measuring system 1 measures the thickness of the electrode paste 62 in the electrode 60, by transmitting ultrasonic waves US between the first ultrasonic sensors 11 and the second ultrasonic sensors 12.

The ultrasonic measuring system 1 of this embodiment has four first ultrasonic sensors 11 and four second ultrasonic sensors 12, namely, has four pairs of first and second ultrasonic sensors 11, 12, each pair of which consists of one first ultrasonic sensor 11 and one second ultrasonic sensor 12. The ultrasonic measuring system 1 also includes an ultrasonic oscillation control unit 10 (ultrasonic oscillation controller), a thickness computing unit 20, a cover 35 (air convection suppressing device), eight thermometers 37 (temperature measuring devices), a vibration isolating plate 38 (vibration isolating device), masks 40 (ultrasonic wave blocking devices), and so forth, as shown in FIG. 2 and FIG. 4, for example.

The first and second ultrasonic sensors 11, 12 will be described in more detail. Each of the first ultrasonic sensors 11 is a flat-type transmitting sensor that permits propagation of unfocused ultrasonic waves US, and is also able to receive ultrasonic waves. In this embodiment, the flat-type transmitting sensor, which provides the first ultrasonic sensor 11, has a single first vibration surface 11a from which ultrasonic waves US are transmitted, and the first vibration surface 11a as a whole is formed in a rectangular shape. In operation, the ultrasonic waves US are transmitted from the first ultrasonic sensor 11 to at least within an area of the electrode 60 which is opposed to the first vibration surface 11a, via the air layer AR. When the second ultrasonic sensor 12 operates as a transmitting sensor, the sensor 12 operates substantially in the same manner as the first ultrasonic sensor 11, except that the first vibration surface 11a is replaced by a second vibration surface 12a of the second ultrasonic sensor 12.

Each of the second ultrasonic sensors 12 is a flat-type receiving sensor that permits propagation of unfocused ultrasonic waves US, and is also able to transmit ultrasonic waves. In this embodiment, the flat-type receiving sensor, which provides the second ultrasonic sensor 12, has a single second vibration surface 12*a* that receives ultrasonic waves US, and the second vibration surface 12*a* as a whole is formed in a rectangular shape. The second ultrasonic sensor 12 is able to receive ultrasonic waves (transmitted waves) US generated from the first ultrasonic sensor 11 for irradiation of the electrode 60 and transmitted through at least the electrode 60, via the air layer AR. When the first ultrasonic sensor 11 operates as a receiving sensor, the sensor 11 operates substantially in the same manner as the second ultrasonic sensor 12, except that the second vibration surface 12*a* is replaced by the first vibration surface 11*a*.

In the following, the frequencies of the first and second ultrasonic sensors 11, 12 will be described. A receiving-side ultrasonic sensor 12A, as one of the first and second ultrasonic sensors 11, 12, receives ultrasonic waves transmitted through the air layer AR, and generates a plurality of sonic waveforms as time passes after reception of the ultrasonic waves (see FIG. 9 and FIG. 10). Of the thus generated sonic waveforms, a sonic waveform detected first will be referred to as "first sonic waveform", and a sonic waveform detected next or subsequent to the first sonic waveform will be referred to as "second sonic waveform". The frequencies of the first ultrasonic sensors 11 and the second ultrasonic sensors 12 are set to the lowest levels, which are selected from frequencies that satisfy a condition that the second sonic waveform does not overlap the first sonic waveform, according to the thickness t of the electrode paste 62. More specifically, the frequencies of the ultrasonic sensors 11, 12 are equal to or lower than 400 kHz. The first ultrasonic sensors 11 and second ultrasonic sensors 12 have nominal frequencies that are in the same frequency band.

The ultrasonic measuring system 1 is provided with a cover 35 that prevents changes in the density of the air layers AR. The four pairs of first ultrasonic sensors 11 and second ultrasonic sensors 12 are mounted in a sensor mounting portion 30 located in the interior of the cover 35, such that each set of first ultrasonic sensors 11 and each set of the second ultrasonic sensors 12 are arranged in the width direction WD. As shown in FIG. 2 and FIG. 3, the sensor mounting portion 30 consists of a U-shaped main body 31 having an opening 32, and a support portion 33 shaped like a flat plate, which is connected to the main body 31 via a leg that extends downward from the main body 31. The cover 35 covers the surroundings of the opening 32 and main body 31 of the sensor mounting portion 30, except for a delivery opening 36 as a delivery path of the electrode 60. The cover 35 is formed integrally with the sensor mounting portion 30.

The four first ultrasonic sensors 11 are arranged in a line at given intervals in the width direction WD, in an upper section of the main body 31, such that the first vibration surface 11*a* of each of the first ultrasonic sensors 11 faces downward in the vertical direction. Also, the four second ultrasonic sensors 12 are arranged in a line at given intervals in the width direction WD, in a lower section of the main body 31, such that the second vibration surface 12*a* of each of the second ultrasonic sensors 12 faces upward in the vertical direction.

Each pair of first and second ultrasonic sensors 11, 12 are positioned such that the first vibration surface 11*a* and second vibration surface 12*a* of these sensors are opposed to each other, with the electrode 60 interposed therebetween, and such that the probe-to-probe distance between the first vibration surface 11*a* and the second vibration surface 12*a* as measured in the vertical direction is equal to or smaller than 100 mm. In this embodiment, the probe-to-probe distance is controlled to 70 mm. The four first ultrasonic sensors 11 are arranged to irradiate an irradiation area MB that covers the overall width of the electrode paste 62 including edge portions 62C located at the opposite sides, as viewed in the width direction WD of the electrode 60, with ultrasonic waves US, as shown in FIG. 1 and FIG. 6. On the other surface 61*b* of the metal foil 61 of the electrode 60, the ultrasonic waves US transmitted from the four first ultrasonic sensors 11 propagate from the irradiation area MB toward the four second ultrasonic sensors 12 through the air layer AR.

The opening 32 of the main body 31 of the sensor mounting portion 30 provides the air layers AR as a medium through which ultrasonic waves US propagate, between each pair of first and second ultrasonic sensors 11, 12. The size of the opening 32 as measured in the thickness direction TD, or the spacing between the upper portion and lower portion of the main body 31, is controlled so as to ensure the probe-to-probe distance as described above, and the size of the opening 32 as measured in the width direction WD corresponds to the width dimension of the electrode 60.

In the opening 32 located in the interior of the cover 35, thermometers 37 for measuring the temperature of the air layers AR are provided. In this embodiment, eight thermometers 37 are provided, more specifically, four thermometers 37 are provided on each of the upper side and lower side of a path along which the electrode 60 is fed through the opening 32, as shown in FIG. 2.

As shown in FIG. 2 and FIG. 3, the vibration isolating plate 38 for inhibiting external vibrations from being transmitted from the ground to each of the first and second ultrasonic sensors 11, 12 is laid down on the installation surface GL, or floor, of the ultrasonic measuring system 1. The vibration isolating plate 38 is formed of an elastic material, such as rubber or felt, or dumper which is likely to absorb vibrations, and has a larger size than the support portion 33, and the support portion 33 is mounted on the vibration isolating plate 38. As shown in FIG. 1, the sensor mounting portion 30 and the cover 35 can be moved relative to the vibration isolating plate 38, by a driving source (not shown), in the longitudinal direction LD and the width direction WD, within a measurement area MA in which the thickness of the electrode paste 62 is obtained.

As shown in FIG. 4, the four first ultrasonic sensors 11 are electrically connected to a first ultrasonic oscillator 11F. The first ultrasonic oscillator 11F has an oscillating circuit for applying a voltage to the first vibration surfaces 11*a* to produce ultrasonic vibrations, and a receiving circuit for converting ultrasonic vibrations of the first vibration surfaces 11*a* that received ultrasonic waves, into a voltage signal, and receiving the voltage signal.

The four second ultrasonic sensors 12 are electrically connected to a second ultrasonic oscillator 12F for producing ultrasonic vibrations of the second vibration surface 12*a*. The second ultrasonic oscillator 12F has an oscillating circuit for applying a voltage to the second vibration surface 12*a* to produce ultrasonic vibrations, and a receiving circuit for converting ultrasonic vibrations of the second vibration surfaces 12*a* that received ultrasonic waves, into a voltage signal, and receiving the voltage signal. The first ultrasonic oscillator 11F and the second ultrasonic oscillator 12F are electrically connected to the ultrasonic oscillation control unit 10.

The ultrasonic oscillation control unit 10 controls sending and receiving of ultrasonic waves US to and from the first ultrasonic sensors 11 and the second ultrasonic sensors 12. More specifically, the first and second ultrasonic sensors 11, 12 are in a first condition when the first ultrasonic sensors 11 transmit ultrasonic waves, and the second ultrasonic sensors 12 receive the waves, and are in a second condition when the second ultrasonic sensors 12 transmit ultrasonic waves and the first ultrasonic sensors 11 receive the waves. The ultrasonic oscillation control unit 10 switches the first and second ultrasonic sensors 11, 12 between the first condition and the second condition, so that the first ultrasonic sensors 11 operate differently from the second ultrasonic sensors 12.

The ultrasonic oscillation control unit 10 is electrically connected to the thickness computing unit 20 connected to a monitor 21. The thickness computing unit 20 calculates the basis weight and coating profile of the electrode paste 62, or the thickness of the electrode paste 62, based on a received signal of ultrasonic waves US received by the receiving-side ultrasonic sensor, as one of the first ultrasonic sensor 11 and the second ultrasonic sensor 12. More specifically, the thickness computing unit 20 measures the thickness of the electrode paste 62, based on a received signal having the first sonic waveform, in a condition where the amplitude is at the maximum value in the second sonic waveform. The first sonic waveform and the second sonic waveform will be described in detail later.

The thickness computing unit 20 includes a microcomputer (not shown) of known configuration having CPU, RAM, ROM, etc. The RAM receives, as set values, the attenuation factor of ultrasonic waves when propagating through the air layer AR, the attenuation factor of ultrasonic waves when transmitted through the metal foil 61 or the thickness of the metal foil 61, the temperature of the air layer AR measured by the thermometers 37, the probe-to-probe distance between the first vibration surface 11a and the second vibration surface 12a, the sound velocity, density, and acoustic impedance corresponding to the temperature, in the air layer AR, and so forth.

Also, the ROM stores a program for performing calibration of the first and second ultrasonic sensors 11, 12, a program for calculating the attenuation factor of transmitted waves transmitted through the electrode 60 (electrode paste 62) and received by the first ultrasonic sensor 11 or the second ultrasonic sensor 12, a program for correcting the sonic waveform of the transmitted and received waves by approximating the waveform by a sine wave, a basis weight calculation program for computing the thickness, or basis weight, of the electrode paste 62, based on the calculated attenuation factor of the transmitted waves, a program for displaying the computation results in the form of numerical values and/or images, on the monitor 21, and other programs.

In the thickness computing unit 20, the CPU is loaded with the above-indicated programs, so as to perform certain operations, such as displaying numerical values and/or images representing the basis weight and coating profile of the electrode paste 62 on the monitor 21, moving the sensor mounting portion 30 integral with the cover 35 in the longitudinal direction LD and the width direction WD, and moving the masks 40 (which will be described below) to the edge portions 62C of the electrode paste 62, for example.

Next, the masks 40 will be described with reference to FIG. 2, FIG. 4 and FIG. 6. The masks 40 are provided in the air layer AR between the electrode 60 and the second ultrasonic sensors 12, in the opening 32 of the main body 31 of the sensor mounting portion 30, more specifically, are placed at positions corresponding to the edge portions 62C and their peripheries of the electrode paste 62 at opposite sides of the electrode 60 as viewed in the width direction WD, as shown in FIG. 2. The masks 40 can be moved by a driving source (not shown), in the longitudinal direction LD and the width direction WD.

The masks 40 are made of a material, such as sponge, rubber, or felt, which is likely to absorb ultrasonic vibrations. As shown in FIG. 4 and FIG. 6, each of the masks 40 is a member like a flat plate having a mask opening 41 that is larger than the range of the edge portion 62 when measured in the width direction WD. In this embodiment, the ultrasonic measuring system 1 has two masks 40. In the above-described first condition in which the first ultrasonic sensor 11 transmits ultrasonic waves US, and the second ultrasonic sensor 12 receives the ultrasonic waves US transmitted from the first ultrasonic sensor 11, the mask 40 blocks or inhibits propagation of a part of ultrasonic waves US between the first ultrasonic sensor 11 and the second ultrasonic sensor 12. The mask 40 is adapted to be fixed at a position commensurate with the dimension of the electrode 60 as measured in the width direction WD, and the position of the edge portion 62C formed on the metal foil 62C.

Figure 7:
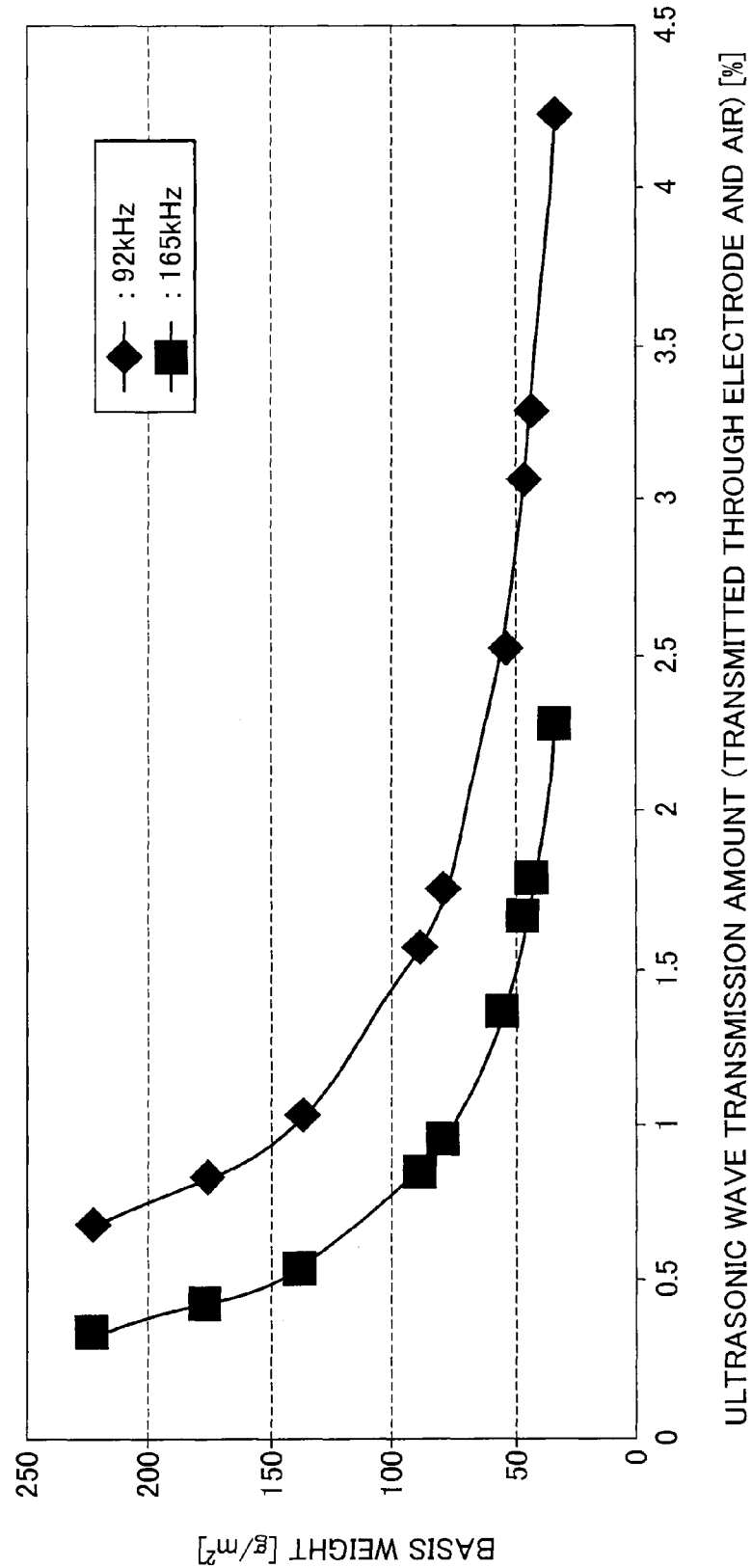
FIG. 7 is a view showing calibration curves indicating the relationship between the attenuation factor of ultrasonic waves transmitted through the electrode, and the basis weight of the electrode.

Next, a method of measuring the thickness of the electrode paste 62 using the ultrasonic measuring system 1, and performing quality check or inspection on the basis weight and coating profile of the electrode paste 62 will be described. FIG. 7 is a graphical representation of calibration curves (or standard curves) each indicating the relationship between the attenuation factor of ultrasonic waves that transmit through the electrode, and the basis weight of the electrode. In order to check the basis weight and coating profile of the electrode paste 62, the ultrasonic measuring system 1 needs to calibrate the first and second ultrasonic sensors 11, 12, and create calibration curves like those shown in FIG. 7 in advance, before measuring the thickness of the electrode paste 62.

While FIG. 7 illustrates the cases where the frequency of the receiving-side ultrasonic sensor is 92 kHz and 165 kHz just for reference, the calibration curves need to be created in accordance with the frequencies of the first ultrasonic sensors 11 and second ultrasonic sensors 12 that are actually used. For the electrode 60 of which the thickness is to be measured, in particular, the basis weight can be obtained at higher resolution from the calibration curve as the frequency of the receiving-side ultrasonic sensor is higher, depending on the thickness of the metal foil 61 and coating conditions of the electrode paste 62. In addition to the actual-measurement calibration curve for the electrode 60 as shown in FIG. 7, a calibration curve(s) for use in calibration of the first and second ultrasonic sensors 11, 12 as will be described later, and an actual-measurement calibration curve for the metal foil 61 also need to be created in advance.

The actual-measurement calibration curve for the metal foil 61 is a calibration curve indicating the results obtained by calculating the basis weight of the metal foil 61, based on the attenuation factor of transmitted waves US transmitted through the metal foil 61, before the electrode paste 62 is applied by coating to the metal foil 61. The actual-measurement calibration curve for the electrode 60, which is used at the time of actual measurement of the electrode paste 62, is a calibration curve indicating the results obtained by calculating the basis weight of the electrode 60, based on the attenuation factor of transmitted waves US transmitted through the electrode 60 (the metal foil 61 and the electrode paste 62). When the calibration curve(s) for calibration of the first and second ultrasonic sensors 11, 12, actual-measurement calibration curve for the metal foil 61, and the actual-measurement calibration curve for the electrode 60 are created, the same ultrasonic sensors are used as the first ultrasonic sensor 11 and the second ultrasonic sensor 12, and the frequency of the first ultrasonic sensor 11 and the frequency of the second ultrasonic sensor 12 are controlled so as not to vary for each calibration curve.

In the following, a method for obtaining a calibration curve will be briefly explained. In this method, a pair of sending-side ultrasonic sensor and receiving-side ultrasonic sensor, and a plurality of types of standard specimens having different thicknesses are used. To obtain a calibration curve, ultrasonic waves transmitted from the sending-side ultrasonic sensor are transmitted through each of the standard specimens, under an atmosphere in which the temperature is kept constant and the humidity is kept equal to or lower than 10%, in a room, and the attenuation factor of the transmitted waves (ultrasonic waves) received by the receiving-side ultrasonic sensor is obtained. As a standard specimen used for obtaining a calibration curve for calibration, a foil made of Cu is used, as a material that does not undergo changes due to oxidization, or the like. The standard specimen has a predetermined thickness. Needless to say, the density of Cu is known as a mechanical property according to JIS, for example.

In general, where the density of a standard specimen is constant (a constant), the attenuation factor of ultrasonic waves transmitted through the standard specimen is inversely proportional to the thickness of the standard specimen. Since the dimension of the basis weight of, for example, the electrode paste is the same as that of the density, and the thickness of the standard specimen is constant, the relationship as expressed by the following equation: basis weight=A/attenuation factor of ultrasonic waves, where A is a constant (the thickness of the standard specimen, a conversion factor required for unit conversion of density, and a correction factor corresponding to temperature change), is obtained.

Figure 8:
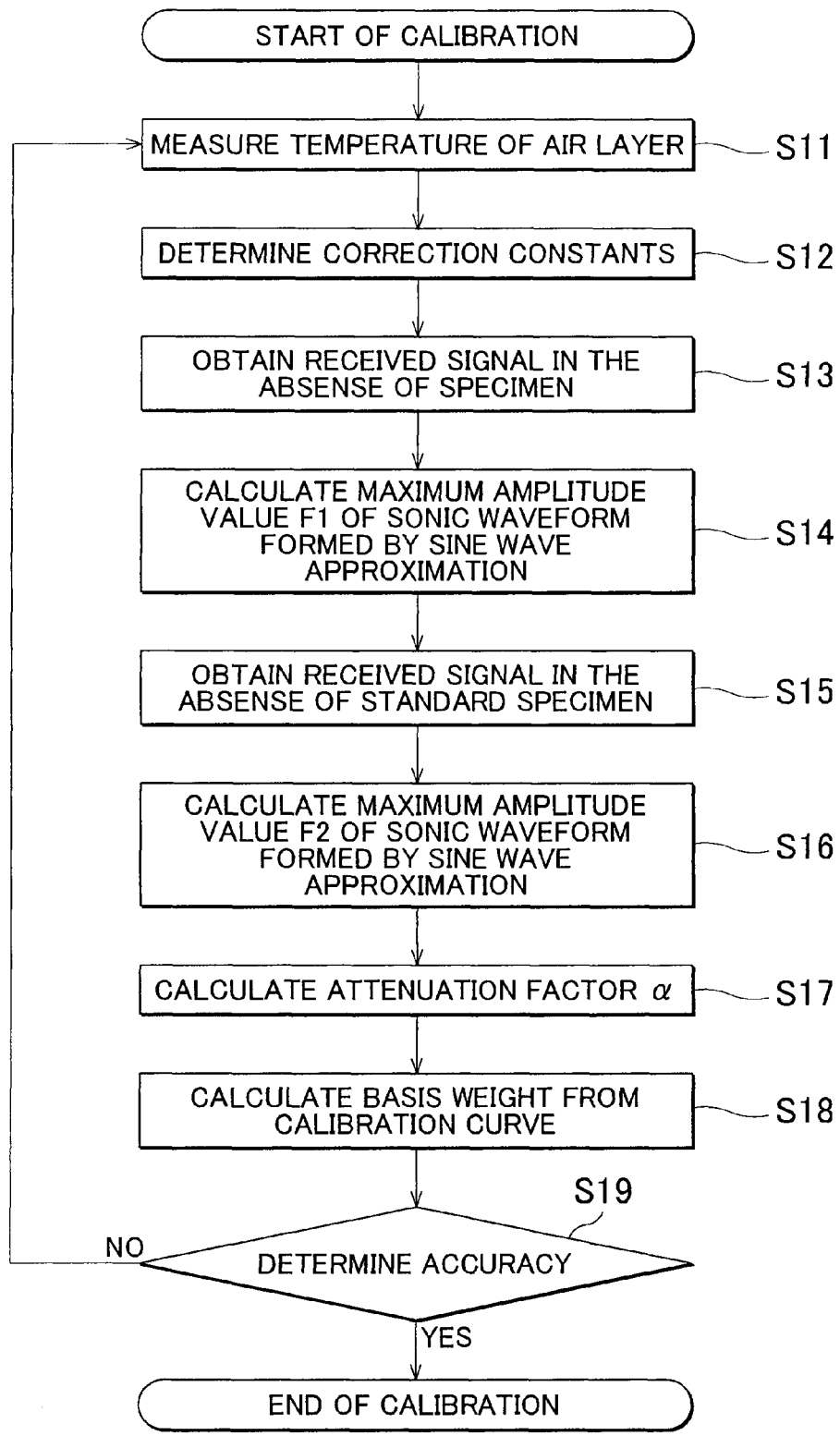
FIG. 8 is a flowchart illustrating the procedure of calibrating first and second ultrasonic sensors, in the ultrasonic measuring system according to the first embodiment of the invention.

After creating various kinds of calibration curves, the ultrasonic measuring system 1 performs calibration of the first and second ultrasonic sensors 11, 12 before measuring the thickness of the electrode paste 62. The calibration is performed according to substantially the same procedure, no matter whether the first and second ultrasonic sensors 11, 12 are in the first condition or in the second condition. Thus, the procedure of calibrating the first and second ultrasonic sensors 11, 12 in the first condition will be typically described with reference to FIG. 8. FIG. 8 is a flowchart illustrating the procedure of calibration of the first and second ultrasonic sensors.

As a preparation for conducting calibration, the sensor mounting portion 30 is moved to a position where the electrode 60 is not present, in the ultrasonic measuring system 1 installed on the electrode production line (not shown), and a standard specimen having no specimen (corresponding to the electrode paste 62) is placed in the air layer AR between the first ultrasonic sensor 11 and the second ultrasonic sensor 12. Also, conditions (set values, such as the sound velocity, density and the acoustic impedance corresponding to the temperature, in the air layer AR, the temperature of the standard specimen, etc.) under which the calibration is performed are entered into the thickness computing unit 20.

In the ultrasonic measuring system 1, the first and second ultrasonic sensors 11, 12 are placed in a condition where ultrasonic waves US are transmitted from the sending-side first ultrasonic sensor 11 toward the receiving-side second ultrasonic sensor 12, so that the second ultrasonic sensor 12 can receive the ultrasonic waves US via the air layer AR. When the calibration is performed in the second condition, ultrasonic waves US are transmitted from the sending-side second ultrasonic sensor 12 toward the receiving-side first ultrasonic sensor 11, so that the first ultrasonic sensor 11 can receive the ultrasonic waves US via the air layer AR.

Initially, in step S11, the temperature of the air layer AR in the opening 32 of the main body 31, within the cover 35, is measured by the thermometers 37. Then, in step S12, the sound velocity, density, and acoustic impedance corresponding to the temperature of the air layer AR are determined as correction constants, based on Eq. 2 through Eq. 4 indicated below, and the temperatures detected by the eight thermometers 37 (e.g., the average of temperatures measured at eight locations in the opening 32). Sound Velocity, Density, and Acoustic Impedance in the Air (1) Sound velocity $C=f \times \lambda$ ... Eq. 1 where C is sound velocity (m/sec), f is frequency (kHz), and $\lambda$ is wavelength (m), or $C=331.5+(0.61 \times t)$ ... Eq. 2 where t is temperature (° C.). (2) Density $\rho=1.293 \times (273.15/(273.15+t)) \times (P/1013.25)$ ... Eq. 3 where $\rho$ is density (kg/m$^3$) (ntp), t is temperature (° C.), and P is atmospheric pressure (atm). (3) Acoustic impedance $Z=\rho \times C$ ... Eq. 4 where Z is acoustic impedance (Pa·s/m).

Next, in step S13, the first ultrasonic sensor 11 transmits ultrasonic waves US toward the second ultrasonic sensor 12 for a specified period of time (a specified number of pulses), so that the waves pass through the standard specimen. The second ultrasonic sensor 12 receives the ultrasonic waves US transmitted from the first ultrasonic sensor 11, and the thickness computing unit 20 obtains a sonic waveform (see FIG. 10, for example, in which the vertical axis indicates received voltage (mV) and the horizontal axis indicates time (µs)) of ultrasonic waves US, as a received signal of the ultrasonic waves US received via the second ultrasonic oscillator 12F and the ultrasonic oscillation control unit 10. In step S14, the thickness computing unit 20 corrects the sonic waveform of the specified number of pulses, indicative of the ultrasonic waves US received after transmitted through the standard specimen, by approximating the waveform by a sine wave, and calculates the maximum amplitude value F1 of the corrected waveform approximate to a sine wave.

Then, in step S15, the standard specimen is removed from between the first ultrasonic sensor 11 and the second ultrasonic sensor 12, and ultrasonic waves US are transmitted from the first ultrasonic sensor 11 toward the second ultrasonic sensor 12 for the specified period of time (the specified number of pulses). The second ultrasonic sensor 12 receives the ultrasonic waves US transmitted from the first ultrasonic sensor 11, and the thickness computing unit 20 obtains a sonic waveform (the vertical axis indicates received voltage (mV) and the horizontal axis indicates time (µs)) of ultrasonic waves US, as a received signal of the ultrasonic waves US received via the second ultrasonic oscillator 12F and the ultrasonic oscillation control unit 10. In step S16, the thickness computing unit 20 corrects the sonic waveform of the specified number of pulses, indicative of the ultrasonic waves US which the second ultrasonic sensor 12 directly receives from the first ultrasonic sensor 11, by approximating the waveform by a sine wave, and calculates the maximum amplitude value F2 of the corrected waveform approximate to a sine wave.

Then, in step S17, the attenuation factor $\alpha$ of the ultrasonic waves US received by the second ultrasonic sensor 12 is calculated. More specifically, the thickness computing unit 20 calculates the attenuation factor $\alpha$ based on the maximum amplitude value F1 calculated in step S14 and the maximum amplitude value F2 calculated in step S16, by multiplying the ratio of F1 to F2 by 100 (F1/F2×100). Then, in step S18, the basis weight corresponding to the attenuation factor $\alpha$ calculated in step S17, namely, the density of the standard specimen, is calculated according to the calibration curve for calibration, which was created in advance.

Then, in step S19, the accuracy of the calibration is examined by checking if the density of the standard specimen calculated in step S18 matches the density of Cu indicated as its mechanical property. If the density of the standard specimen matches the density of Cu (if YES is obtained in step S19), the calibration is finished, and the thickness of the electrode paste 62 is actually measured as described later. If the density of the standard specimen does not match the density of Cu (if NO is obtained in step S19), the control returns to step S11, and the above-described steps of the flowchart of FIG. 8 are executed until the density of the standard specimen matches the nominal density.

Next, an ultrasonic measuring method according to this embodiment of the invention will be described. The ultrasonic measuring system 1 is used for determining the basis weight and coating profile of the electrode paste 62. Namely, in the ultrasonic measuring method of this embodiment, a pair of first ultrasonic sensor 11 and second ultrasonic sensor 12, and the electrode 60 formed by coating one surface 61a of the metal foil 61 that was wound in the form of a roll and made of a metal, with the electrode paste 62, are used. The first ultrasonic sensor 11 is placed above the electrode 60 as viewed in the thickness direction TD, via the air layer AR, and the second ultrasonic sensor 12 is placed below the electrode 60, via the air layer AR.

A flat-type transmitting sensor that permits propagation of unfocused ultrasonic waves US is used as the first ultrasonic sensor 11, and a flat-type receiving sensor that permits propagation of unfocused ultrasonic waves US is used as the second ultrasonic sensor 12. The first ultrasonic sensor 11 and the second ultrasonic sensor 12 are capable of transmitting and receiving ultrasonic waves US. The ultrasonic oscillation control unit 10 is provided for controlling sending and receiving of ultrasonic waves US between the first and second ultrasonic sensors 11, 12.

The first and second ultrasonic sensors 11, 12 are in a first condition when the first ultrasonic sensor 11 sends ultrasonic waves, and the second ultrasonic sensor 12 receives the waves, and are in a second condition when the second ultrasonic sensor 12 sends ultrasonic waves and the first ultrasonic sensor 11 receives the waves. The ultrasonic oscillation control unit 10 switches the first ultrasonic sensor 11 and the second ultrasonic sensor 12 between the first condition and the second condition, so that the first ultrasonic sensor 11 operates differently from the second ultrasonic sensor 12. In the following, the ultrasonic sensor that sends ultrasonic waves US will be called "sending-side ultrasonic sensor 11A", and the ultrasonic sensor that receives the ultrasonic waves US transmitted through the electrode 60 and the air layers AR will be called "receiving-side ultrasonic sensor 12A".

Of the first and second ultrasonic sensors 11, 12, the receiving-side ultrasonic sensor 12A that receives ultrasonic waves US propagated through the air layer AR generates a plurality of sonic waveforms as time passes after reception of the waves. Of the thus generated sonic waveforms, a sonic waveform detected first is referred to as "first sonic waveform", and a sonic waveform detected next or subsequent to the first sonic waveform is referred to as "second sonic waveform" (see FIG. 9 and FIG. 10, for example). The respective frequencies of the first ultrasonic sensor 11 and the second ultrasonic sensor 12 are set to the lowest levels, according to the thickness t of the electrode paste 62, under a condition that the second sonic waveform does not overlap the first sonic waveform. More specifically, the frequencies of the first ultrasonic sensor 11 and the second ultrasonic sensor 12 are equal to or lower than 400 kHz, and ultrasonic sensors having nominal frequencies in the same frequency band are used as the first ultrasonic sensor 11 and the second ultrasonic sensor 12.

The thickness of the electrode paste 62 is calculated based on the attenuation factor of ultrasonic waves US received by the receiving-side ultrasonic sensor 12A, as one of the first ultrasonic sensor 11 and the second ultrasonic sensor 12. Also, the first ultrasonic sensor 11 and the second ultrasonic sensor 12, between which the electrode 60 is interposed, are positioned such that the probe-to-probe distance between the first vibration surface 11a of the first ultrasonic sensor 11 at which ultrasonic vibrations occur and the second vibration surface 12a of the second ultrasonic sensor 12 at which ultrasonic vibrations occur is equal to or smaller than 100 mm (in this embodiment, 70 mm) as measured in the direction perpendicular to the first and second vibrations surfaces 11a, 12a. With the probe-to-probe distance thus controlled, the thickness of the electrode paste 62 is measured based on the received signal represented by the first sonic waveform, namely, based on the attenuation factor of the first sonic waveform, in a condition where the amplitude is at the maximum value in the second sonic waveform.

Thus, in the ultrasonic measuring method according to this embodiment, the thickness of the electrode paste 62 is measured by propagating ultrasonic waves US between the first ultrasonic sensor 11 and the second ultrasonic sensor 12.

Figure 9:
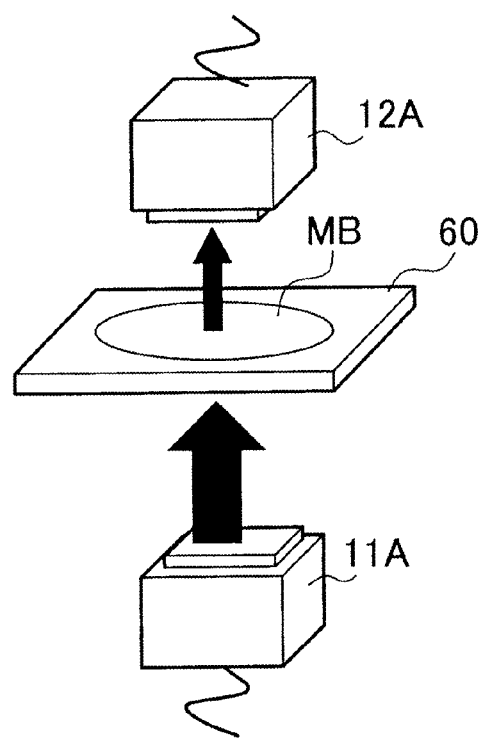
FIG. 9 is an explanatory view schematically showing the case where the electrode is located at a middle position between a sending-side ultrasonic sensor and a receiving-side ultrasonic sensor.
Figure 10:
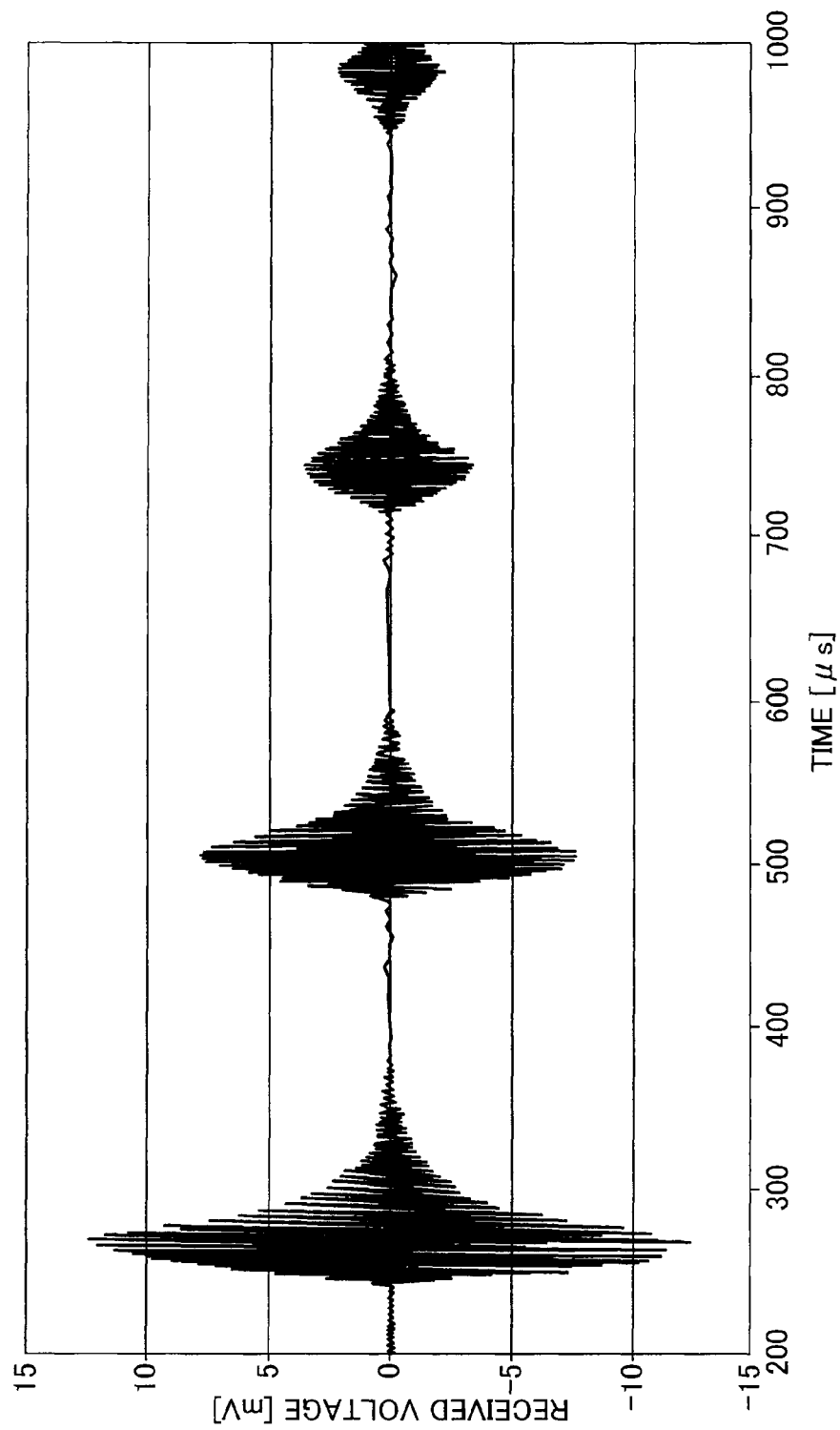
FIG. 10 is a graph showing sonic waveforms of ultrasonic waves received by the receiving-side ultrasonic sensor when the electrode is located at the position as shown in FIG. 9.
Figure 11A:
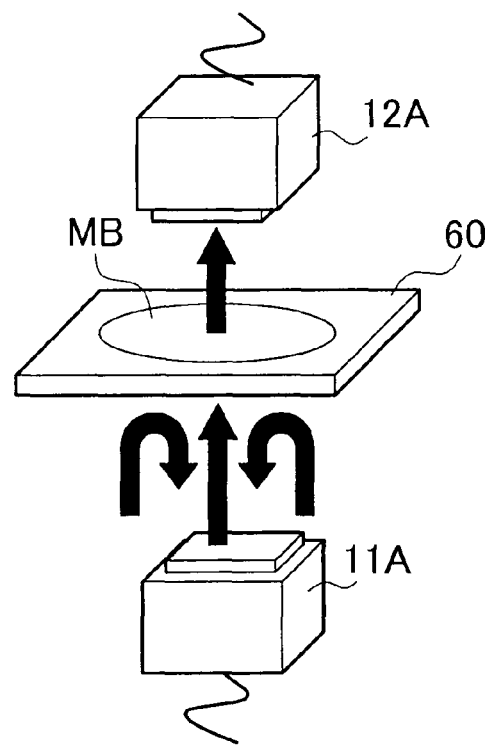
FIG. 11A is an explanatory view schematically showing the case where the electrode is located a little closer to one side (the sending-side ultrasonic sensor) relative to the middle position, between the sending-side ultrasonic sensor and the receiving-side ultrasonic sensor.
Figure 11B:
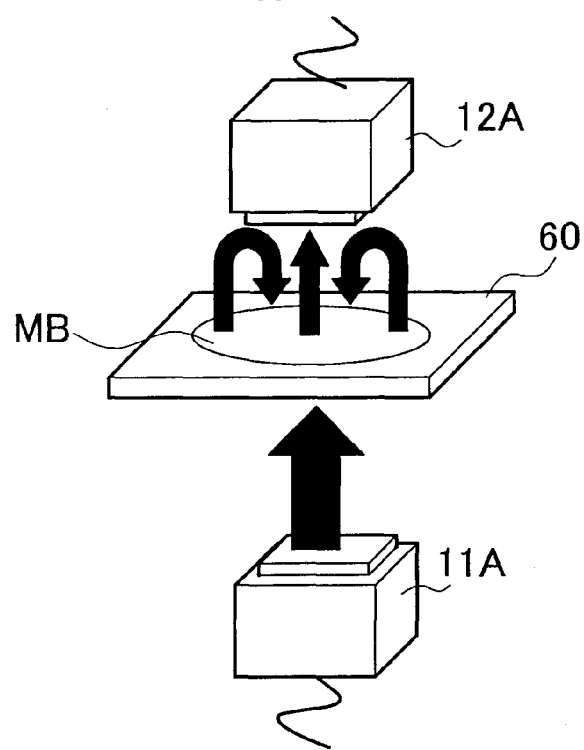
FIG. 11B is an explanatory view schematically showing the case where the electrode is located a little closer to one side (the receiving-side ultrasonic sensor) relative to the middle position, between the sending-side ultrasonic sensor and the receiving-side ultrasonic sensor.
Figure 12:
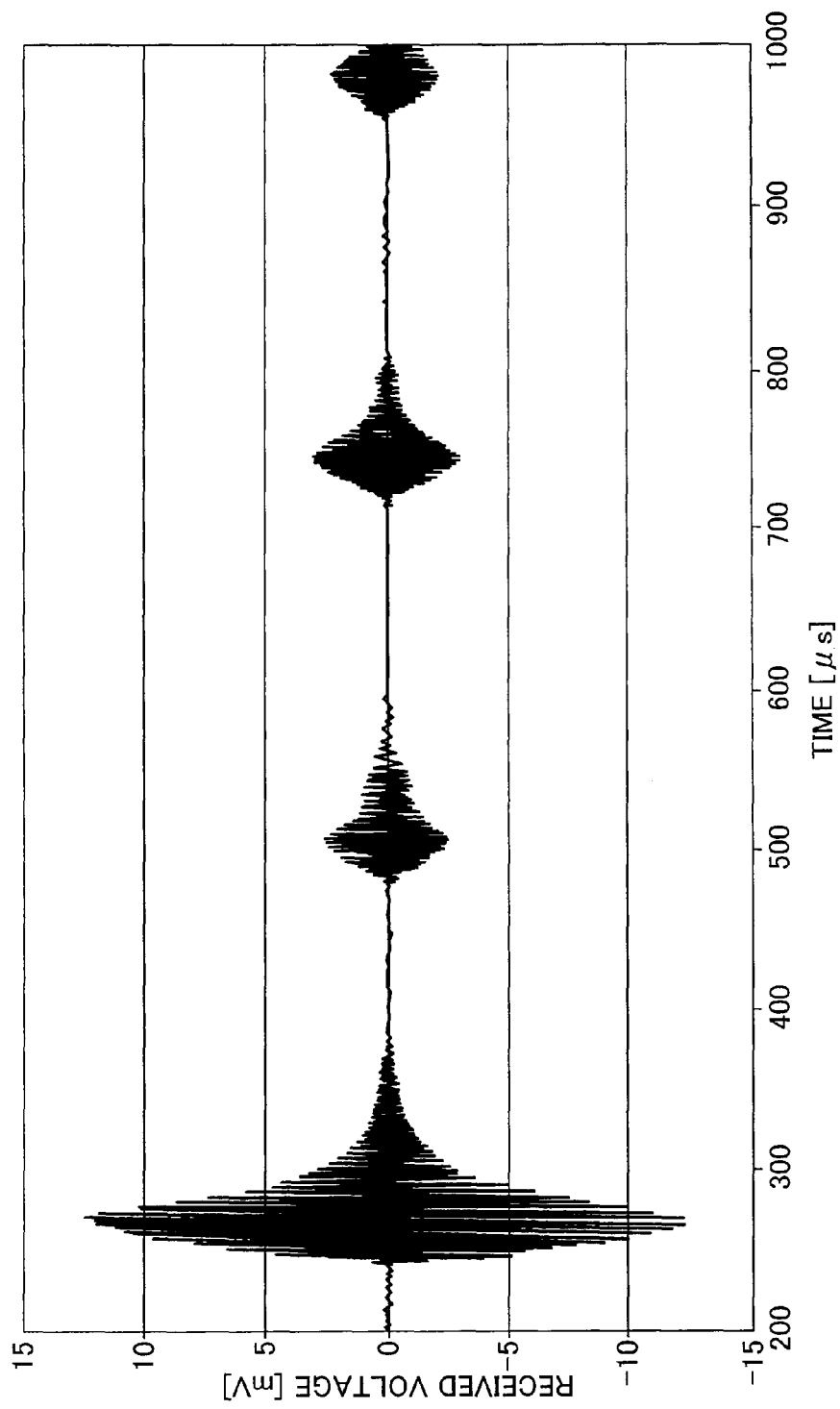
FIG. 12 is a graph showing sonic waveforms of ultrasonic waves received by the receiving-side ultrasonic sensor when the electrode is located at the position as shown in FIG. 11A or FIG. 11B.
Figure 13A:
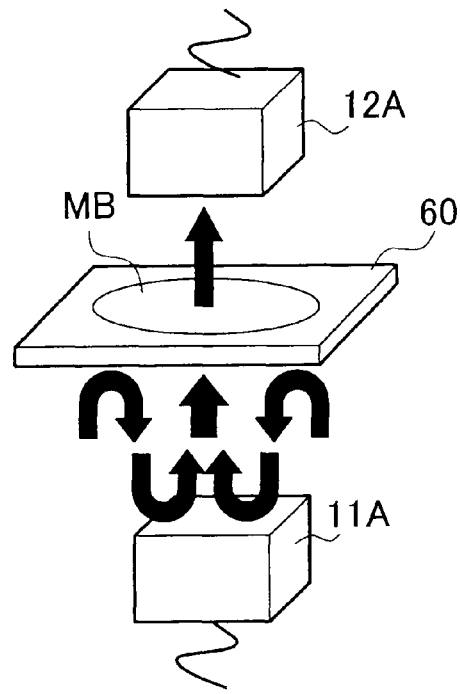
FIG. 13A is an explanatory view schematically showing the case where the electrode is located much closer to one side (the sending-side ultrasonic sensor) relative to the middle position, between the sending-side ultrasonic sensor and the receiving-side ultrasonic sensor.
Figure 13B:
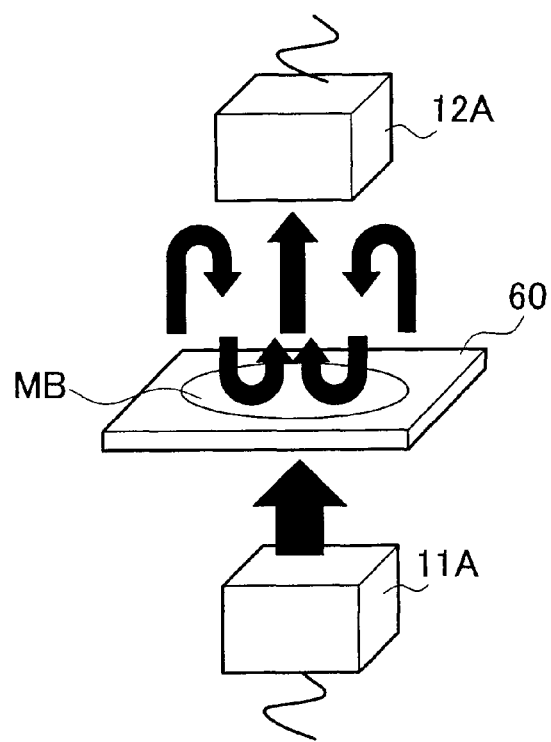
FIG. 13B is an explanatory view schematically showing the case where the electrode is located much closer to one side (the receiving-side ultrasonic sensor) relative to the middle position, between the sending-side ultrasonic sensor and the receiving-side ultrasonic sensor.
Figure 14:
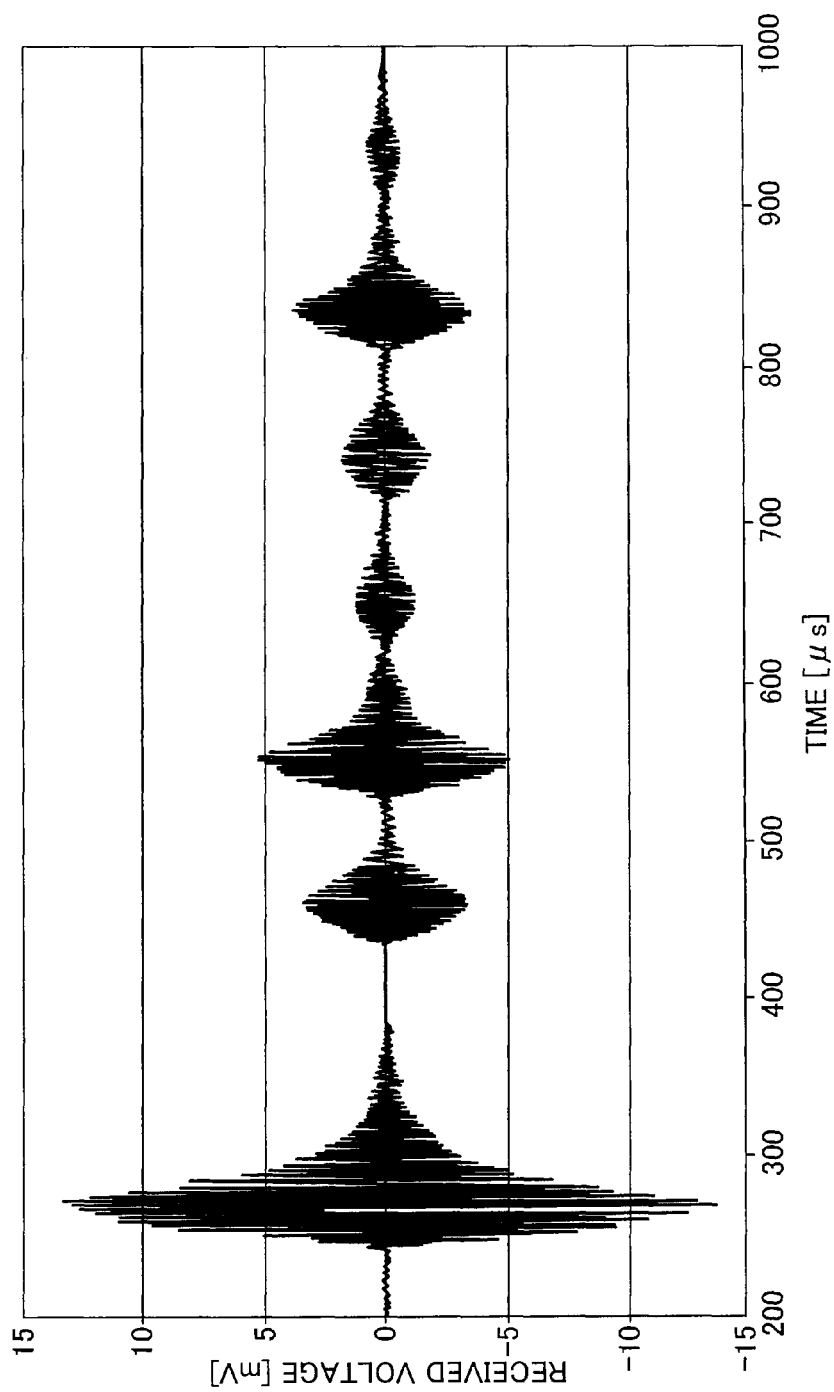
FIG. 14 is a graph showing sonic waveforms of ultrasonic waves received by the receiving-side ultrasonic sensor when the electrode is located at the position as shown in FIG. 13A or FIG. 13B.

Here, the relationship between the position at which the electrode 60 is located between the sending-side ultrasonic sensor 11A and the receiving-side ultrasonic sensor 12A, and the second sonic waveform, will be described with reference to FIG. 9 through FIG. 14. FIG. 9 is an explanatory view schematically showing the case where the electrode is located at a middle position between the sending-side ultrasonic sensor and the receiving-side ultrasonic sensor, and FIG. 10 shows sonic waveforms of ultrasonic waves received by the receiving-side ultrasonic sensor when the electrode is located at the position indicated in FIG. 9. FIG. 11A and FIG. 11B are explanatory views schematically showing the case where the electrode is located a little closer to one side relative to the middle position, between the sending-side ultrasonic sensor and the receiving-side ultrasonic sensor. FIG. 11A shows the case where the electrode is located closer to the sending-side ultrasonic sensor, and FIG. 11B shows the case where the electrode is located closer to the receiving-side ultrasonic sensor. FIG. 12 shows sonic waveforms of ultrasonic waves received by the receiving-side ultrasonic sensor when the electrode is located at the position indicated in FIG. 11A or FIG. 11B. FIG. 13A and FIG. 13B are explanatory views schematically showing the case where the electrode is located largely closer to one side relative to the middle position, between the sending-side ultrasonic sensor and the receiving-side ultrasonic sensor. FIG. 13A shows the case where the electrode is located closer to the sending-side ultrasonic sensor, and FIG. 13B shows the case where the electrode is located closer to the receiving-side ultrasonic sensor. FIG. 14 shows sonic waveforms of ultrasonic waves received by the receiving-side ultrasonic sensor when the electrode is located at the position indicated in FIG. 13A or FIG. 13B.

As described above, the receiving-side ultrasonic sensor 12A generates a plurality of sonic waveforms with the passage of time after receiving ultrasonic waves. Of the plurality of sonic waveforms, the first sonic waveform provides a received signal consisting solely of transmitted waves, namely, ultrasonic waves US sent from the sending-side ultrasonic sensor 11A toward the electrode 60 and transmitted through the metal foil 61 and the electrode paste 62. The first sonic waveform includes no echo that becomes noise. Also, odd-numbered sonic waveforms subsequent to the first sonic waveform have the same or similar tendency as the first sonic waveform.

On the other hand, the second sonic waveform detected next to the first sonic waveform comprises echoes including a received signal produced by first reflected waves, and a received signal produced by second reflected waves, and may become noise to the received signal required for determining the thickness of the electrode paste 62. The first reflected waves that provide the received signal are received waves derived from the transmitted ultrasonic waves US that are once reflected by the electrode 60 without passing through the irradiation area MB of the electrode 60, and then transmitted through the electrode 60. The second reflected waves that provide the received signal are received waves derived from the transmitted ultrasonic waves US that are transmitted through the irradiation area MB of the electrode 60, are once reflected by the receiving-side ultrasonic sensor 12A, then return to the electrode 60, and are reflected by the electrode 60.

When the probe-to-probe distance between the sending-side ultrasonic sensor 11A and the receiving-side ultrasonic sensor 12A is equal to or smaller than 100 mm, the first sonic waveform and the second sonic waveform have relationships as described in (1) through (3) as follows. (1) When the electrode 60 is located exactly at the middle position between the sending-side ultrasonic sensor 11A and the receiving-side ultrasonic sensor 12A, as shown in FIG. 9, the first reflected waves and the second reflected waves are synthesized with the same period, to produce the second sonic waveform in which the amplitude of the synthesized waves is at a maximum, as shown in FIG. 10. (2) When the electrode 60 is located a little closer to one side relative to the middle position between the sending-side ultrasonic sensor 11A and the receiving-side ultrasonic sensor 12A, as shown in FIG. 11A and FIG. 11B, the first reflected waves and the second reflected waves, which are out of phase, interfere with each other, to produce the second sonic waveform of which the amplitude is at a minimum when the phase of the first reflected waves is shifted by a half of the period from that of the second reflected waves, as shown in FIG. 12.

(3) When the electrode 60 is located largely closer to one side relative to the middle position between the sending-side ultrasonic sensor 11A and the receiving-side ultrasonic sensor 12A, as shown in FIG. 13A and FIG. 13B, the phase of the first reflected waves is completely shifted from the phase of the second reflected waves, to produce the second sonic waveform in which the first reflected waves and the second reflected waves provide two separate sections, as shown in FIG. 14. In any of the cases (1) through (3) as described above, the received signal represented by the first sonic waveform consists solely of the transmitted waves, namely, the ultrasonic waves US sent from the sending-side ultrasonic sensor 11A and transmitted through the metal foil 61 and the electrode paste 62, and is not influenced by multiple reflected waves formed by the first reflected waves and the second reflected waves. Accordingly, the above-mentioned condition that the first sonic waveform and the second sonic waveform do not overlap each other is established.

In the meantime, the metal foil 61 in the electrode 60 is made of a metal having a large density, and ultrasonic waves US are likely to propagate through the metal foil 61 even with a long wavelength and a low frequency. During propagation through the metal foil 61, the ultrasonic waves US are attenuated by a small degree, and the resolution obtained from the wavelength of the ultrasonic waves US is good. On the other hand, even if the propagation distance of the ultrasonic waves US is equal, the propagation time becomes longer as the frequency is lower, which may result in a phenomenon in which the first sonic waveform overlaps the second sonic waveform.

The electrode paste 62 is made of a non-metal material having a lower density than the metal foil 61, and ultrasonic waves US having a long wavelength and a low frequency are less likely to propagate through the electrode paste 62, as compared with the metal foil 61, whereas ultrasonic waves US having a short wavelength and a high frequency are likely to propagate through the electrode paste 62. On the other hand, if the frequency of ultrasonic waves US transmitted through the electrode paste 62 is raised to an excessively high level, the propagation time becomes shorter in the case where the propagation distance of the ultrasonic waves US is equal, but the ultrasonic waves US are attenuated by a larger degree when propagating through the electrode paste 62, and the resolution obtained from the wavelength of the ultrasonic waves US deteriorates. Accordingly, the respective frequencies of the sending-side ultrasonic sensor 11A and the receiving-side ultrasonic sensor 12A (the first ultrasonic sensor 11 and the second ultrasonic sensor 12) are preferably set to be as low as possible within the range equal to or lower than 400 kHz, according to the thickness t (see FIG. 5) of the electrode paste 62, as described above, under the condition that the second sonic waveform does not overlap the first sonic waveform.

Figure 15:
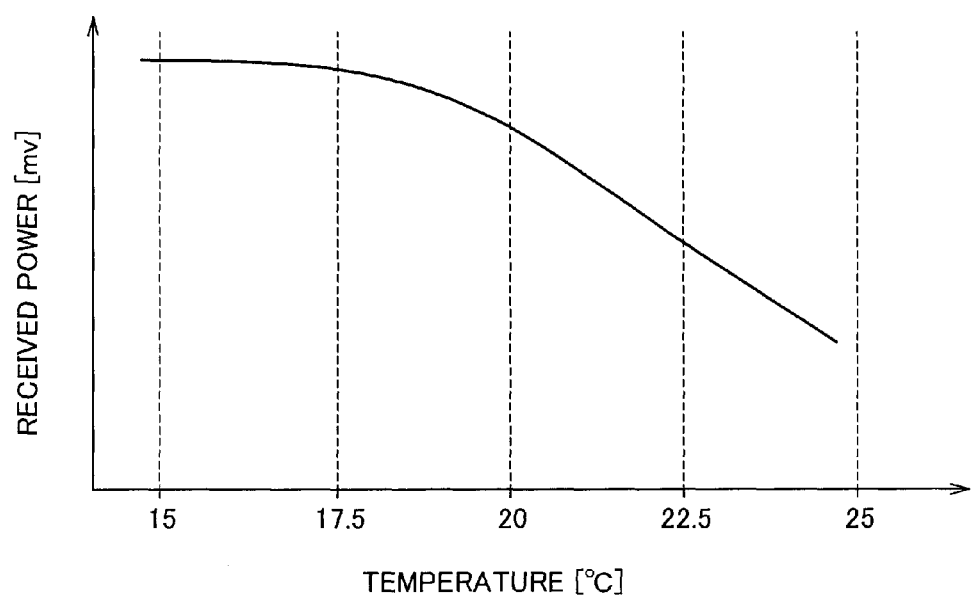
FIG. 15 is a graph indicating the relationship between the received power and the temperature of heat generated in the receiving-side ultrasonic sensor.

The relationship between the received power of ultrasonic waves US received by the receiving-side ultrasonic sensor 12A and the temperature of the receiving-side ultrasonic sensor 12A will be briefly explained with reference to FIG. 15. FIG. 15 is a graph indicating the relationship between the received power and the temperature in connection with the receiving-side ultrasonic sensor. As the operating time of the receiving-side ultrasonic sensor 12A gets longer, heat is generated in the receiving-side ultrasonic sensor 12A, and the received power as a result of conversion of received ultrasonic waves into voltage is reduced as the temperature of the receiving-side ultrasonic sensor 12A itself increases, as shown in FIG. 15. It is thus preferable to cool the first ultrasonic sensor 11 and the second ultrasonic sensor 12 and prevent the temperature of the receiving-side ultrasonic sensor 12A itself from increasing during measurement of the basis weight and coating profile of the electrode paste 62, so as to suppress or prevent reduction of the received power.

Figure 16:
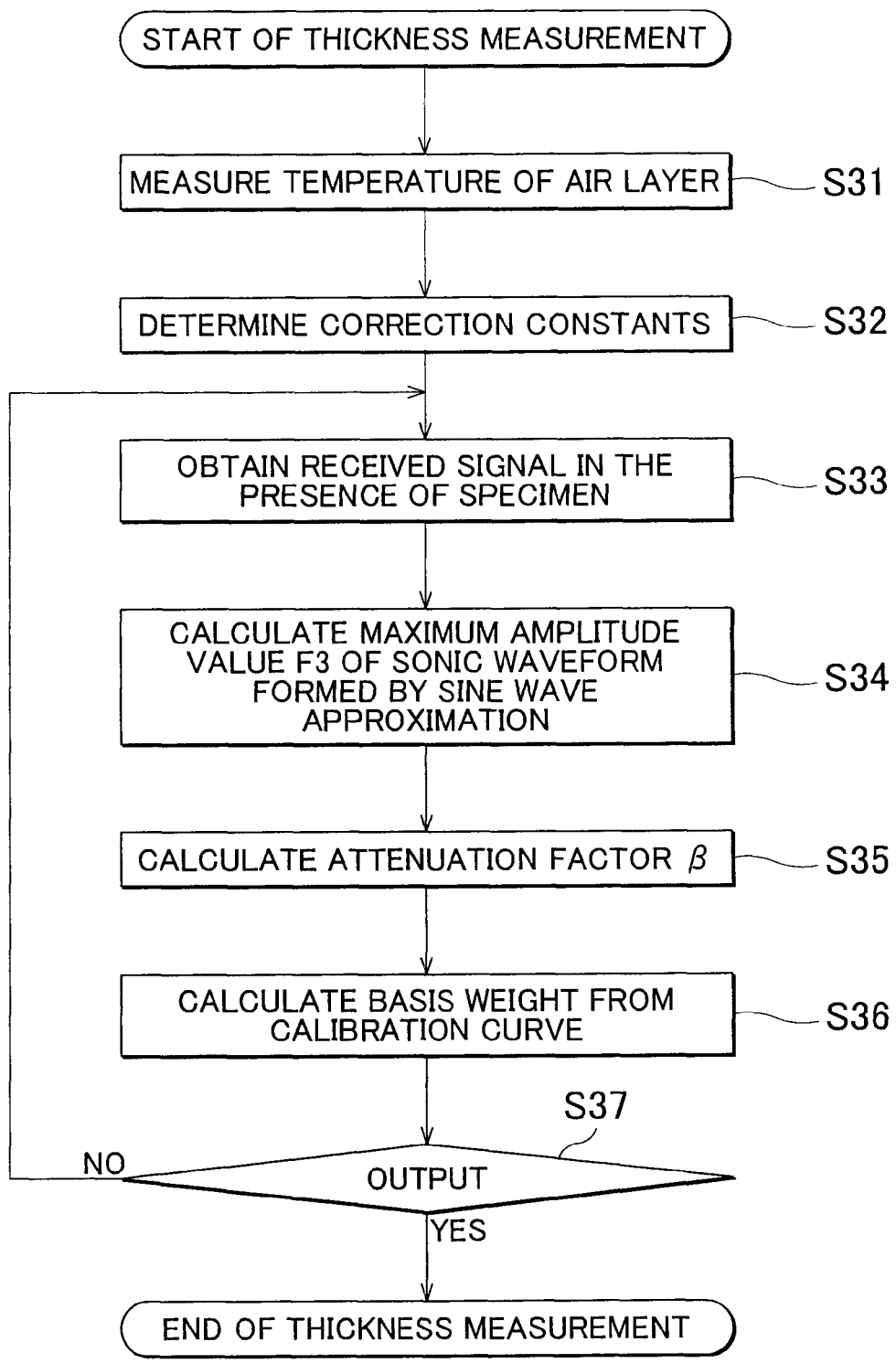
FIG. 16 is a flowchart illustrating the procedure of calculating the basis weight of the electrode paste, in the ultrasonic measuring system according to the first embodiment of the invention.

The procedure of measuring the thickness of the electrode paste 62, namely, determining the basis weight and coating profile of the electrode paste 62, according to the ultrasonic measuring method of this embodiment, will be described with reference to FIG. 16. FIG. 16 is a flowchart illustrating the procedure for calculating the basis weight of the electrode paste 62.

The ultrasonic measuring system 1 calculates the basis weight of the electrode paste 62, under a condition that calibration of the first and second ultrasonic sensors 11, 12 as described above is completed in the ultrasonic measuring system 1. As shown in FIG. 1, the sensor mounting portion 30 integral with the cover 35 is moved relative to the electrode 60 on the electrode production line (not shown), so that the thickness of the electrode paste 62 can be measured, in the measurement area MA in which the basis weight of the electrode paste 62 is measured.

Initially, in step S31, the temperature of the air layer AR in the opening 32 of the main body 31 within the cover 35 is measured by the thermometers 37. Then, in step S32, the sound velocity, density, and acoustic impedance corresponding to the temperature of the air layer AR are determined as correction constants, based on the above-indicated equations Eq. 2 through Eq. 4, and the temperature (e.g., the average of temperatures measured at eight locations in the opening 32) detected by the eight thermometers 37.

Then, in step S33, the first ultrasonic sensor 11 is oscillated once, in the first condition, to transmit ultrasonic waves US to the electrode 60 disposed in the air layer AR between the first ultrasonic sensor 11 and the second ultrasonic sensor 12, so that the ultrasonic waves US are transmitted through the metal foil 61 and electrode paste 62 (specimen) in the electrode 60. When the first ultrasonic sensor 11 is oscillated once where the nominal frequency of the first ultrasonic sensor 11 and the second ultrasonic sensor 12 is in the vicinity of 400 kHz, and the probe-to-probe distance of the first and second ultrasonic sensors 11, 12 is about 70 mm, the second ultrasonic sensor 12 provides a received signal in the form of a sonic waveform formed by ultrasonic waves US (transmitted waves) of about 30 pulses transmitted through the specimen (the electrode paste 62) and the metal foil 61.

When the ultrasonic oscillation control unit 10 switches the first and second ultrasonic sensors 11, 12 from the first condition to the second condition, the second ultrasonic sensor 12 is oscillated once, so that ultrasonic waves US sent from the second ultrasonic sensor 12 are transmitted through the electrode paste 62 (specimen) and the metal foil 61 in the electrode 60. When the second ultrasonic sensor 12 is oscillated once, the first ultrasonic sensor 11 provides a received signal in the form of a sonic waveform formed by ultrasonic waves US (transmitted waves) of about 30 pulses transmitted through the metal foil 61 and the specimen (the electrode paste 62). In step S33, no matter whether the first and second ultrasonic sensors 11, 12 are in the first condition or the second condition, the sonic waveform formed by about 30 pulses of transmitted waves US is obtained as the first sonic waveform, under a condition that the amplitude of the second sonic waveform is the maximum value, which means that the electrode 60 is located exactly at the middle position between the sending-side ultrasonic sensor 11A and the receiving-side ultrasonic sensor 12A, as shown in FIG. 9 and FIG. 10.

Then, in step S34, the maximum amplitude value F3 of the corrected waveform approximate to a sine wave is calculated, based on the above-described first sonic waveform obtained in step S33. More specifically, the initial 5 pulses or so of transmitted waves US, out of about 30 pulses of the obtained transmitted waves US, cannot be obtained as a stable received signal; therefore, the remaining 25 pulses or so of transmitted waves US, which are stabilized, are corrected by averaging, or the like, into a sonic waveform as approximation of a sine wave, and the maximum amplitude value F3 of the corrected waveform as approximation of a sine wave is calculated. Two types of maximum amplitude values F3 are obtained for the cases of the first condition and the second condition.

Then, in step S35, attenuation factors β of transmitted waves US when transmitted through the electrode 60 are calculated for the cases of the first condition and the second condition, respectively. More specifically, the attenuation factor β is calculated based on the maximum amplitude value F3 calculated in step S34, and the maximum amplitude value F1 calculated in step S14, in FIG. 8, by multiplying F3/F1 by 100 (F3/F1×100).

Then, in step S36, the basis weight of the electrode 60 corresponding to each of the two attenuation factors β calculated in step S35 is calculated, based on the actual-measurement calibration curve of the electrode 60, which was created in advance. More specifically, if the frequency of the receiving-side ultrasonic sensor 12A is 165 kHz, and the attenuation factor β is 1.0%, in the first condition, it can be read from the actual-measurement calibration curve as shown in FIG. 7 that the basis weight of the electrode 60 is about 75 g/m². Also, if the frequency of the receiving-side ultrasonic sensor 12A is 92 kHz, and the attenuation factor β is 1.7%, in the second condition switched from the above-indicated first condition, it can be read from the actual-measurement calibration curve for the electrode 60 as shown in FIG. 7 that the basis weight of the electrode 60 is about 80 (g/m²).

Then, in step S37, the basis weights of the electrode paste 62 are calculated from differences between the two types of basis weights of the electrode 60 calculated in step S36 and the basis weights of the metal foil 61, and it is determined whether the calculated basis weights of the electrode paste 62 are reliable values that are within a permissible range of measurement errors. Namely, in the case as illustrated in step S36, if the frequency of the receiving-side ultrasonic sensor 12A is 165 Hz, in the first condition, and the attenuation factor of transmitted waves transmitted through the metal foil 61 is γ1, it is read from the actual-measurement calibration curve for the metal foil 61, which was prepared in advance, that the basis weight of the metal foil 61 is s1 (g/m²). If the frequency of the receiving-side ultrasonic sensor 12A is 92 kHz, in the second condition, and the attenuation factor of transmitted waves transmitted through the metal foil 61 is γ2, it is read from the actual-measurement calibration curve for the metal foil 61, which was prepared in advance, that the basis weight of the metal foil 61 is s2 (g/m²).

In step S36, a difference obtained by subtracting the basis weight s1 (g/m²) of the metal foil 61 calculated in the first condition, from the basis weight of the electrode 60 calculated in the first condition, namely, about 75 g/m², provides the basis weight t1 (g/m²) of the electrode paste 62 calculated in the first condition. Also, a difference obtained by subtracting the basis weight s2 (g/m²) of the metal foil 61 calculated in the second condition, from the basis weight of the electrode 60 calculated in the second condition, namely, about 80 (g/m²), provides the basis weight t2 (g/m²) of the electrode paste 62 calculated in the second condition.

The operator determines whether each of the calculated values of the basis weight t1 (g/m²) of the electrode paste 62 in the first condition and the basis weight t2 (g/m²) of the electrode paste 62 in the second condition is a reliable value within the permissible range of measurement errors, as the basis weight of the electrode paste 62 of the electrode 60 actually produced in the electrode production line. If it is determined that the calculated values of the basis weights t1, t2 (g/m²) of the electrode paste 62 are normal values, the two basis weights t1, t2 (g/m²) are subjected to arithmetic processing, such as averaging, and the resulting measurement value is obtained as the basis weight of the electrode paste 62 of the electrode 60 measured on the line. Then, the measurement is finished (YES is obtained in step S37).

If the calculated values of the basis weights t1, t2 (g/m²) are largely different from each other, or are larger different from a design value of the basis weight of the electrode paste 62, for the electrode 60 produced on the electrode production line, the basis weights t1, t2 (g/m²) are not determined as normal values, and the control returns to step S33 (NO is obtained in step S37), without performing the above-mentioned arithmetic processing on the two types of basis weights t1, t2 (g/m²). If there is a problem in the measurement process down to calculation of the basis weights, the above-described steps are executed after the control returns to step S33, until the problem is solved.

Next, the measurement of the coating profile of the electrode paste 62 will be described with reference to FIG. 6. As a precondition for the measurement of the coating profile of the electrode paste 62, two first ultrasonic sensors 11 located at the opposite sides as viewed in the width direction WD, out of the four first ultrasonic sensors 11, and two second ultrasonic sensors 12 paired with the two first ultrasonic sensors 11 are positioned so that the edge portions 62C of the electrode paste 62 are included, at the opposite sides in the width direction WD, within the irradiation area MB (see FIG. 1) irradiated by the four first ultrasonic sensors 11. In the ultrasonic measuring method according to this embodiment, the masks 40 are used for partially blocking propagation of ultrasonic waves US, between the first ultrasonic sensors 11 and the second ultrasonic sensors 12. After the masks 40 are moved to and placed at positions corresponding to the edge portions 62C of the electrode paste 62 and their peripheries, between the electrode 60 and the second ultrasonic sensors 12, the first ultrasonic sensors 11 transmit ultrasonic waves US toward the edge portions 62C of the electrode paste 62, and the ultrasonic waves are received by the corresponding second ultrasonic sensors 12.

Namely, in the electrode 60 actually produced in the electrode production line, the width dimensions of the metal foil 61 and the electrode paste 62 may be respectively different depending on the specifications. In the electrode 60, edge portions 62C are present at the opposite sides of the electrode paste 62 as viewed in the width direction WD. As shown in FIG. 5 and FIG. 6, the edge portion 62C is inclined relative to one surface 61a of the metal foil 61, and the thickness t of the electrode paste 62 gradually increases from 0 (t=0) in the edge portion 62C. Two masks 40 are respectively moved to the locations of the edge portions 62C of the electrode paste 62, and are stopped when the edge portions 62C are located in portions corresponding to the mask openings 41, as shown in FIG. 6.

Then, in the two pairs of first and second ultrasonic sensors 11, 12 located at the opposite sides as viewed in the width direction WD, out of the four pairs of first and second ultrasonic sensors 11, 12, the first ultrasonic sensors 11 send ultrasonic waves US toward the electrode 60 for irradiation thereof. Since the first ultrasonic sensors 11 are flat-type transmitting sensors, and the second ultrasonic sensors 12 are flat-type receiving sensors, the ultrasonic waves US sent from each of the first ultrasonic sensors 11 and transmitted through the electrode 60 are divided into a portion that reaches the mask 40, and a portion that passes through the mask opening 41 of the mask 40 and is received by the second ultrasonic sensor 12, as shown in FIG. 6. The ultrasonic waves US that reach the mask 40 are absorbed by the mask 40, so as not to be transmitted through the mask 40.

A second embodiment of the invention will be described with regard to the case where electrode paste is applied by coating to opposite surfaces of a metal foil. This embodiment is different from the first embodiment in the presence of third ultrasonic sensors 13, locations of the first and second ultrasonic sensors 11, 12, and so forth, but is identical with the first embodiment in respect of the other portions. Thus, the differences of the second embodiment from the first embodiment will be mainly described, and explanation of the other portions will be simplified or omitted.

Figure 17:
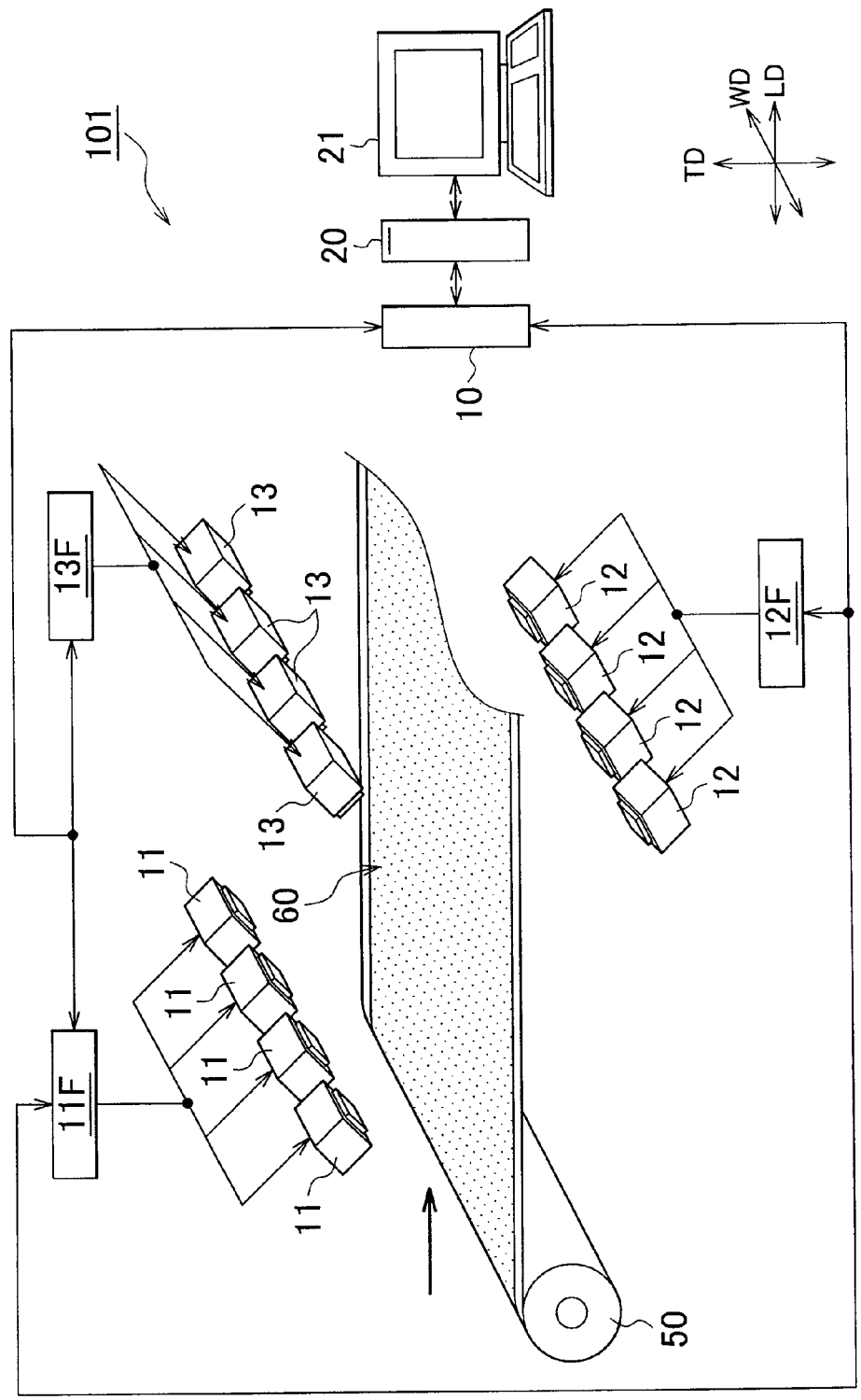
FIG. 17 is a schematic view useful for explaining the configuration of an ultrasonic measuring system according to a second embodiment of the invention, in which a sensor mounting portion integral with a cover is not illustrated, for easy viewing.
Figure 18:
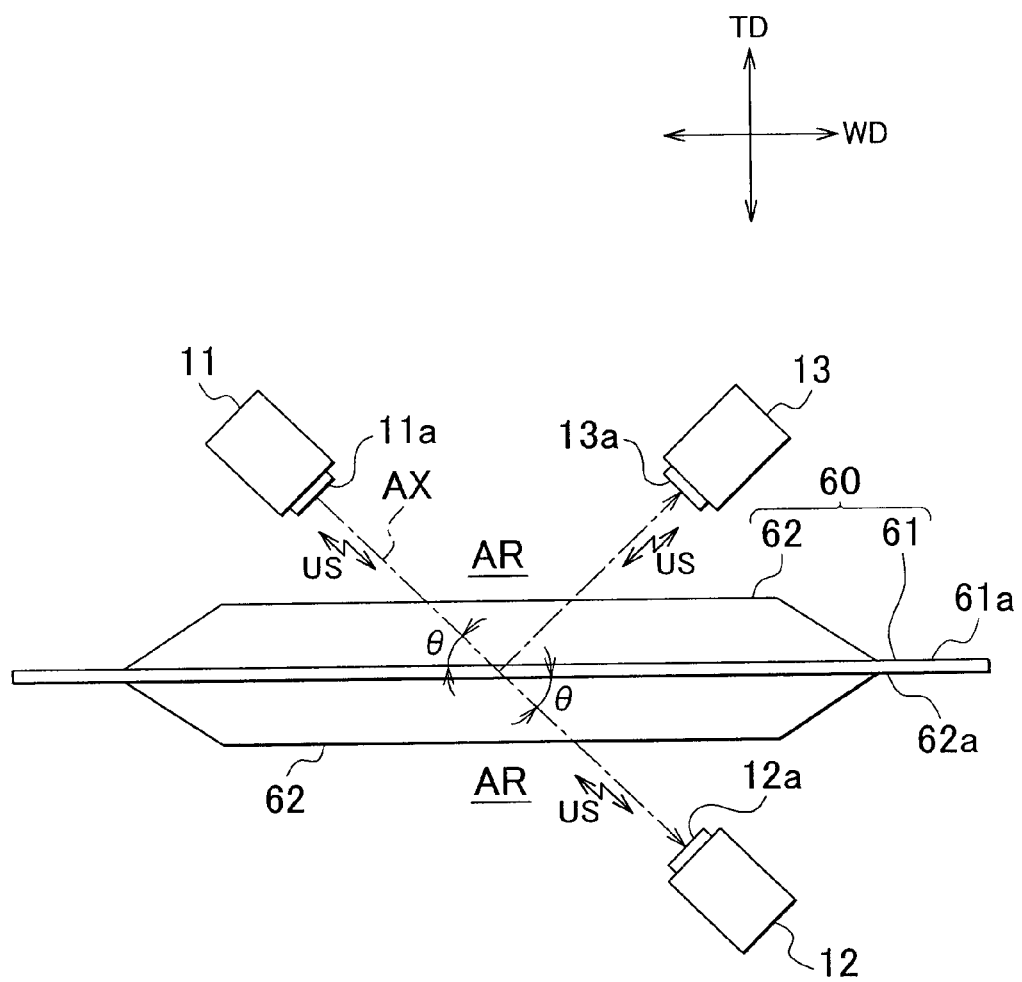
FIG. 18 is a side view of an electrode as viewed in the width direction, which is useful for explaining the manner of determining the basis weight of electrode paste applied by coating to both surfaces of a metal foil.

FIG. 17 is a schematic view useful for explaining the construction of an ultrasonic measuring system according to the second embodiment of the invention. In FIG. 17, the sensor mounting portion integral with the cover is not illustrated for the sake of easy understanding. FIG. 18 is a side view of the electrode as viewed in the width direction WD, and is useful for explaining the manner of checking the basis weight of the electrode paste applied by coating to the opposite surfaces of the metal foil.

As shown in FIG. 17 and FIG. 18, the ultrasonic measuring system 101 of this embodiment has four third ultrasonic sensors 13, which are flat-type sensors that permit propagation of unfocused ultrasonic waves. The first ultrasonic sensors 11 and the third ultrasonic sensors 13 are located on one side of the electrode 60 via the air layer AR, such that ultrasonic waves US are regularly reflected between the first ultrasonic sensors 11 and the third ultrasonic sensors 13. Also, the second ultrasonic sensors 12 are located so as to face the first ultrasonic sensors 11 in the axial directions AX thereof, via the electrode 60 disposed between the first ultrasonic sensors 11 and the second ultrasonic sensors 12.

The third ultrasonic sensors 13 are flat-type sensors. Namely, in this embodiment, each of the third ultrasonic sensors 13 has one third vibration surface 13a that receives ultrasonic waves US, and the third vibration surface 13a as a whole is formed in a rectangular shape. The third ultrasonic sensor 13 can receive, at the third vibration surface 13a, ultrasonic waves (reflected waves) US transmitted from the first ultrasonic sensor 11 and reflected by at least the electrode 60, via the air layer AR. Like the first and second ultrasonic sensors 11, 12, the third ultrasonic sensor 13 is also able to receive ultrasonic waves, and is of the same frequency band of 400 kHz or lower.

One first ultrasonic sensor 11, one second ultrasonic sensor 12, and one third ultrasonic sensor 13 constitute one set of ultrasonic sensors, and four sets of first, second and third ultrasonic sensors 11, 12, 13 are mounted in the sensor mounting portion 30 integral with the cover 35 (not shown in FIG. 17), as in the first embodiment. The first ultrasonic sensors 11 and the second ultrasonic sensors 12 are positioned at an angle of 13° (θ=13° in FIG. 18), for example, relative to the metal foil 61 of the electrode 60, and the third ultrasonic sensors 13 are positioned at an angle at which the sensors 13 receive ultrasonic waves US transmitted from the first ultrasonic sensors 11 and regularly reflected by the electrode 60.

As shown in FIG. 17, the four third ultrasonic sensors 13 are electrically connected to a third ultrasonic oscillator 13F. The third ultrasonic oscillator 13F has an oscillating circuit for applying a voltage to the third vibration surfaces 13a to produce ultrasonic vibrations, and a receiving circuit for converting ultrasonic vibrations of the third vibration surfaces 13a that received ultrasonic waves, into a voltage signal, and receiving the voltage signal. The first ultrasonic oscillator 11F, the second ultrasonic oscillator 12F, and the third ultrasonic oscillator 13F are electrically connected to the ultrasonic oscillation control unit 10.

The ultrasonic oscillation control unit 10 controls sending and receiving of ultrasonic waves US between the first ultrasonic sensors 11 and the second ultrasonic sensors 12, and also controls sending and receiving of ultrasonic waves US between the first ultrasonic sensors 11 and the third ultrasonic sensors 13. The ultrasonic oscillation control unit 10 switches the first ultrasonic sensors 11 and the third ultrasonic sensors 13 between the sending side and the receiving side, so as to perform calibration between the first ultrasonic sensors 11 and the third ultrasonic sensors 13 in the same manner as calibration conducted between the first ultrasonic sensors 11 and the second ultrasonic sensors 12 in the first embodiment as explained above.

Next, an ultrasonic measuring method according to this embodiment of the invention will be described. The ultrasonic measuring system 101 is used for measuring the basis weight of the electrode paste 62 applied by coating to one surface 61a of the metal foil 61, and the basis weight of the electrode paste 62 applied by coating to the other surface 61b of the metal foil 61. Before the measurements of the basis weights, the attenuation factor of ultrasonic waves US when transmitted through the electrode 60, and the attenuation factor β of ultrasonic waves US when transmitted through the metal foil 61 are grasped in advance, and calibration of the first, second and third ultrasonic sensors 11, 12, 13 is completed. An actual-measurement calibration curve for the electrode 60 in which both surfaces, i.e., one surface 61a and the other surface 61b, of the metal foil 61 are coated with the electrode paste 62, an actual-measurement calibration curve for the electrode 60 in which one surface 61a of the metal foil 61 is coated with the electrode paste 62, and an actual-measurement calibration curves for the metal foil 61 are created in advance.

In the ultrasonic measuring method according to this embodiment, a flat-type sensor that permits propagation of unfocused ultrasonic waves US is used as the third ultrasonic sensor 13, and the first ultrasonic sensor 11 and the third ultrasonic sensor 13 are located on one side of the electrode 60 via the air layer AR, such that ultrasonic waves US are regularly reflected between the first ultrasonic sensor 11 and the third ultrasonic sensor 13, while the second ultrasonic sensor 12 is located so as to face the first ultrasonic sensor 11 in the axial direction AX thereof, via the electrode 60.

The operations and effects of the ultrasonic measuring methods and ultrasonic measuring systems according to the illustrated embodiments of the invention will be described. In the ultrasonic measuring method according to the first or second embodiment, a pair of first ultrasonic sensor 11 and second ultrasonic sensor 12 are provided, and the first ultrasonic sensor 11 is placed on one side, as viewed in the thickness direction TD, of the electrode 60 formed by coating one surface 61a or both surfaces 61a, 61b of the metal foil 61 that was wound in the form of a roll, with the electrode paste 62, via the air layer AR, while the second ultrasonic sensor 12 is placed on the other side of the electrode 60, via the air layer AR. The thickness t of the electrode paste 62 is measured by transmitting ultrasonic waves US between the first ultrasonic sensor 11 and the second ultrasonic sensor 12. The ultrasonic measuring method is characterized in that a flat-type transmitting sensor that permits propagation of unfocused ultrasonic waves US is used as the first ultrasonic sensor 11, and a flat-type receiving sensor that permits propagation of unfocused ultrasonic waves US is used as the second ultrasonic sensor 12. Thus, in the battery production process, when the thickness t of the electrode paste 62, or the basis weight and coating profile of the electrode paste 62, is measured in the production line in which the electrode 60 is produced by coating the metal foil 61 with the electrode paste 62, ultrasonic waves US are transmitted from the first ultrasonic sensor 11 to the electrode 60 so that a wide area (irradiation area MB) of the electrode 60 is irradiated with the ultrasonic waves US, and are transmitted through the metal foil 61 and the electrode paste 62 in the electrode 60. Then, the second ultrasonic sensor 12 receives the ultrasonic waves (transmitted waves) transmitted through the metal foil 61 and the electrode paste 62 over wide regions thereof, so that a received signal for determining the thickness t of the electrode paste 62 can be obtained over a wider range of the electrode 60, as compared with the spot-type ultrasonic sensor of the related art as disclosed in JP-A-2008-102160.

Namely, a flat-type transmitting sensor that permits propagation of unfocused ultrasonic waves US is used as the first ultrasonic sensor 11, and a flat-type receiving sensor that permits propagation of unfocused ultrasonic waves US is used as the second ultrasonic sensor 12. With this arrangement, the first ultrasonic sensor 11 transmits ultrasonic waves US to at least within the area of the electrode 60 which is opposed to the first vibration surface 11a, via the air layer AR, and the second ultrasonic sensor 12 receives, at the second vibration surface 12a, the ultrasonic waves (transmitted waves) US sent from the first ultrasonic sensor 12 for irradiation and transmitted through at least the electrode 60, via the air layer AR. Accordingly, in the ultrasonic measuring method of the first or second embodiment, the second ultrasonic sensor 12 provides a received signal for determining the thickness t of the electrode paste 62, for a wider region or range of the electrode 60, as compared with the spot-type ultrasonic sensor. Thus, quality check regarding the thickness t of the electrode paste 62, or the basis weight and coating profile of the electrode paste 62, can be carried out on the production line of the electrode 60.

Since the received signal representing the transmitted waves US received by the second ultrasonic sensor 12 can be obtained from a wide region of the electrode 60, the thickness t of the electrode paste 62 can be detected over a wider range of the electrode 60. Therefore, variations in the thickness t of the electrode paste 62 within the measurement range can be correctly or accurately grasped, and the overall thickness t of the electrode paste 62, or the basis weight of the electrode paste 62, in the irradiation area MB of the electrode 60 irradiated by the first and second ultrasonic sensors 11, 12 can be measured with high reliability. On the other hand, the examination of the coating profile of the electrode paste 62 is conducted by measuring the thickness of the electrode paste 62 over a given range, at each edge portion 62C of the electrode paste 62, so that the overall shape of the edge portion 62C is grasped. Thus, since the thickness t of the electrode paste 62 can be detected over a wider range in the electrode 60, the coating profile of the electrode paste 62 can be measured with improved accuracy, as compared with measuring methods of the related art using the radiation measuring system, or the spot-type ultrasonic sensor as disclosed in JP-A-2008-102160.

Figure 19:
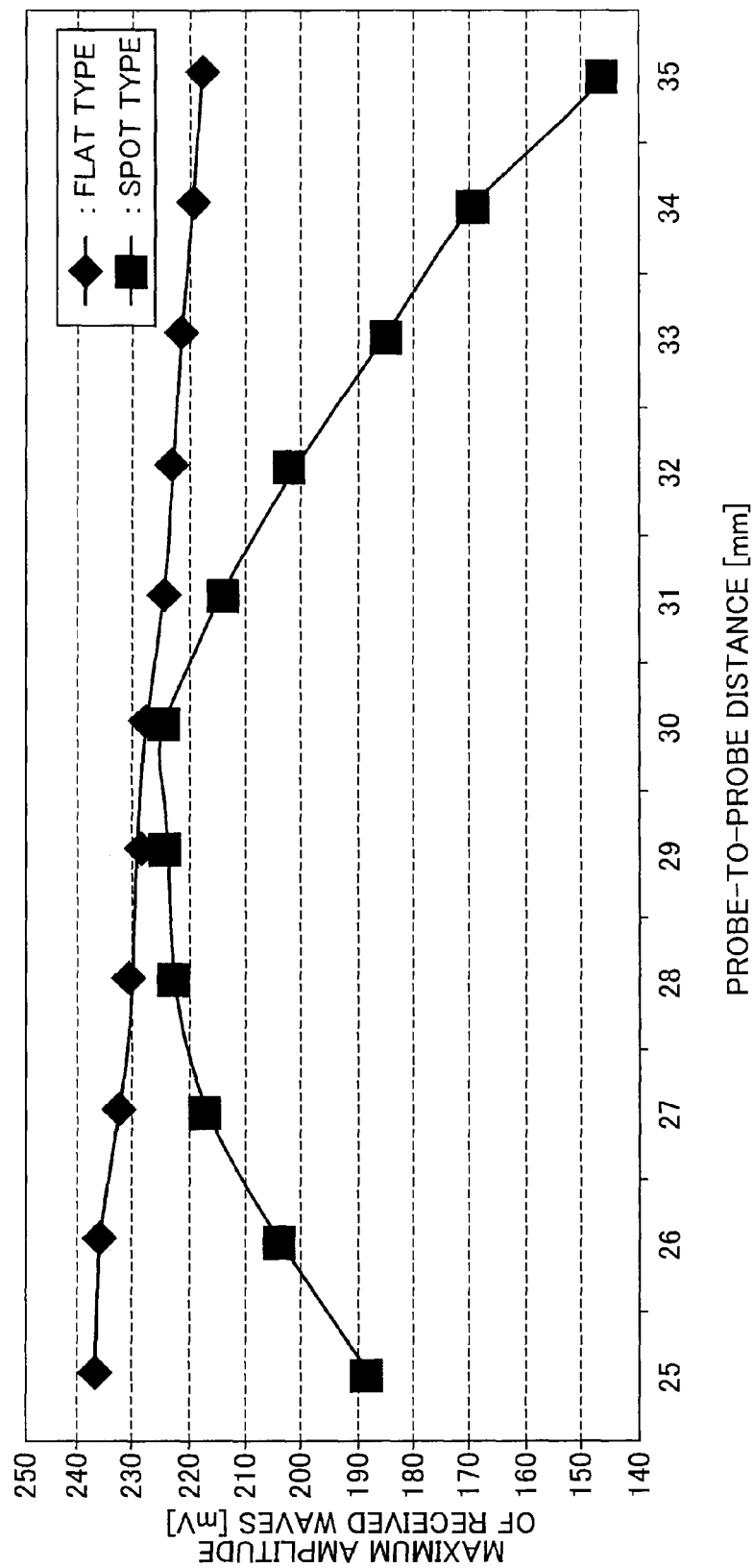
FIG. 19 is a graph indicating the relationship between the probe-to-probe distance between a sending-side ultrasonic sensor and a receiving-side ultrasonic sensor, and the maximum amplitude of received ultrasonic waves received by the receiving-side ultrasonic sensor, for comparison between a spot-type ultrasonic sensor and a flat-type ultrasonic sensor.

FIG. 19 is a graph indicating the relationship between the probe-to-probe distance between the sending-side ultrasonic sensor and the receiving-side ultrasonic sensor, and the maximum amplitude of ultrasonic waves received by the receiving-side ultrasonic sensor, for comparison between a spot-type ultrasonic sensor and a flat-type ultrasonic sensor. As shown in FIG. 19, in the flat-type ultrasonic sensor, even if the probe-to-probe distance changes largely, the amplitude of the received waves received by the receiving-side ultrasonic sensor does not change largely with the probe-to-probe distance. On the other hand, in the spot-type ultrasonic sensor of the related art as disclosed in JP-A-2008-102160, the amplitude of the received waves received by the receiving-side ultrasonic sensor changes by a larger amount, even within the same range of probe-to-probe distance, as compared with the flat-type ultrasonic sensor. For example, even if the probe-to-probe distance changes by 1 mm, the amplitude of the received waves may be reduced by 10% to 20%, depending on the probe-to-probe distance. Accordingly, if the flat-type ultrasonic sensors are used for measuring or examining the basis weight and coating profile of the electrode paste 62, the measurement accuracy is not largely influenced by some change in the probe-to-probe distance, and the basis weight and coating profile can be measured with high accuracy.

In the quality check of the related art in which a difference in weight between a sample (metal foil) that has not been coated with the electrode paste 62 and a sample coated with the electrode paste 62 is measured, the basis weight and coating profile of the electrode paste 62 cannot be accurately determined. Furthermore, the quality check is conducted outside the production line, using samples of the electrode 60 taken out of the production line; therefore, an extra or additional step for performing the quality check is required, resulting in increased cost. Also, the quality check using the radiation measuring system suffers from excessively high equipment cost since the radiation measuring system is considerably expensive.

In the ultrasonic measuring method according to the first or second embodiment, on the other hand, the production line for producing the electrode 60 need not be stopped, and the quality check can be performed during operation of the line; therefore, an extra or additional step for performing the quality check is not required, and the cost will not be increased. Also, the equipment cost of the system (ultrasonic measuring system 1) constituted by the first ultrasonic sensors 11, the second ultrasonic sensors 12, etc., and used in the ultrasonic measuring method of the first or second embodiment is lower than that of the radiation measuring system, and the cost reflected by the electrode 60 can be largely reduced. Accordingly, the ultrasonic measuring method of the first or second embodiment produces an excellent effect that the thickness t of the electrode paste 62 applied by coating to the electrode 60 can be measured on the production line in which the electrode 60 is produced, at low cost, with high reliability and high measuring accuracy.

In the ultrasonic measuring method according to the first or second embodiment, sensors capable of sending and receiving ultrasonic waves US are used as the first ultrasonic sensor 11 and the second ultrasonic sensor 12, and the ultrasonic oscillation control unit 10 is provided for controlling sending and receiving of ultrasonic waves US, between the first ultrasonic sensor 11 and the second ultrasonic sensor 12. The first and second ultrasonic sensors 11, 12 are in the first condition when the first ultrasonic sensor 11 sends ultrasonic waves, and the second ultrasonic sensor 12 receives the ultrasonic waves, and are in the second condition when the second ultrasonic sensor 12 sends ultrasonic waves, and the first ultrasonic sensor 11 receives the ultrasonic waves. The ultrasonic oscillation control unit 10 switches the first ultrasonic sensor 11 and the second ultrasonic sensor 12 between the first condition and the second condition, so that the first ultrasonic sensor 11 operates differently from the second ultrasonic sensor 12. With this arrangement, the thickness t of the electrode paste 62 can be determined with high accuracy, assuring improved measuring reliability, based on two types of received wave signals, namely, a second received wave signal representing waves received by the second ultrasonic sensor 12 in the first condition, and a first received wave signal representing waves received by the first ultrasonic sensor 11 in the second condition.

Namely, in the ultrasonic measuring method according to the first or second embodiment, ultrasonic sensors having nominal frequencies in the same frequency band are used as the first ultrasonic sensor 11 and the second ultrasonic sensor 12. Generally, ultrasonic sensors have slightly different frequencies, in a strict sense, even though they are of the same frequency band, and individual ultrasonic sensors have specific or inherent frequencies. The ultrasonic measuring method according to the first or second embodiment utilizes the inevitable occurrence of such a difference in frequency between the first ultrasonic sensor 11 and the second ultrasonic sensor 12, due to the nature of ultrasonic sensors. Namely, where the first ultrasonic sensor 11 has a frequency $f1(f)$ as a specific characteristic value, and the second ultrasonic sensor 12 has a frequency $f2(f)$ as a specific characteristic value, the frequency $f1$ and the frequency $f2$ are substantially equal to each other, i.e., $f1 \approx f2$.

As described above, the sound velocity, density, and acoustic impedance in the air are determined according to the following equations. (1) Sound velocity $C = f \times \lambda$ ... Eq. 1 where C is sound velocity (m/sec), f is frequency (kHz), and $\lambda$ is wavelength (m), or $C=331.5+(0.61\times t)$ ... Eq. 2 where t is temperature (° C.). (2) Density $\rho=1.293\times(273.15/(273.15+t))\times(P/1013.25)$ ... Eq. 3 where $\rho$ is density (kg/m$^3$) (ntp), t is temperature (° C.), and P is atmospheric pressure (atm). (3) Acoustic impedance $Z = \rho \times C$ ... Eq. 4 where Z is acoustic impedance (Pa·s/m).

From Eq. 1 and Eq. 4 above, $\lambda = Z/f/\rho$ ... Eq.5 is obtained. Since the sound velocity, density, and acoustic impedance in the air, under atmospheric pressure, are proportional to the temperature of the air, as indicated in Eq. 1 through Eq. 3, the wavelength $\lambda$ is inversely proportional to the frequency f if the acoustic impedance and the density are regarded as constants that vary with changes in temperature.

Namely, when the system is in the first condition, ultrasonic waves US sent from the first ultrasonic sensor 11 of the frequency $f1(f)$ are transmitted through the electrode 60, and are received by the second ultrasonic sensor 12 of the frequency $f2(f)$. In this case, the wavelength $\lambda 2$ (the second received wave signal) of the ultrasonic waves (transmitted waves) US received by the second ultrasonic sensor 12, which is obtained from Eq. 5, is expressed as $\lambda 2 = Z2/f2/\rho 2$, where $\lambda 2$ is the wavelength (m) of the ultrasonic waves US received by the second ultrasonic sensor 12, and $Z2$ and $\rho 2$ are constants. When the system is in the second condition, ultrasonic waves sent from the second ultrasonic sensor 12 of the frequency $f2(f)$ are transmitted through the electrode 60, and are received by the first ultrasonic sensor 11 of the frequency $f1(f)$. In this case, the wavelength $\lambda 1$ (the first received wave signal) of the transmitted waves US received by the first ultrasonic sensor 11, which is obtained from Eq. 5, is expressed as $\lambda 1 = Z1/f1/\rho 1$, where $\lambda 1$ is the wavelength (m) of the ultrasonic waves US received by the first ultrasonic sensor 11, and $Z1$ and $\rho 1$ are constants. Since the constants have relationships that $Z1 \approx Z2$ and $\rho 1 \approx \rho 2$ and the frequencies have a relationship that $f1 \approx f2$, the wavelength $\lambda 1$ as the first received wave signal and the wavelength $\lambda 2$ as the second received wave signal have a relationship that $\lambda 1 \approx \lambda 2$.

If the thickness t of the electrode paste 62 is obtained based on a received wave signal representing waves received by only one ultrasonic sensor, it is difficult for the operator to determine whether the received wave signal was obtained in normal conditions at the time of measurement, and the measurement lacks reliability. On the other hand, in the ultrasonic measuring method according to the first or second embodiment, the ultrasonic oscillation control unit 10 switches the first ultrasonic sensor 11 and the second ultrasonic sensor 12 between the first condition and the second condition so that the first ultrasonic sensor 11 operates differently from the second ultrasonic sensor 12. With this arrangement, when the thickness t of the electrode paste 62 is obtained in view of changes in the temperature of the air during measurement, the thickness t can be measured based on two types of received signals, i.e., the second received wave signal ($\lambda 2$) of ultrasonic waves US received by the second ultrasonic sensor 12 when the system is in the first condition, and the first received wave signal ($\lambda 1$) of ultrasonic waves US received by the first ultrasonic sensor 11 when the system is in the second condition.

By using the first received wave signal and the second received wave signal, the operator can determine that the received wave signals were obtained in normal conditions at the time of measurement, if the first received wave signal and the second received wave signal have a relationship that λ1βλ2.

Figure 20:
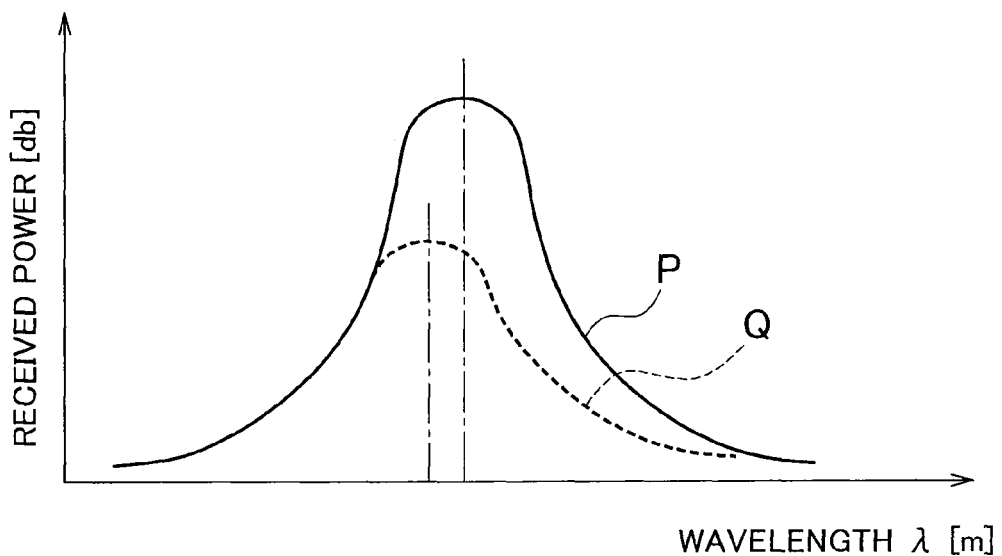
FIG. 20 is a graph indicating the relationship between the wavelength of ultrasonic waves received, and the received power.

FIG. 20 is a graph indicating the relationship between the wavelength of received ultrasonic waves and the received power. In ultrasonic sensors, there is generally a certain correlation between the magnitude of received power of ultrasonic waves (ultrasonic wave strength) and the wavelength of received ultrasonic waves, as a characteristic of sonic propagation. The ultrasonic wave strength changes along a normal distribution curve having a peak value at a given wavelength, as shown in FIG. 20. If the wavelength shifts to be a little shorter or longer than the given wavelength corresponding to the peak value, the ultrasonic wave strength is reduced largely from the peak value. Also, if received ultrasonic waves P, Q have different wavelengths, and the given wavelength corresponding to the peak value is different between the ultrasonic waves P and the ultrasonic waves Q, there arises a large difference between the magnitude of the ultrasonic wave strength of the received ultrasonic waves P and that of the received ultrasonic waves Q. If the first received wave signal and the second received wave signal have a relationship that λ1≈λ2, the peak value of the ultrasonic wave strength corresponding to the first received wave signal λ1 and the peak value of the ultrasonic wave strength corresponding to the second received wave signal λ2 are close to substantially the same peak value, and the ultrasonic waves received by the first ultrasonic sensor 11 and the ultrasonic waves received by the second ultrasonic sensor 12 have substantially the same strength.

In the ultrasonic measuring method of the first or second embodiment, if the attenuation factor of ultrasonic waves US when transmitted through the metal foil 61, or the thickness of the metal foil 61, is grasped in advance, prior to measurement of the thickness t of the electrode paste 62, and the thickness of the electrode paste 62 is then calculated, based on the first received wave signal and second received wave signal of which the ultrasonic wave strength has substantially the same peak value, highly reliable, and highly accurate measurement can be achieved. Thus, the thickness t of the electrode paste 62 can be obtained with high accuracy, based on the first received wave signal and the second received wave signal.

In the ultrasonic measuring method according to the second embodiment of the invention, a flat-type sensor that permits propagation of unfocused ultrasonic waves US is used as the third ultrasonic sensor 13, and the first ultrasonic sensor 11 and the third ultrasonic sensor 13 are disposed on one side of the electrode 60 via the air layer AR, such that ultrasonic waves US are regularly reflected between the first ultrasonic sensor 11 and the third ultrasonic sensor 13, while the second ultrasonic sensor 12 is disposed on the other side of the electrode 60 so as to face the first ultrasonic sensor 11 in the axial direction AX thereof via the electrode 60. With this arrangement, for the electrode 60 in which the opposite surfaces 61a, 61b of the metal foil 61 are coated with the electrode paste 62, the thickness t of the electrode paste 62 on one surface 61a of the metal foil 61 is measured based on a received signal produced by transverse waves of ultrasonic waves received by the third ultrasonic sensor 13, and the thickness t of the electrode paste 62 on the other surface 61b of the metal foil 61 is measured at the same time, based on a received signal produced by longitudinal waves of ultrasonic waves US received by the second ultrasonic sensor 12.

Namely, before the measurement of the thickness t of the electrode paste 62, the basis weight of the metal foil 61 is grasped in advance, from a calibration curve for the metal foil 61 created based on the attenuation factor, as a substrate transmission signal generated when ultrasonic waves US are transmitted through the metal foil 61 in a condition where the metal foil 61 is not coated with the electrode paste 62. In the ultrasonic measuring method of the second embodiment, ultrasonic waves US sent from the first ultrasonic sensor 11 are transmitted as transverse waves to the metal foil 61 via the electrode paste 62 on one surface 61a of the metal foil 61, and are regularly reflected by the metal foil 61, and the third ultrasonic sensor 13 receives the reflected waves US via the electrode paste 62 on one surface 61a of the metal foil 61. Thus, the third ultrasonic sensor 13 obtains a substrate reflection signal when receiving the reflected waves US regularly reflected by one surface 61a of the metal foil 61, and determines the basis weight (thickness t) of the electrode paste 62 on one surface 61a of the metal foil 61, based on the substrate reflection signal.

On the other hand, at the same time that the ultrasonic waves US are transmitted from the first ultrasonic sensor 11 to the third ultrasonic sensor 13, ultrasonic waves US sent from the first ultrasonic sensor 11 are transmitted as longitudinal waves through the electrode paste 62 on one surface 61a of the metal foil 61, the metal foil 61, and the electrode paste 62 on the other surface 61b of the metal foil 61, and the second ultrasonic sensor 12 receives the transmitted waves that passed through the electrode 60 including the electrode paste 62 on the other surface 61b of the metal foil 61, as an electrode transmission signal. With this arrangement, the basis weight of the electrode 60 is calculated based on the electrode transmission signal, and the basis weight (thickness t) of the electrode paste 62 on the other surface 61b of the metal foil 61 is obtained by subtracting the basis weight of the metal foil 61, and the basis weight of the electrode paste 62 on one surface 61a of the metal foil 61, from the calculated basis weight of the electrode 60.

Accordingly, the thickness t of the electrode paste 62 on one surface 61a of the metal foil 61 can be measured based on the received signal produced by transverse waves of ultrasonic waves US received by the third ultrasonic sensor 13, and the thickness t of the electrode paste 62 on the other surface 61b of the metal foil 61 can be measured at the same time, based on the received signal produced by longitudinal waves of ultrasonic waves US received by the second ultrasonic sensor 12. Thus, the equipment for measuring the thickness of the electrode paste 62 applied by coating to each of the opposite surfaces 61a, 61b of the metal foil 61 in the electrode 60 can be simplified.

In the ultrasonic measuring method according to the first or second embodiment, the mask 40 that partially blocks propagation of ultrasonic waves US is provided between the first ultrasonic sensor 11 and the second ultrasonic sensor 12. After the mask 40 is moved to and placed at a position corresponding to the edge portion 62C of the electrode paste 62 and its periphery, between the electrode 60 and the second ultrasonic sensor 12, the first ultrasonic sensor 11 sends ultrasonic waves US toward the edge portion 62C of the electrode paste 62, and the ultrasonic waves are received by the second ultrasonic sensor 12. As a result, vibrations transmitted to the periphery of the edge portion 62, as part of the ultrasonic waves US transmitted from the first ultrasonic sensor 11 toward the second ultrasonic sensor 12, are blocked by the mask 40 and are inhibited from being transmitted to the second ultrasonic sensor 12, while vibrations transmitted through the edge portion 62C reach the second ultrasonic sensor 12 without being absorbed by the mask 40.

In this connection, the thickness of the edge portion 62C may vary from portion to portion, depending on the shape of the edge portion 62C. If the thickness of the edge portion 62C differs from portion to portion, the distance over which ultrasonic waves US propagate through the edge portion 62 differs from portion to portion; therefore, a received signal indicative of the attenuation factor of transmitted waves US received by the second ultrasonic sensor 12 varies in accordance with the shape of the edge portion 62C. Thus, with the periphery of the edge portion 62C covered with the mask 40, the coating profile of the electrode paste 62, i.e., the shape of the edge portion 62C of the electrode paste 62, can be clearly detected in accordance with the thickness t of the electrode paste 62, based on the received signal received by the second ultrasonic sensor 12.

In the ultrasonic measuring method of the first or second embodiment, the receiving-side ultrasonic sensor 12A that receives ultrasonic waves US propagated through the air layer AR generates a plurality of sonic waveforms as time passes after receiving the ultrasonic waves. Of the thus generated sonic waveforms, a sonic waveform that is detected first is denoted as "first sonic waveform", and a sonic waveform that is detected subsequent to the first sonic waveform is denoted as "second sonic waveform". The respective frequencies of at least the first ultrasonic sensor 11 and the second ultrasonic sensor 12 are set to the lowest possible levels, according to the thickness t of the electrode paste 62, under a condition that the second sonic waveform does not overlap the first sonic waveform; therefore, the attenuation of ultrasonic waves US during transmission of the waves through the electrode paste 62 can be reduced to a minimum, and the resolution of the received signal received by the receiving-side ultrasonic sensor 12A can be improved. Consequently, the thickness t of the electrode paste 62 can be obtained with high accuracy.

In the ultrasonic measuring method of the first embodiment, the thickness t of the electrode paste 62 is calculated based on the attenuation factor $\beta$ of ultrasonic waves US received by the receiving-side ultrasonic sensor 12A, as one of the first ultrasonic sensor 11 through the third ultrasonic sensor 13. Therefore, if the attenuation factor $\gamma$ of ultrasonic waves US when transmitted through the metal foil 61 is grasped in advance, and a calibration curve indicating the relationship between the attenuation factor $\gamma$ of ultrasonic waves US in the metal foil 61 and the basis weight of the metal foil 61 is created in advance, the thickness t of the electrode paste 62 can be easily calculated by subtracting the basis weight of the metal foil 61 corresponding to the attenuation factor $\gamma$ of the ultrasonic waves US, from the basis weight of the electrode 60 corresponding to the attenuation factor $\beta$ of the ultrasonic waves US.

In the ultrasonic measuring method of the first or second embodiment, the first ultrasonic sensor 11 and the second ultrasonic sensor 12 are positioned, with the electrode 60 interposed therebetween, such that the distance between the first vibration surface 11a of the first ultrasonic sensor 11 at which ultrasonic vibrations occur, and the second vibration surface 12a of the second ultrasonic sensor 12 at which ultrasonic vibrations occur, as measured in the vertical direction, is equal to or smaller than 100 mm (70 mm in the first embodiment). Since the thickness t of the electrode paste 62 is measured in a condition where the second sonic waveform has the maximum amplitude, it is ensured that the electrode 60 that is being produced on the production line is located exactly at the middle position between the first ultrasonic sensor 11 and the second ultrasonic sensor 12, during the measurement, and no undulation is found in the metal foil 61 that was wound in the form of a roll. The operator can also make sure that the metal foil 61 is coated with the electrode paste 62 in a good condition, and that the quality of the electrode 60 is good.

Namely, while the plurality of sonic waveforms are detected at certain intervals of time with the passage of time after the receiving-side ultrasonic sensor 12A receives the ultrasonic waves, the first sonic waveform, as one of the plurality of sonic waveforms detected by the receiving-side ultrasonic sensor 12A, provides a received signal that consists solely of the transmitted waves US transmitted through the metal foil 61 and the electrode paste 62, and does not include echo that becomes noise. In particular, when the distance between the first vibration surface 11a of the first ultrasonic sensor 11 and the second vibration surface 12a of the second ultrasonic sensor 12 is 100 mm or smaller, odd-numbered sonic waveforms subsequent to the first sonic waveform have the same or similar tendency as the first sonic waveform; however, after transmission, the ultrasonic wave strength is reduced as the propagation distance becomes longer, and the attenuation of the ultrasonic waves US increases. Therefore, it is appropriate to use the received signal having the first sonic waveform, for determining the thickness t of the electrode paste 62. Also, the second sonic waveform has echoes including both the received signal produced by the first reflected waves and the received signal produced by the second reflected waves, as described above, and becomes noise to the received signal required to obtain the thickness t of the electrode paste 62.

In the ultrasonic measuring method according to the first or second embodiment, the thickness of the coating material is measured when the distance between the first vibration surface 11a of the first ultrasonic sensor 11 and the second vibration surface 12a of the second ultrasonic sensor 12 is equal to or smaller than 100 mm, and the second sonic waveform has the maximum amplitude. Accordingly, the electrode 60 that is being produced on the production line is disposed exactly at the middle position between the first ultrasonic sensor 11 and the second ultrasonic sensor 12, during the measurement, and no undulation is found in the metal foil 61 that was wound in the form of a roll. Thus, the operator can make sure that the metal foil 61 that is in a good condition is coated with the electrode paste 62.

In the ultrasonic measuring method according to the first or second embodiment, the thickness of the electrode paste 62 is measured based on the received signal having the first sonic waveform. It is thus possible to measure the thickness of the electrode paste 62, while removing a factor of measurement errors, i.e., undulation remaining in the metal foil 61 that was wound in the form of a roll.

The ultrasonic measuring system 1, 101 according to the first or second embodiment of the invention has a pair of first ultrasonic sensor 11 and second ultrasonic sensor 12, and the first ultrasonic sensor 11 is placed on one side, as viewed in the thickness direction TD, of the electrode 60 formed by coating one surface 61a or both surfaces 61a, 61b of the metal foil 61 that was wound in the form of a roll, with the electrode paste 62, via the air layer AR, while the second ultrasonic sensor 12 is placed on the other side of the electrode 60, via the air layer AR. The thickness t of the electrode paste 62 is measured by transmitting ultrasonic waves US between the first ultrasonic sensor 11 and the second ultrasonic sensor 12. The ultrasonic measuring system 1, 101 is characterized in that the first ultrasonic sensor 11 is a flat-type transmitting sensor that permits propagation of unfocused ultrasonic waves US, and the second ultrasonic sensor 12 is a flat-type receiving sensor that permits propagation of unfocused ultrasonic waves US. Thus, in the battery production process, when the thickness t of the electrode paste 62, or the basis weight and coating profile of the electrode paste 62, is measured in the production line in which the electrode 60 is produced by coating the metal foil 61 with the electrode paste 62, ultrasonic waves US are transmitted from the first ultrasonic sensor 11 to the electrode 60 so that a wide area (irradiation area MB) of the electrode 60 is irradiated with the ultrasonic waves US, and are transmitted through the metal foil 61 and the electrode paste 62 in the electrode 60. Then, the second ultrasonic sensor 12 receives the ultrasonic waves (transmitted waves) transmitted through the metal foil 61 and the electrode paste 62 over wide regions thereof, so that a received signal for determining the thickness t of the electrode paste 62 can be obtained over a wide range of the electrode 60.

Namely, in the ultrasonic measuring system 1, 101 of the first or second embodiment, the second ultrasonic sensor 12 provides the received signal for determining the thickness t of the electrode paste 62, over a wider range of the electrode 60, as compared with the spot-type ultrasonic sensor, and the quality check regarding the thickness t of the electrode paste 62, or the basis weight and coating profile of the electrode paste 62, can be performed on the production line of the electrode 60. In particular, when the quality check, such as measurements of the basis weight and coating profile of the electrode paste 62, is desired to be performed evenly over a wide range on the production line, with respect to the electrode 60 produced on the production line, the thickness t of the electrode paste 62 can be measured online for all of the electrodes (final products) successively produced from the electrode sheet 60 on the production line.

Since the received signal representing the transmitted waves US received by the second ultrasonic sensor 12 can be obtained from a wide region of the electrode 60, the thickness t of the electrode paste 62 can be detected over a wider range of the electrode 60. Therefore, variations in the thickness t of the electrode paste 62 within the measurement range can be correctly or accurately grasped, and the overall thickness t of the electrode paste 62, or the basis weight of the electrode paste 62, in the irradiation area MB of the electrode 60 irradiated by the first and second ultrasonic sensors 11, 12 can be measured with high reliability. Thus, since the thickness t of the electrode paste 62 can be detected over a wider range in the electrode 60, the coating profile of the electrode paste 62 can be measured with improved accuracy, as compared with measuring methods of the related art using the radiation measuring system, or the spot-type ultrasonic sensor as disclosed in JP-A-2008-102160.

In the quality check of the related art in which a difference in weight between a sample (metal foil) that has not been coated with the electrode paste 62 and a sample coated with the electrode paste 62 is measured, the basis weight and coating profile of the electrode paste 62 cannot be accurately determined. Furthermore, the quality check is conducted outside the production line, using samples of the electrode 60 taken out of the production line; therefore, an extra or additional step for performing the quality check is required, resulting in increased cost. Also, the quality check using the radiation measuring system suffers from excessively high equipment cost since the radiation measuring system is considerably expensive.

In the ultrasonic measuring system 1, 101, on the other hand, the production line for producing the electrode 60 need not be stopped, and the quality check can be performed during operation of the line; therefore, an extra or additional step for performing the quality check is not required, and the cost will not be increased. Also, the equipment cost of the ultrasonic measuring system 1, 101 is lower than that of the radiation measuring system, and the cost reflected by the electrode 60 can be largely reduced. In particular, the ultrasonic measuring system 1, 101 can be easily incorporated into the production line for producing the electrode 60, no matter whether the system is newly installed or has already been installed; therefore, the ultrasonic measuring system 1, 101 can be installed at low cost in the production line. Accordingly, the ultrasonic measuring system 1, 101 of the first or second embodiment produces an excellent effect that the thickness t of the electrode paste 62 applied by coating to the electrode 60 can be measured on the production line in which the electrode 60 is produced, at low cost, with high reliability and high measuring accuracy.

In the ultrasonic measuring system 1, 101 according to the first or second embodiment, the first ultrasonic sensor 11 and the second ultrasonic sensor 12 are capable of sending and receiving ultrasonic waves US, and the ultrasonic oscillation control unit 10 is provided for controlling sending and receiving of ultrasonic waves US, between the first ultrasonic sensor 11 and the second ultrasonic sensor 12. The first and second ultrasonic sensors 11, 12 are in the first condition when the first ultrasonic sensor 11 sends ultrasonic waves, and the second ultrasonic sensor 12 receives the ultrasonic waves, and are in the second condition when the second ultrasonic sensor 12 sends ultrasonic waves, and the first ultrasonic sensor 11 receives the ultrasonic waves. The ultrasonic oscillation control unit 10 switches the first ultrasonic sensor 11 and the second ultrasonic sensor 12 between the first condition and the second condition, so that the first ultrasonic sensor 11 operates differently from the second ultrasonic sensor 12. With this arrangement, the thickness t of the electrode paste 62 can be determined with high accuracy, assuring improved measuring reliability, based on two types of received wave signals, namely, a second received wave signal representing waves received by the second ultrasonic sensor 12 in the first condition, and a first received wave signal representing waves received by the first ultrasonic sensor 11 in the second direction.

If the thickness t of the electrode paste 62 is obtained based on a received wave signal representing waves received by only one ultrasonic sensor, it is difficult for the operator to determine whether the received wave signal was obtained in normal conditions at the time of measurement, and the measurement lacks reliability. On the other hand, in the ultrasonic measuring system 1, 101 according to the first or second embodiment, the ultrasonic oscillation control unit 10 switches the first ultrasonic sensor 11 and the second ultrasonic sensor 12 between the first condition and the second condition so that the first ultrasonic sensor 11 operates differently from the second ultrasonic sensor 12. With this arrangement, when the thickness t of the electrode paste 62 is obtained in view of changes in the temperature of the air AR during measurement, the thickness t can be measured based on two types of received signals, i.e., the second received wave signal ($\lambda 2$) of ultrasonic waves US received by the second ultrasonic sensor 12 when the system is in the first condition, and the first received wave signal ($\lambda 1$) of ultrasonic waves US received by the first ultrasonic sensor 11 when the system is in the second condition.

By using the first received wave signal and the second received wave signal, the operator can determine that the received wave signals were obtained in normal conditions at the time of measurement, if the first received wave signal and the second received wave signal have a relationship that $\lambda 1 \approx \lambda 2$. Consequently, the thickness of the electrode paste 62 can be measured with high accuracy and high reliability.

The ultrasonic measuring system 101 according to the second embodiment has the third ultrasonic sensor 13 in the form of a flat-type sensor that permits propagation of unfocused ultrasonic waves US, and the first ultrasonic sensor 11 and the third ultrasonic sensor 13 are disposed on one side of the electrode 60 via the air layer AR, such that ultrasonic waves US are regularly reflected between the first ultrasonic sensor 11 and the third ultrasonic sensor 13, while the second ultrasonic sensor 12 is disposed on the other side of the electrode 60 so as to face the first ultrasonic sensor 11 in the axial direction AX thereof via the electrode 60. With this arrangement, for the electrode 60 in which the opposite surfaces 61a, 61b of the metal foil 61 are coated with the electrode paste 62, the thickness t of the electrode paste 62 on one surface 61a of the metal foil 61 is measured based on a received signal produced by transverse waves of the ultrasonic waves US received by the third ultrasonic sensor 13, and the thickness t of the electrode paste 62 on the other surface 61b of the metal foil 61 is measured at the same time, based on a received signal produced by longitudinal waves of the ultrasonic waves US received by the second ultrasonic sensor 12.

Namely, before the measurement of the thickness t of the electrode paste 62, the basis weight of the metal foil 61 is grasped in advance, from a calibration curve for the metal foil 61 created based on the attenuation factor, as a substrate transmission signal generated when ultrasonic waves US are transmitted through the metal foil 61 in a condition where the metal foil 61 is not coated with the electrode paste 62. In the ultrasonic measuring system 101, ultrasonic waves US sent from the first ultrasonic sensor 11 are transmitted as transverse waves to the metal foil 61 via the electrode paste 62 on one surface 61a of the metal foil 61, and are regularly reflected by the metal foil 61, and the third ultrasonic sensor 13 receives the reflected waves US via the electrode paste 62 on one surface 61a of the metal foil 61. Thus, the third ultrasonic sensor 13 obtains a substrate reflection signal when receiving the reflected waves US regularly reflected by one surface 61a of the metal foil 61, and determines the basis weight (thickness t) of the electrode paste 62 on one surface 61a of the metal foil 61, based on the substrate reflection signal.

On the other hand, at the same time that ultrasonic waves US are transmitted from the first ultrasonic sensor 11 to the third ultrasonic sensor 13, ultrasonic waves US sent from the first ultrasonic sensor 11 are transmitted as longitudinal waves through the electrode paste 62 on one surface 61a of the metal foil 61, the metal foil 61, and the electrode paste 62 on the other surface 61b of the metal foil 61, and the second ultrasonic sensor 12 receives the transmitted waves US that passed through the electrode 60 including the electrode paste 62 on the other surface 61b of the metal foil 61, as an electrode transmission signal. Then, the thickness computing unit 20 calculates the basis weight of the electrode 60 based on the electrode transmission signal, and obtains the basis weight (thickness t) of the electrode paste 62 on the other surface 61b of the metal foil 61, by subtracting the basis weight of the metal foil 61, and the basis weight of the electrode paste 62 on one surface 61a of the metal foil 61, from the calculated basis weight of the electrode 60.

Accordingly, the thickness t of the electrode paste 62 on one surface 61a of the metal foil 61 can be measured based on the received signal produced by transverse waves of ultrasonic waves US received by the third ultrasonic sensor 13, and the thickness t of the electrode paste 62 on the other surface 61b of the metal foil 61 can be measured at the same time, based on the received signal produced by longitudinal waves of ultrasonic waves US received by the second ultrasonic sensor 12. Thus, the equipment for measuring the thickness of the electrode paste 62 applied by coating to each of the opposite surfaces 61a, 61b of the metal foil 61 in the electrode 60 can be simplified.

In the ultrasonic measuring system 1 of the first embodiment, the first ultrasonic sensor 11 transmits ultrasonic waves US, and the second ultrasonic sensor 12 receives the ultrasonic waves US transmitted from the first ultrasonic sensor 11, and the mask 40 is provided for partially blocking propagation of ultrasonic waves US, between the first ultrasonic sensor 11 and the second ultrasonic sensor 12. Since the mask 40 can be moved to and placed at a position corresponding to the edge portion 62C of the electrode paste 62 and its periphery, between the electrode 60 and the second ultrasonic sensor 12, vibrations transmitted to the periphery of the edge portion 62, as part of the ultrasonic waves US transmitted from the first ultrasonic sensor 11 toward the second ultrasonic sensor 12, are blocked by the mask 40, and are inhibited from being transmitted to the second ultrasonic sensor 12.

In this connection, the thickness of the edge portion 62C may vary from portion to portion, depending on the shape of the edge portion 62C. If the thickness of the edge portion 62C differs from portion to portion, the distance over which ultrasonic waves US propagate through the edge portion 62 differs from portion to portion; therefore, a received signal indicative of the attenuation factor of transmitted waves US received by the second ultrasonic sensor 12 varies in accordance with the shape of the edge portion 62C. Thus, with the periphery of the edge portion 62C covered with the mask 40, the coating profile of the electrode paste 62, i.e., the shape of the edge portion 62C of the electrode paste 62, can be clearly detected in accordance with the thickness t of the electrode paste 62, based on the received signal received by the second ultrasonic sensor 12.

In the ultrasonic measuring system 1, 101 of the first or second embodiment, the receiving-side ultrasonic sensor 12A that receives ultrasonic waves US propagated through the air layer AR generates a plurality of sonic waveforms as time passes after receiving the ultrasonic waves. Of the thus generated sonic waveforms, a sonic waveform that is detected first is denoted as "first sonic waveform", and a sonic waveform that is detected subsequent to the first sonic waveform is denoted as "second sonic waveform". The respective frequencies of at least the first ultrasonic sensor 11 and the second ultrasonic sensor 12 are set to the lowest ones selected from frequencies that satisfy a condition that the second sonic waveform does not overlap the first sonic waveform, and are equal to or lower than 400 Hz, according to the thickness t of the electrode paste 62; therefore, the attenuation of ultrasonic waves US during transmission of the waves through the electrode paste 62 can be reduced to a minimum, and the resolution of the received signal received by the receiving-side ultrasonic sensor 12A can be improved. Consequently, the thickness t of the electrode paste 62 can be obtained with high accuracy.

In the ultrasonic measuring system 1, 101 of the first or second embodiment, the thickness computing unit 20 is provided for calculating the thickness of the electrode paste 62, based on the attenuation factor of ultrasonic waves US received by the receiving-side ultrasonic sensor 12A, as one of the first ultrasonic sensor 11 through the third ultrasonic sensor 13. The thickness computing unit 20 is able to obtain the basis weight of the electrode paste 62, by subtracting the basis weight of the metal foil 61 corresponding to the attenuation factor γ of ultrasonic waves US, from the basis weight of the electrode 60 corresponding to the attenuation factor β of ultrasonic waves US. The attenuation factor of ultrasonic waves varies with parameters, such as the density of a medium through which the ultrasonic waves propagate, and the thickness of the medium. Thus, the basis weight of the electrode paste 62 can be obtained by subtracting the basis weight of the metal foil 61 from the basis weight of the electrode 60, based on a calibration curve indicating the relationship between the attenuation factor γ of ultrasonic waves when transmitted through the metal foil 61 and the basis weight of the metal foil 61, and a calibration curve indicating the relationship between the attenuation factor β of ultrasonic waves when transmitted through the electrode 60 and the basis weight of the electrode 60.

Namely, in the case of the electrode 60 in which one surface 61a of the metal foil 61 is coated with the electrode paste 62, as in the first embodiment, the basis weight of the electrode 60 (the metal foil 61 and the electrode paste 62) is obtained from the actual-measurement calibration curve for the electrode 60 as shown in FIG. 7. Also, the basis weight of the metal foil 61 is obtained from the actual-measurement calibration curve for the metal foil 61. Accordingly, the basis weight of the electrode paste 62 can be easily obtained from a difference between the basis weight of the electrode 60 and the basis weight of the metal foil 61.

In the case of the electrode 60 in which both surfaces 61a, 61b of the metal foil 61 are coated with the electrode paste 62, as in the second embodiment, the basis weight of the metal foil 61 is obtained from the actual-measurement calibration curve for the metal foil 61. In the meantime, the basis weight of the electrode 60 is obtained from the one-side-coating actual-measurement calibration curve for the electrode 60 in which one surface 61a of the metal foil 61 is coated with the electrode paste 62, and the basis weight of the electrode paste 62 on one surface 61a of the metal foil 61 is obtained by subtracting the basis weight of the metal foil 61 from the basis weight of the electrode 60.

The basis weight of the electrode 60 in which both surfaces 61a, 61b of the metal foil 61 are coated with the electrode paste 62 is obtained from the both-side-coating actual-measurement calibration curve for the electrode 60 in which both surfaces 61a, 61b of the metal foil 61 are coated with the electrode paste 62, and the basis weight of the electrode paste 62 on the other surface 61b of the metal foil 61 is obtained by subtracting the basis weight of the metal foil 61 and the basis weight of the electrode paste 62 on the above-indicated one surface 61a of the metal foil 61, from the obtained basis weight of the electrode 60. Thus, the basis weight of the electrode paste 62 can be easily obtained from a difference between the basis weight of the electrode 60 and the basis weight of the metal foil 61.

In the ultrasonic measuring system 1, 101 of the first or second embodiment, the first ultrasonic sensor 11 and the second ultrasonic sensor 12 are positioned, with the electrode 60 interposed therebetween, such that the distance between the first vibration surface 11a of the first ultrasonic sensor 11 at which ultrasonic vibrations occur, and the second vibration surface 12a of the second ultrasonic sensor 12 at which ultrasonic vibrations occur, as measured in the vertical direction, is equal to or smaller than 100 mm. Since the thickness computing unit 20 measures the thickness t of the electrode paste 62 in a condition where the second sonic waveform has the maximum amplitude, the electrode 60 that is being produced on the production line is located exactly at the middle position between the first ultrasonic sensor 11 and the second ultrasonic sensor 12, during the measurement. Thus, the operator can make sure that no undulation remains in the metal foil 61 that was wound in the form of a roll, and the metal foil 61 is coated with the electrode paste 62 in a good condition, in the electrode 60 of which the thickness t of the electrode paste 62 is obtained by the thickness computing unit 10.

In the ultrasonic measuring system 1, 101 of the first or second embodiment, the thickness of the electrode paste 62 is measured based on the received signal having the first sonic waveform. It is thus possible to measure the thickness t of the electrode paste 62, while removing a factor of measurement errors, i.e., undulation of the metal foil 61 that was wound in the form of a roll.

When a coated product is placed in an air layer between a sending-side ultrasonic sensor and a receiving-side ultrasonic sensor, and the thickness of a coating material within the coated product is measured, the temperature (density) of the air layer may differ between the sending side and the receiving side, due to air convection in the air layer. Also, when coated products are successively produced on a production line in operation, the density of the air layer may locally change, due to slight air convection in the air layer which occurs when the coated products locally and slightly move on the production line, and air convection in the air layer which occurs when the operator moves in the vicinity of the production line, for example. In such cases, if the density of the air layer as one medium through which ultrasonic waves propagate differs between a portion where the thickness is measured by the ultrasonic sensors, and the other portions, the thickness of the coating material cannot be accurately measured.

In the case where a coated product is placed in an air layer between a sending-side ultrasonic sensor and a receiving-side ultrasonic sensor, and the thickness of a coating material within the coated product is measured, if some external vibrations are transmitted from the outside to the receiving-side ultrasonic sensor while transmitted waves passed through the coated product or reflected waves reflected by the coated product are received by the receiving-side ultrasonic sensor, the transmitted waves or the reflected waves may be combined with the external vibrations. If the receiving-side ultrasonic sensor receives the resultant composite waves, there arises a difference between the wavelength of the ultrasonic waves transmitted from the sending-side ultrasonic sensor without being influenced by external vibrations, and the wavelength of the composite waves received by the receiving-side ultrasonic sensor, which may result in deterioration of receiving sensitivity.

In view of the above-described problems, the ultrasonic measuring system 1, 101 according to the first or second embodiment is provided with at least one cover 35 for suppressing or preventing changes in the density of the air layer AR. Therefore, when the thickness t of the electrode paste 62, or the basis weight and coating profile of the electrode paste 62 applied by coating, is/are measured on the production line of the electrode 60, the wavelength of ultrasonic waves US that propagate through the air layer AR is less likely or unlikely to vary, due to the presence of the cover 35, and the thickness of the electrode paste 62 can be measured with improved accuracy.

As described above, in the battery production process, the electrode 60 is produced by applying the electrode paste 62 by coating to the metal foil 61 and drying the paste 62, under an atmosphere whose temperature is controlled, on the production line for producing the electrode 60, and the ultrasonic measuring system 1, 101 is installed as an in-line system in the production line, under the temperature-controlled atmosphere. Since the production line is installed at a location where the temperature is suitably controlled, the temperatures of the metal foil 61 and the electrode paste 62 may be regarded as not changing but being constant during operation of the line, with respect to the electrodes 60 successively produced on the production line. Therefore, when ultrasonic waves US are transmitted through the metal foil 61 and the electrode paste 62, during operation of the line, the acoustic impedance in the metal foil 61 and the electrode paste 62 does not change, and no influence arises from the respective temperatures of the metal foil 61 and the electrode paste 62, during measurement of the thickness t of the electrode paste 62.

On the other hand, the ultrasonic measuring system 1, 101 has the first ultrasonic sensor 11 disposed on one side of the electrode 60 via the air layer AR, and the second ultrasonic sensor 12 disposed on the other side of the electrode 60 via the air layer AR, and measures the thickness t of the electrode paste 62, by transmitting ultrasonic waves US between the first ultrasonic sensor 11 and the second ultrasonic sensor 12. Although the ultrasonic measuring system 1, 101 is installed under the temperature-controlled atmosphere, air convection occurs in the installation room or space; therefore, at least one cover 35 is provided for suppressing or preventing changes in the density of air, in the air layer AR of the ultrasonic measuring system 1, 101. With this arrangement, substantially no variations in the temperature of air due to convection of gas, such as air, appear in the air layer AR of the ultrasonic measuring system 1, 101, and a uniform temperature distribution can be established in the air layer AR as a whole. Namely, substantially no variations in temperature appear between the first ultrasonic sensor 11 and the electrode 60, between the electrode 60 and the second ultrasonic sensor 12, between the third ultrasonic sensor 13 and the electrode 60 (in the second embodiment), and between the opposite sides of the electrode 60. In other words, there are substantially no temperature differences in the air layer AR as a whole.

Since the uniform temperature distribution is established in the air layer AR as a whole, the velocity of sound in the air, which changes in proportion to the temperature, becomes constant over the entire volume of the air layer, according to Eq. 2 as indicated above, and the density of the air which varies in proportion to the temperature also becomes constant over the entire volume of the air layer, according to Eq. 3 as indicated above. Also, according to Eq. 2 through Eq. 4 as indicated above, the acoustic impedance does not change because the uniform temperature distribution is established in the air layer AR as a whole.

Figure 21:
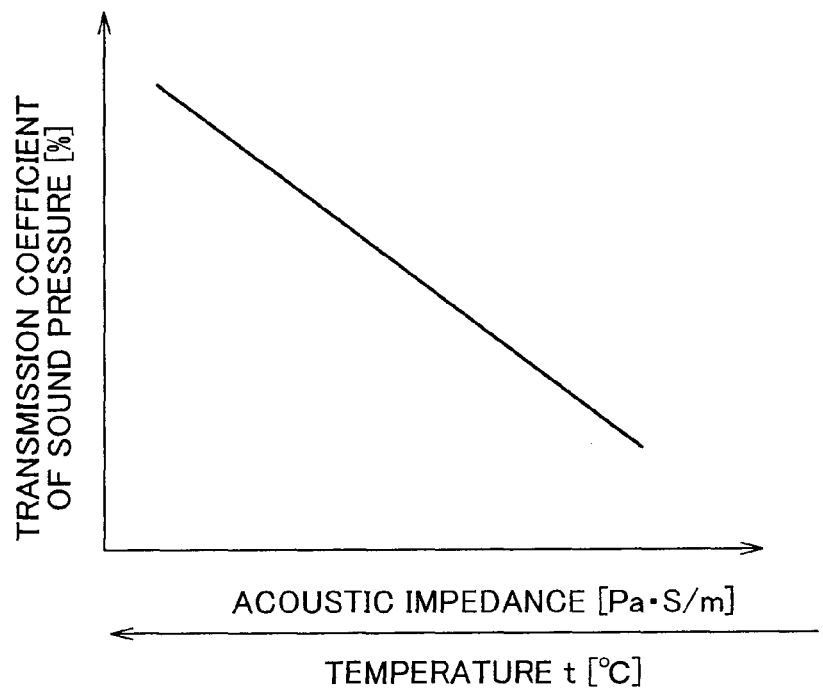
FIG. 21 is an explanatory view useful for explaining the relationship among the temperature transmitted, acoustic impedance, and the transmission coefficient of sound pressure, of received ultrasonic waves.
Figure 22:
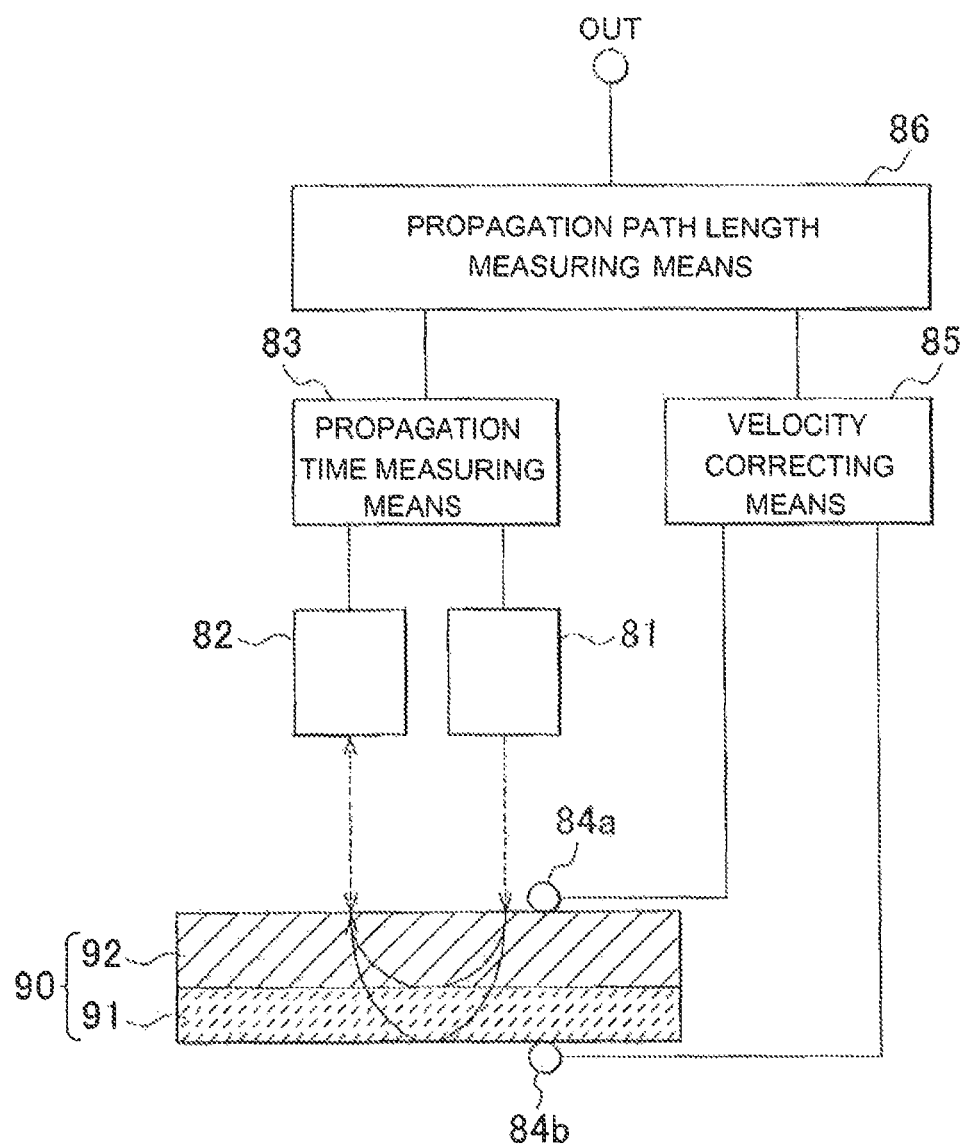
FIG. 22 is an explanatory view of an ultrasonic measuring system as disclosed in JP-A-2008-102160.

FIG. 21 is a graph useful for explaining the relationship among the temperature at which ultrasonic waves propagate, acoustic impedance, and the transmission coefficient of sound pressure, with regard to the received ultrasonic waves. In ultrasonic sensors, which have the relationship as shown in FIG. 21, as a characteristic of sonic propagation, the transmission coefficient of sound pressure of ultrasonic waves does not change if the acoustic impedance does not change.

In other words, if a uniform temperature distribution is established over the entire volume of the air layer AR, and the density of the air is also uniformly distributed, the acoustic impedance and the density can be regarded as constants corresponding to temperature change, in Eq. 5 as indicated above, and the wavelength $\lambda$ is inversely proportional to the frequency f. As described above, the first ultrasonic sensor 11 has a frequency f1(f) as a specific characteristic value, and the second ultrasonic sensor 12 has a frequency f2(f) as a specific characteristic value, while the third ultrasonic sensor 13 has a frequency f3(f) as a specific characteristic value. In the air layer AR between the first ultrasonic sensor 11 and the electrode 60, the wavelength $\lambda 1$ of ultrasonic waves US transmitted from the first ultrasonic sensor 11 of frequency f1(f) does not change. When the system includes the third ultrasonic sensor 13, the wavelength $\lambda 3$ of ultrasonic waves US transmitted from the third ultrasonic sensor 13 of frequency f3(f) does not change, in the air layer AR between the third ultrasonic sensor 13 and the electrode 60. In the air layer AR between the electrode 60 and the second ultrasonic sensor 12, the wavelength $\lambda 2$ of ultrasonic waves US transmitted from the second ultrasonic sensor 12 does not change.

In particular, while the thickness t of the electrode paste 62 is continuously measured, for the electrodes 60 successively produced, on the production line in which the ultrasonic measuring system 1, 101 is installed as an in-line system, the wavelength of transmitted waves (ultrasonic waves) US transmitted through the electrode paste 62 and received by the second ultrasonic sensor 12, and the wavelength of reflected waves (ultrasonic waves) US reflected by the electrode paste 62 and received by the third ultrasonic sensor 13, undergo substantially no changes, during operation of the line.

In ultrasonic sensors, there is generally a certain correlation between the magnitude of received power of ultrasonic waves (ultrasonic wave strength) and the wavelength of received ultrasonic waves, as a characteristic of sonic propagation. The ultrasonic wave strength changes along a normal distribution curve having a peak value at a given wavelength. If the wavelength shifts to be a little shorter or longer than the given wavelength corresponding to the peak value, the ultrasonic wave strength is reduced from the peak value.

In the ultrasonic measuring system 1, 101, the wavelength at which the ultrasonic wave strength becomes the above-indicated peak value is maintained without being changed, so that ultrasonic waves US transmitted from the first ultrasonic sensor 11 propagate through the air layer AR, toward the electrode 60, in a condition where the ultrasonic wave strength is at a maximum. As a result, the transmitted waves (ultrasonic waves) US transmitted through the electrode 60 also propagate through the electrode 60 while the ultrasonic wave strength is at a maximum, and the ultrasonic waves US then propagate from the electrode 60 through the air layer AR, and are received by the second ultrasonic sensor 12, while the ultrasonic wave strength is at a maximum.

With regard to the reflected waves (ultrasonic waves) US reflected by the electrode 60, too, the ultrasonic waves US are transmitted to the electrode 60 through the air layer AR, reflected by the electrode 60, transmitted through the air layer AR again, and received by the third ultrasonic sensor 13, while the ultrasonic wave strength is at a maximum. Accordingly, if the thickness of the electrode paste 62 of the electrode 60 is measured based on received signals, such as the wavelength of the received ultrasonic waves US, the time it takes the ultrasonic waves US to reach the third ultrasonic sensor 13, and the attenuation factor, measurement errors in thickness are less likely or unlikely to occur, for each electrode 60, or for each measurement region of the electrode 60, and the thickness t of the electrode paste 62 can be measured with high accuracy.

In the ultrasonic measuring system 1, 101 of the first or second embodiment, the metal foil 61 wound in the form of a roll has a great length as measured in the longitudinal direction, and four pairs of at least the first ultrasonic sensors 11 and second ultrasonic sensors 12 are provided within the cover 35, to be arranged in the width direction WD parallel to the short sides of the metal foil 61. The cover 35 is movable in the longitudinal direction LD parallel to the long sides of the metal foil 61 and the width direction WD, within the measurement area MA in which the thickness t of the electrode paste 62 is obtained. Therefore, on the production line in which the ultrasonic measuring system 1, 101 is installed as an in-line system, the thickness t of the electrode paste 62 (or the basis weight and coating profile of the electrode paste 62) can be measured during operation of the production line, without stopping the line, with respect to the electrodes 60 that are continuously and successively produced. Also, quality check, such as measurement of the basis weight and coating profile of the electrode paste 62, can be carried out evenly over a wide range on the production line. Thus, highly reliable quality check can be conducted for quality control.

In the ultrasonic measuring system 1, 101 of the first or second embodiment, the cover 35 is provided with eight thermometers 37 for measuring the temperature of the air layer AR. Therefore, even when a temperature change occurs in the air layer AR, due to heat generated from any of the first through third ultrasonic sensors 11-13, for example, the thickness computing unit 20 corrects the sound velocity, density, and acoustic impedance in the air layer AR, based on the temperatures measured by the thermometers 37, so that the received signal of the receiving-side ultrasonic sensor 12A that receives ultrasonic waves US transmitted through the air layer AR can be brought into an appropriate condition so as to correspond to the actual temperature or temperature distribution of the air layer AR. Thus, the thickness t of the electrode paste 62 can be obtained with improved measuring accuracy.

In the ultrasonic measuring system 1, 101 of the first or second embodiment, the cover 35 integral with the sensor mounting portion 30 has the vibration isolating plate 38 for inhibiting external vibrations from being transmitted from the ground to at least the first and second ultrasonic sensors 11, 12. Therefore, mechanical vibrations that occur in the production line of the electrode 60, for example, are prevented from being transmitted to the first ultrasonic sensor 11 and the second ultrasonic sensor 12, and, if any, the third ultrasonic sensor 13, and otherwise possible deterioration of the accuracy in the directivity of the ultrasonic waves transmitted or received can be prevented.

In the ultrasonic measuring system 1, 101 of the first or second embodiment, the substrate is the metal foil 61 used in the electrode 60 of the battery as the coated product, and the coating material is the electrode paste 62 applied by coating to the metal foil 61. In the battery production process, therefore, the quality check regarding the basis weight and coating profile of the electrode paste 62 can be conducted evenly over a wide range of the electrode 60, on the production line for producing the electrode 60 by coating the metal foil 61 with the electrode paste 62, during operation of the line. Furthermore, the quality check can be performed on all of the electrodes produced on the line, so that high-quality, high-performance batteries can be provided. It is thus possible to provide batteries as products, which ensure high quality in terms of the charge/discharge capacity, durability, and failures due to reaction variations, for example.

While the invention has been described with reference to particular embodiments thereof, it is to be understood that the invention is not limited to the illustrated embodiments, but may be embodied with various modifications, corrections, alternatives, replacements, and so forth, without departing from the spirit of the invention.

What is claimed is:

1. An ultrasonic measuring method for measuring a thickness of a coating material applied by coating to one surface or both surfaces of a substrate made of a metal so as to provide a coated product, comprising:
   providing a pair of first ultrasonic sensor and second ultrasonic sensor;
   placing the first ultrasonic sensor on one side of the coated product, as viewed in a thickness direction of the coated product, via an air layer, and placing the second ultrasonic sensor on the other side of the coated product, via an air layer; and
   measuring the thickness of the coating material by transmitting ultrasonic waves between the first ultrasonic sensor and the second ultrasonic sensor, wherein
   a flat-type transmitting sensor that permits propagation of unfocused ultrasonic waves is used as the first ultrasonic sensor, and a flat-type receiving sensor that permits propagation of unfocused ultrasonic waves is used as the second ultrasonic sensor;
   a receiving-side ultrasonic sensor as one of the first ultrasonic sensor and the second ultrasonic sensor, which receives ultrasonic waves propagated through the air layer, generates a plurality of sonic waveforms as time passes after receiving the ultrasonic waves, said plurality of sonic waveforms including a first sonic waveform that is detected first, and a second sonic waveform that is detected subsequent to the first sonic waveform; and
   respective frequencies of the first ultrasonic sensor and the second ultrasonic sensor are set to the lowest possible levels, according to the thickness of the coating material, under a condition that the second sonic waveform and the first sonic waveform do not overlap each other.

2. The ultrasonic measuring method according to claim 1, wherein:
   sensors capable of sending and receiving ultrasonic waves are used as the first ultrasonic sensor and the second ultrasonic sensor;
   an ultrasonic oscillation controller is provided for controlling sending and receiving of ultrasonic waves, between the first ultrasonic sensor and the second ultrasonic sensor;
   the first ultrasonic sensor and the second ultrasonic sensor are in a first condition when the first ultrasonic sensor sends ultrasonic waves, and the second ultrasonic sensor receives the ultrasonic waves, and are in a second condition when the second ultrasonic sensor sends ultrasonic waves, and the first ultrasonic sensor receives the ultrasonic waves; and
   the ultrasonic oscillation controller switches the first ultrasonic sensor and the second ultrasonic sensor between the first condition and the second condition, so that the first ultrasonic sensor operates differently from the second ultrasonic sensor.

3. The ultrasonic measuring method according to claim 1, wherein:
   a flat-type sensor that permits propagation of unfocused ultrasonic waves is used as a third ultrasonic sensor;
   the first ultrasonic sensor and the third ultrasonic sensor are placed on said one side of the coated product via the air layer, at positions where ultrasonic waves are regularly reflected between the first ultrasonic sensor and the third ultrasonic sensor; and
   the second ultrasonic sensor is placed on the other side of the coated product, so as to face the first ultrasonic sensor in an axial direction thereof, through the coated product.

4. The ultrasonic measuring method according to claim 3, wherein the thickness of the coating material is calculated based on an attenuation factor of ultrasonic waves received by a receiving-side ultrasonic sensor as one of the first ultrasonic sensor, the second ultrasonic sensor and the third ultrasonic sensor.

5. The ultrasonic measuring method according to claim 1, wherein:

an ultrasonic wave blocking device is provided for partially inhibiting propagation of ultrasonic waves between the first ultrasonic sensor and the second ultrasonic sensor; and after the ultrasonic wave blocking device is moved to and placed at a position corresponding to an edge portion of the coating material and its periphery, between the coated product and the second ultrasonic sensor, the first ultrasonic sensor sends ultrasonic waves toward the edge portion of the coating material, and the second ultrasonic sensor receives the ultrasonic waves.

6. The ultrasonic measuring method according to claim 1, wherein the thickness of the coating material is calculated based on an attenuation factor of ultrasonic waves received by a receiving-side ultrasonic sensor as one of the first ultrasonic sensor and the second ultrasonic sensor.

7. The ultrasonic measuring method according to claim 1, wherein:
the first ultrasonic sensor has a first vibration surface at which ultrasonic vibrations occur, and the second ultrasonic sensor has a second vibration surface at which ultrasonic vibrations occur;
the first ultrasonic sensor and the second ultrasonic sensor are positioned, with the coated product interposed therebetween, such that a distance between the first vibration surface and the second vibration surface as measured in a vertical direction is equal to or smaller than 100 mm; and
the thickness of the coating material is measured when the second sonic waveform has the maximum amplitude.

8. The ultrasonic measuring method according to claim 7, wherein the thickness of the coating material is measured based on a received signal having the first sonic waveform.

9. An ultrasonic measuring system for measuring a thickness of a coating material applied by coating to one surface or both surfaces of a substrate made of a metal so as to provide a coated product, comprising
a pair of first ultrasonic sensor and second ultrasonic sensor, wherein:
the first ultrasonic sensor is placed on one side of the coated product, as viewed in a thickness direction of the coated product, via an air layer, and the second ultrasonic sensor is placed on the other side of the coated product, via an air layer;
a thickness computing unit that measures the thickness of the coating material based on ultrasonic waves transmitted between the first ultrasonic sensor and the second ultrasonic sensor;
the first ultrasonic sensor comprises a flat-type transmitting sensor that permits propagation of unfocused ultrasonic waves, and the second ultrasonic sensor comprises a flat-type receiving sensor that permits propagation of unfocused ultrasonic waves;
a receiving-side ultrasonic sensor as one of the first ultrasonic sensor and the secong ultrasonic sensor, which receives ultrasonic waves propagated through the air layer, generates a plurality of sonic waveforms as time passes after receiving the ultrasonic waves, said plurality of sonic waveforms including a first sonic waveform that is detected first, and a secong sonic waveform that is detected subsequent to the first sonic waveform; and
respective frequencies of the first ultrasonic sensor and the second ultrasonic sensor are set to the lowest possible levels, according to the thickness of the coating material, under a condition that the second sonic waveform does not overlap the first sonic waveform.

10. The ultrasonic measuring system according to claim 9, further comprising an ultrasonic oscillation controller that controls sending and receiving of ultrasonic waves, between the first ultrasonic sensor and the second ultrasonic sensor, wherein:
the first ultrasonic sensor and the second ultrasonic sensor are capable of sending and receiving ultrasonic waves;
the first ultrasonic sensor and the second ultrasonic sensor are in a first condition when the first ultrasonic sensor sends ultrasonic waves, and the second ultrasonic sensor receives the ultrasonic waves, and are in a second condition when the second ultrasonic sensor sends ultrasonic waves, and the first ultrasonic sensor receives the ultrasonic waves; and
the ultrasonic oscillation controller switches the first ultrasonic sensor and the second ultrasonic sensor between the first condition and the second condition, so that the first ultrasonic sensor operates differently from the second ultrasonic sensor.

11. The ultrasonic measuring system according to claim 9, further comprising a third ultrasonic sensor that is a flat-type sensor that permits propagation of unfocused ultrasonic waves, wherein:
the first ultrasonic sensor and the third ultrasonic sensor are placed on said one side of the coated product via the air layer, at positions where ultrasonic waves are regularly reflected between the first ultrasonic sensor and the third ultrasonic sensor; and
the second ultrasonic sensor is placed on the other side of the coated product so as to face the first ultrasonic sensor in an axial direction thereof, through the coated product.

12. The ultrasonic measuring system according to claim 11, wherein the thickness computing unit calculates the thickness of the coating material, based on an attenuation factor of ultrasonic waves received by a receiving-side ultrasonic sensor as one of the first ultrasonic sensor, the second ultrasonic sensor and the third ultrasonic sensor.

13. The ultrasonic measuring system according to claim 9, further comprising an ultrasonic wave blocking device that partially inhibits propagation of ultrasonic waves between the first ultrasonic sensor and the second ultrasonic sensor, wherein:
the first ultrasonic sensor sends ultrasonic waves, and the second ultrasonic sensor receives the ultrasonic waves sent from the first ultrasonic sensor; and
the ultrasonic wave blocking device is movable to a position corresponding to an edge portion of the coating material and its periphery, between the coated product and the second ultrasonic sensor.

14. The ultrasonic measuring system according to claim 9, wherein the thickness computing unit calculates the thickness of the coating material, based on an attenuation factor of ultrasonic waves received by the receiving-side ultrasonic sensor.

15. The ultrasonic measuring system according to claim 14, wherein:
the first ultrasonic sensor has a first vibration surface at which ultrasonic vibrations occur, and the second ultrasonic sensor has a second vibration surface at which ultrasonic vibrations occur;
the first ultrasonic sensor and the second ultrasonic sensor are positioned, with the coated product interposed therebetween, such that a distance between the first vibration surface and the second vibration surface as measured in a vertical direction is equal to or smaller than 100 mm; and the thickness computing unit measures the thickness of the coating material when the second sonic waveform has the maximum amplitude.

16. The ultrasonic measuring system according to claim 15, wherein the thickness computing unit measures the thickness of the coating material, based on a received signal having the first sonic waveform.

17. The ultrasonic measuring system according to claim 9, further comprising an air convection suppressing device that suppresses changes in the density of the air layer.

18. The ultrasonic measuring system according to claim 17, wherein:
- the substrate has long sides that extend in a longitudinal direction and have a long length, and short sides that extend in a width direction;
- at least one pair of the first ultrasonic sensor and the second ultrasonic sensor is provided inside the air convection suppressing device, and arranged in the width direction parallel to the short sides of the substrate; and
- the air convection suppressing device is movable in the longitudinal direction parallel to the long sides of the substrate and in the width direction, within a measurement area in which the thickness of the coating material is obtained.

19. The ultrasonic measuring system according to claim 17, wherein the air convection suppressing device is provided with at least one temperature measuring device that measures a temperature of the air layer.

20. The ultrasonic measuring system according to claim 17, wherein the air convection suppressing device includes a vibration isolating device that inhibits external vibrations from being transmitted from a ground to the first ultrasonic sensor and the second ultrasonic sensor.

21. The ultrasonic measuring system according to claim 9, wherein the substrate comprises a metal foil used in an electrode of a battery as the coated product, and the coating material comprises an electrode paste applied by coating to the metal foil.

* * * * *